United States Patent
Spivack et al.

(10) Patent No.: US 11,494,991 B2
(45) Date of Patent: Nov. 8, 2022

(54) SYSTEMS, METHODS AND APPARATUSES OF DIGITAL ASSISTANTS IN AN AUGMENTED REALITY ENVIRONMENT AND LOCAL DETERMINATION OF VIRTUAL OBJECT PLACEMENT AND APPARATUSES OF SINGLE OR MULTI-DIRECTIONAL LENS AS PORTALS BETWEEN A PHYSICAL WORLD AND A DIGITAL WORLD COMPONENT OF THE AUGMENTED REALITY ENVIRONMENT

(71) Applicant: Magical Technologies, LLC, Redmond, WA (US)

(72) Inventors: Nova Spivack, Redmond, WA (US); Matthew Hoerl, Redmond, WA (US)

(73) Assignee: Magical Technologies, LLC, Wilmington, DE (US)

(*) Notice: Subject to any disclaimer, the term of this patent is extended or adjusted under 35 U.S.C. 154(b) by 0 days.

(21) Appl. No.: 16/853,815

(22) Filed: Apr. 21, 2020

(65) Prior Publication Data
US 2021/0074068 A1    Mar. 11, 2021

Related U.S. Application Data

(63) Continuation of application No. PCT/US2018/056951, filed on Oct. 22, 2018.
(Continued)

(51) Int. Cl.
*G06T 19/20* (2011.01)
*G06T 19/00* (2011.01)
(Continued)

(52) U.S. Cl.
CPC ............ *G06T 19/006* (2013.01); *G06F 3/013* (2013.01); *G06F 16/907* (2019.01);
(Continued)

(58) Field of Classification Search
CPC ................ G06T 19/006; G06F 16/907; G06F 16/90332
(Continued)

(56) References Cited

U.S. PATENT DOCUMENTS 8,231,465 B2   7/2012   Yee
8,694,553 B2   4/2014   Shuster
(Continued)

FOREIGN PATENT DOCUMENTS

KR   10-2012-0007215 A   1/2012
KR   10-2012-0042253     5/2012
(Continued)

OTHER PUBLICATIONS

English translation of KR 2012-0042253.
(Continued)

*Primary Examiner* — Thomas J Lett

(57) ABSTRACT

Systems and methods of digital assistants in an augmented reality environment and local determination of virtual object placement are disclosed. Apparatuses of single or multi-directional lens as portals between a physical world and a digital world component of the augmented reality environment are also disclosed. In one aspect, embodiments of the present disclosure include a method, which may be implemented on a system, to present, a digital assistant to the user. Responsive to receiving a command, the digital assistant can trigger an operation on the augmented reality environment such that the user is able to engage with the augmented reality environment via the user interface. The method can further include training the digital assistant to learn from the activities occurring in the augmented reality environment and/or behaviors of the user from the action or the interaction with the real world environment.

20 Claims, 12 Drawing Sheets

Related U.S. Application Data

(60) Provisional application No. 62/621,470, filed on Jan. 24, 2018, provisional application No. 62/613,595, filed on Jan. 4, 2018, provisional application No. 62/581,989, filed on Nov. 6, 2017, provisional application No. 62/575,458, filed on Oct. 22, 2017.

(51) Int. Cl.

| | |
|---|---|
| *G06F 16/907* | (2019.01) |
| *G06F 16/9032* | (2019.01) |
| *G06F 16/9035* | (2019.01) |
| *G06N 20/00* | (2019.01) |
| *G06F 3/01* | (2006.01) |
| *G10L 15/22* | (2006.01) |

(52) U.S. Cl.
CPC .... *G06F 16/9035* (2019.01); *G06F 16/90332* (2019.01); *G06N 20/00* (2019.01); *G10L 15/22* (2013.01)

(58) Field of Classification Search
USPC .......................................................... 345/633
See application file for complete search history.

(56) References Cited

U.S. PATENT DOCUMENTS

| | | |
|---|---|---|
| 8,878,846 B1 | 11/2014 | Francis |
| 8,930,195 B1 | 1/2015 | LeBeau |
| 9,781,342 B1 | 10/2017 | Turley |
| 10,026,226 B1 | 7/2018 | Lotto |
| 10,339,721 B1 | 7/2019 | Dascola |
| 10,496,272 B1 | 12/2019 | Lonkar |
| 10,740,804 B2 | 8/2020 | Spivack |
| 10,904,374 B2 | 1/2021 | Spivack |
| 10,957,083 B2 | 3/2021 | Du |
| 11,249,714 B2 | 2/2022 | Spivack |
| 2002/0099257 A1 | 7/2002 | Parker |
| 2002/0099679 A1 | 7/2002 | Usitalo |
| 2003/0158796 A1 | 8/2003 | Balent |
| 2005/0021472 A1 | 1/2005 | Gettman |
| 2008/0140494 A1 | 6/2008 | Charuk |
| 2008/0215415 A1 | 8/2008 | Willms |
| 2009/0061901 A1 | 3/2009 | Arrasvuori |
| 2009/0144105 A1 | 6/2009 | Blatchley |
| 2009/0234948 A1 | 9/2009 | Garbow |
| 2009/0259662 A1 | 10/2009 | Cragun |
| 2009/0300122 A1 | 12/2009 | Freer |
| 2010/0100487 A1 | 4/2010 | Lingafelt |
| 2010/0114662 A1 | 5/2010 | Jung |
| 2011/0007086 A1 | 1/2011 | Kim |
| 2011/0251902 A1 | 10/2011 | Nagarajayya |
| 2012/0105473 A1 | 5/2012 | Bar-Zeev |
| 2012/0116728 A1 | 5/2012 | Shear |
| 2012/0154441 A1 | 6/2012 | Kim |
| 2012/0172131 A1 | 7/2012 | Boswell |
| 2012/0194541 A1 | 8/2012 | Kim |
| 2012/0218296 A1 | 8/2012 | Belimpasakis |
| 2012/0229508 A1 | 9/2012 | Wigdor |
| 2012/0239213 A1 | 9/2012 | Nagata |
| 2012/0249741 A1* | 10/2012 | Maciocci ............... G06T 15/503 348/46 |
| 2012/0254858 A1* | 10/2012 | Moyers ................... H04L 51/04 717/177 |
| 2012/0256954 A1 | 10/2012 | Soon-Shiong |
| 2012/0290366 A1 | 11/2012 | Giles |
| 2013/0083173 A1 | 4/2013 | Geisner |
| 2013/0135344 A1 | 5/2013 | Stirbu |
| 2013/0141419 A1 | 6/2013 | Mount |
| 2013/0211945 A1 | 8/2013 | Po-Ching |
| 2013/0263016 A1 | 10/2013 | Lehtlniemi |
| 2013/0286004 A1 | 10/2013 | McCullouch |
| 2013/0293468 A1 | 11/2013 | Perez |
| 2013/0293584 A1 | 11/2013 | Anderson |
| 2013/0336093 A1 | 12/2013 | Suvanto |
| 2014/0028712 A1 | 1/2014 | Keating |
| 2014/0047027 A1* | 2/2014 | Moyers ............... H04L 12/1822 709/204 |
| 2014/0059447 A1 | 2/2014 | Berk |
| 2014/0063060 A1 | 3/2014 | Maciocci |
| 2014/0063197 A1 | 3/2014 | Yamamoto |
| 2014/0071164 A1 | 3/2014 | Saklatvala |
| 2014/0100955 A1 | 4/2014 | Osotio |
| 2014/0100994 A1 | 4/2014 | Tatzel |
| 2014/0100997 A1 | 4/2014 | Mayerle |
| 2014/0114845 A1 | 4/2014 | Rogers |
| 2014/0168121 A1 | 6/2014 | Chou |
| 2014/0184496 A1 | 7/2014 | Gribetz |
| 2014/0208272 A1 | 7/2014 | Vats |
| 2014/0337920 A1 | 11/2014 | Gobbi |
| 2014/0361971 A1 | 12/2014 | Sala |
| 2014/0369558 A1 | 12/2014 | Holz |
| 2014/0372540 A1 | 12/2014 | Libin |
| 2015/0005070 A1 | 1/2015 | Monahan |
| 2015/0019983 A1 | 1/2015 | White |
| 2015/0031440 A1 | 1/2015 | Desanti |
| 2015/0055821 A1 | 2/2015 | Fotland |
| 2015/0058102 A1 | 2/2015 | Christensen |
| 2015/0123966 A1 | 5/2015 | Newman |
| 2015/0130689 A1 | 5/2015 | Sugden et al. |
| 2015/0130836 A1 | 5/2015 | Anderson |
| 2015/0187137 A1 | 7/2015 | Mullins |
| 2015/0206349 A1 | 7/2015 | Rosenthal |
| 2015/0213355 A1 | 7/2015 | Sharma |
| 2015/0254793 A1 | 9/2015 | Hastings |
| 2015/0263460 A1 | 10/2015 | Huang |
| 2015/0302517 A1 | 10/2015 | Spivack |
| 2015/0302652 A1 | 10/2015 | Miller |
| 2015/0371447 A1 | 12/2015 | Yasutake |
| 2015/0378440 A1 | 12/2015 | Umlaut |
| 2016/0026253 A1 | 1/2016 | Bradski |
| 2016/0100034 A1 | 4/2016 | Miller |
| 2016/0133230 A1 | 5/2016 | Daniels |
| 2016/0134805 A1 | 5/2016 | Takahashi |
| 2016/0175715 A1 | 6/2016 | Ye |
| 2016/0203645 A1 | 7/2016 | Knepp |
| 2016/0217623 A1 | 7/2016 | Singh |
| 2016/0234643 A1 | 8/2016 | Crutchfield |
| 2016/0314609 A1 | 10/2016 | Taylor |
| 2016/0323332 A1 | 11/2016 | Welinder |
| 2016/0330522 A1 | 11/2016 | Newell |
| 2016/0335289 A1 | 11/2016 | Andrews |
| 2016/0342782 A1 | 11/2016 | Mullins |
| 2017/0052507 A1 | 2/2017 | Poulos |
| 2017/0093780 A1 | 3/2017 | Lieb |
| 2017/0103584 A1 | 4/2017 | Vats |
| 2017/0123750 A1 | 5/2017 | Todasco |
| 2017/0154242 A1 | 6/2017 | Blanchflower |
| 2017/0178373 A1 | 6/2017 | Sarafa |
| 2017/0186232 A1 | 6/2017 | Dange |
| 2017/0193276 A1 | 7/2017 | Choi |
| 2017/0193314 A1 | 7/2017 | Kim |
| 2017/0243403 A1 | 8/2017 | Daniels |
| 2017/0244703 A1 | 8/2017 | Lee |
| 2017/0316186 A1 | 11/2017 | Brettenfeld |
| 2017/0323266 A1 | 11/2017 | Seo |
| 2017/0366748 A1 | 12/2017 | Festa |
| 2018/0053267 A1 | 2/2018 | Penner |
| 2018/0068019 A1 | 3/2018 | Novikoff |
| 2018/0089869 A1 | 3/2018 | Bostick |
| 2018/0096362 A1 | 4/2018 | Kwan |
| 2018/0113594 A1 | 4/2018 | Alnatsheh |
| 2018/0145937 A1 | 5/2018 | Choi |
| 2018/0190003 A1 | 7/2018 | Upadhyay |
| 2018/0190166 A1 | 7/2018 | Salmimaa |
| 2018/0196585 A1 | 7/2018 | Densham |
| 2018/0210643 A1 | 7/2018 | Ghassabian |
| 2018/0231921 A1 | 8/2018 | Smith |
| 2018/0268589 A1 | 9/2018 | Grant |
| 2018/0308287 A1 | 10/2018 | Daniels |
| 2018/0330542 A1 | 11/2018 | Bharti |
| 2018/0349088 A1 | 12/2018 | Leppanen |
| 2018/0350146 A1 | 12/2018 | Gervasio |

(56) References Cited

U.S. PATENT DOCUMENTS

| | | |
|---|---|---|
| 2018/0365883 A1 | 12/2018 | Fillhardt |
| 2018/0365897 A1 | 12/2018 | Pahud |
| 2018/0365898 A1 | 12/2018 | Costa |
| 2019/0005724 A1 | 1/2019 | Pahud |
| 2019/0034765 A1 | 1/2019 | Kaehler |
| 2019/0080172 A1 | 3/2019 | Zheng |
| 2019/0102946 A1 | 4/2019 | Spivack |
| 2019/0107935 A1 | 4/2019 | Spivack |
| 2019/0107990 A1* | 4/2019 | Spivack .............. G06T 11/60 |
| 2019/0107991 A1 | 4/2019 | Spivack |
| 2019/0108558 A1 | 4/2019 | Spivack |
| 2019/0108578 A1 | 4/2019 | Spivack |
| 2019/0108580 A1 | 4/2019 | Spivack |
| 2019/0108682 A1 | 4/2019 | Spivack |
| 2019/0108686 A1 | 4/2019 | Spivack |
| 2019/0132700 A1 | 5/2019 | Yokoyama |
| 2019/0179405 A1 | 6/2019 | Sun |
| 2019/0188450 A1 | 6/2019 | Spivack |
| 2019/0236259 A1 | 8/2019 | Remillet |
| 2019/0253542 A1 | 8/2019 | Fan |
| 2019/0260870 A1 | 8/2019 | Spivack |
| 2019/0266404 A1 | 8/2019 | Spivack |
| 2019/0295298 A1 | 9/2019 | VanBlon |
| 2019/0318076 A1 | 10/2019 | Chun |
| 2019/0355050 A1 | 11/2019 | Geisler |
| 2019/0391637 A1 | 12/2019 | Taylor |
| 2019/0392085 A1 | 12/2019 | Ragan |
| 2020/0019295 A1 | 1/2020 | Spivack |
| 2020/0021784 A1 | 1/2020 | Grusche |
| 2020/0068133 A1 | 2/2020 | Spivack |
| 2020/0294311 A1* | 9/2020 | Holz ................ G06T 19/20 |
| 2021/0026441 A1 | 1/2021 | Spivack |
| 2021/0074068 A1 | 3/2021 | Spivack |
| 2021/0110608 A1* | 4/2021 | Elby ................ G06F 3/011 |

FOREIGN PATENT DOCUMENTS

| | | |
|---|---|---|
| KR | 10-2014-0043522 A | 4/2014 |
| KR | 10-2014-0088578 | 7/2014 |
| KR | 10-1693631 | 1/2017 |
| WO | 2017093605 | 6/2017 |
| WO | 2019023659 | 1/2019 |
| WO | 2019028159 | 2/2019 |
| WO | 2019028479 | 2/2019 |
| WO | 2019055703 | 3/2019 |
| WO | 2019079826 | 4/2019 |
| WO | 2020018431 | 1/2020 |

OTHER PUBLICATIONS

English translation of KR 2014-0088578.
English translation of KR 101693631 BI.
English translation of KR 20120007215 A.
English translation of KR 20140043522 A.
U.S. Appl. No. 16/048,190, filed Jul. 27, 2018, now U.S. Pat. No. 10,740,804, filed Aug. 11, 2018, Systems, Methods and Apparatuses of Seamless Integration of Augmented, Alternate, Virtual, and/or Mixed Realities with Physical Realities for Enhancement of Web, Mobile and/or Other Digital Experiences.
U.S. Appl. No. 16/048,195, filed Jul. 27, 2018, Systems, methods and apparatuses to facilitate physical and non-physical interaction/action/reactions between alternate realities.
U.S. Appl. No. 16/048,199, filed Jul. 27, 2018, Systems, Methods and Apparatuses of Multidimensional Mapping of Universal Locations or Location Ranges for Alternate or Augmented Digital Experiences.
U.S. Appl. No. 16/048,205, filed Jul. 27, 2018, Systems, Methods and Apparatuses to Create Real World Value and Demand for Virtual Spaces Via an Alternate Reality Environment.
U.S. Appl. No. 16/792,252, filed Feb. 16, 2020, Seamless Integration of Augmented, Alternate, Virtual, and/or Mixed Realities with Physical Realities for Enhancement of Web, Mobile and/or Other Digital Experiences.
U.S. Appl. No. 16/052,720, filed Aug. 2, 2018, Systems, Methods and Apparatuses to Facilitate Trade or Exchange of Virtual Real-Estate Associated With a Physical Space.
U.S. Appl. No. 17/502,127, filed Oct. 15, 2021, Systems, Methods and Apparatuses to Facilitate Trade or Exchange of Virtual Real-Estate Associated With a Physical Space.
U.S. Appl. No. 16/056,507, filed Aug. 6, 2018, Systems, Methods and Apparatuses for Deployment and Targeting of Context-Aware Virtual Objects and/or Behavior Modelling of Virtual Objects Based on Physical Principles.
U.S. Appl. No. 16/130,499, filed Sep. 13, 2018, now U.S. Pat. No. 11,221,817, filed Jan. 11, 2022, Systems and Methods of Shareable Virtual Objects and Virtual Objects As Message Objects To Facilitate Communications Sessions in an Augmented Reality Environment.
U.S. Appl. No. 16/130,541, filed Sep. 13, 2018, Systems and Methods of Virtual Billboarding and Collaboration Facilitation in an Augmented Reality Environment.
U.S. Appl. No. 16/130,582, filed Sep. 13, 2018, Systems and Methods of Rewards Object Spawning and Augmented Reality Commerce Platform Supporting Multiple Seller Entities.
U.S. Appl. No. 16/853,815, filed Apr. 21, 2020, Systems, Methods and Apparatuses of Digital Assistants in an Augmented Reality Environment and Local Determination of Virtual Object Placement and Apparatuses of Single or Multidirectional Lens as Portals Between a Physical World and a Digital World Component of the Augmented Reality Environment.
U.S. Appl. No. 16/181,478, filed Nov. 6, 2018, Systems, Methods and Apparatuses for Deployment of Virtual Objects based on content segment consumed in a target environment.
U.S. Appl. No. 16/260,783, filed Jan. 29, 2019, Systems, Methods and Apparatuses to Generate a Fingerprint of a Physical Location for Placement of Virtual Objects.
U.S. Appl. No. 16/252,886, filed Jan. 21, 2019, now U.S. Pat. No. 10,904,374, filed Jan. 26, 2021, Systems, Methods and Apparatuses to Facilitate Gradual or Instantaneous Adjustment in Levels of Perceptibility of Virtual Objects or Reality Object in a Digital Scene.
U.S. Appl. No. 17/136,062, filed Dec. 29, 2020, Systems, Methods and Apparatuses to Facilitate Gradual or Instantaneous Adjustment in Levels of Perceptibility of Virtual Objects or Reality Object in a Digital Scene.
U.S. Appl. No. 16/511,186, filed Jul. 15, 2019, Systems and Methods To Administer a Chat Session in An Augumented Reality Environment.
U.S. Appl. No. 16/547,817, filed Aug. 22, 2019, Edge-Facing Camera Enabled Systems, Methods and Apparatuses.
U.S. Appl. No. 16/806,162, filed Mar. 2, 2020, Virtual Object Control of a Physical Device and/or Physical Device Control of A Virtual Object.
Szemenyei, Maiden, and Ferenc Vajda. "3d object detection and scene optimization for tangible augmented reality." Periodica Polytechnica Electrical Engineering and Computer Science 62.2 (2018): 25-3. (Year: 2018).
Previtali et al. ("A Flexible Methodology for Outdoor/Indoor Building Reconstruction From Occluded Point Clouds", ISRS Annals of the Photogrammetry, Remote Sensing and Spatial Information Sciences, vol. II-3, 2014 ISPRS Technical Commission III Symposium, Sep. 5-7, 2014, Zurich, Switzerland) (Year: 2014).
IPRP for Application No. PCT/US18/56951, Date of filing: Oct. 22, 2018, Applicant: Magical Technologies, LLC, Date of Mailing: Apr. 28, 2020, 16 pages.
International Search Report & Written Opinion for Application No. PCT/US18/44214, Date of filing: Jul. 27, 2018, Applicant: Magical Technologies, LLC, dated Nov. 23, 2018, 20 pages.
International Search Report & Written Opinion for Application No. PCT/US18/44844, Date of filing: Aug. 1, 2018, Applicant: Magical Technologies, LLC, dated Nov. 16, 2018, 13 pages.
International Search Report & Written Opinion for Application No. PCT/US18/45450, Date of filing: Aug. 6, 2018, Applicant: Magical Technologies, LLC, dated Jan. 2, 2019, 20 pages.

(56) References Cited

OTHER PUBLICATIONS

International Search Report & Written Opinion for Application No. PCT/US18/50952, Date of filing: Sep. 13, 2018 Applicant: Magical Technologies, LLC, Date of Mailing: Mar. 15, 2019, 22 pages.
International Search Report & Written Opinion for Application No. PCT/US18/56951, Date of filing: Oct. 22, 2018, Applicant: Magical Technologies, LLC, Date of Mailing: Feb. 22, 2019,17 pages.
International Search Report & Written Opinion for Application No. PCT/US19/41821, Date of filing: Jul. 15, 2019, Applicant: Magical Technologies, LLC, Date of Mailing: Nov. 21, 2019, 9 pages.
"Fujifilm balloon" (downloaded @https://web.archive.org/web/20150514181842/http://www.imageafter.com/image.php?image=b2ain/ehicle3002.jpg, (Year: 2015).
"Print Ad Rates", downloaded @ https://web.archive.org/web/2U160319Ub0126/https://diverseeducation.com/media-kit/print-ad-rates/,available online since Mar. 14, 2016 (Year: 2016).
Mehdi Mekni et al., 'Augmented Reality Applications, Challenges and Future Trends', Applied computer and applied computational science, Apr. 25, 2014, pp. 205-214.
IPRP for Application No. PCT/US18/44214, Date of filing: Jul. 27, 2018, Applicant: Magical Technologies, LLC, Date of Mailing: Jan. 28, 2020, 18 pages.
IPRP for Application No. PCT/US18/44844, Date of filing: Aug. 1, 2018, Applicant: Magical Technologies, LLC, Date of Mailing: Feb. 4, 2020, 11 pages.
IPRP for Application No. PCT/US18/45450, Date of filing: Aug. 6, 2018, Applicant: Magical Technologies, LLC, Date of Mailing: Feb. 13, 2020, 10 pages.
International Search Report & Written Opinion for Application No. PCT/US18/50952, Date of filing: Sep. 13, 2018, Applicant: Magical Technologies, LLC, Date of Mailing: Mar. 17, 2020, 12 pages.
IPRP for Application No. PCT/US19/41821, Date of filing: Jul. 15, 2019, Applicant: Magical Technologies, LLC, Date of Mailing: Nov. 21, 2019, 8 pages.

\* cited by examiner

SYSTEMS, METHODS AND APPARATUSES OF DIGITAL ASSISTANTS IN AN AUGMENTED REALITY ENVIRONMENT AND LOCAL DETERMINATION OF VIRTUAL OBJECT PLACEMENT AND APPARATUSES OF SINGLE OR MULTI-DIRECTIONAL LENS AS PORTALS BETWEEN A PHYSICAL WORLD AND A DIGITAL WORLD COMPONENT OF THE AUGMENTED REALITY ENVIRONMENT

CLAIM OF PRIORITY

This application is a Continuation application of:

International Application No. PCT/US2018/056951, filed Oct. 22, 2018 and entitled "Systems, Methods and Apparatuses of Digital Assistants in an Augmented Reality Environment and Local Determination of Virtual Object Placement and Apparatuses of Single or Multi-directional Lens as Portals Between a Physical World and a Digital World Component of the Augmented Reality Environment," (8005.WO01) which claims the benefit of:

U.S. Provisional Application No. 62/575,458, filed Oct. 22, 2017 and entitled "Systems, Methods and Apparatuses of Single directional or Multi-directional Lens/Mirrors or Portals between the Physical World and a Digital World of Augmented Reality (AR) or Virtual Reality (VR) Environment/Objects; Systems and Methods of On-demand Curation of Crowdsourced (near) Real time Imaging/Video Feeds with Associated VR/AR Objects; Systems and Methods of Registry, Directory and/or Index for Augmented Reality and/or Virtual Reality Objects," (8005.US00), the contents of which are incorporated by reference in their entirety;

U.S. Provisional Application No. 62/581,989, filed Nov. 6, 2017 and entitled "Systems, Methods and Apparatuses of: Determining or Inferring Device Location using Digital Markers; Virtual Object Behavior Implementation and Simulation Based on Physical Laws or Physical/Electrical/Material/Mechanical/Optical/Chemical Properties; User or User Customizable 2D or 3D Virtual Objects; Analytics of Virtual Object Impressions in Augmented Reality and Applications; Video objects in VR and/or AR and Interactive Multidimensional Virtual Objects with Media or Other Interactive Content," (8006.US00), the contents of which are incorporated by reference in their entirety;

U.S. Provisional Application No. 62/613,595, filed Jan. 4, 2018 and entitled "Systems, methods and apparatuses of: Creating or Provisioning Message Objects Having Digital Enhancements Including Virtual Reality or Augmented Reality Features and Facilitating Action, Manipulation, Access and/or Interaction Thereof," (8008.US00), the contents of which are incorporated by reference in their entirety;

U.S. Provisional Application No. 62/621,470, filed Jan. 24, 2018 and entitled "Systems, Methods and Apparatuses to Facilitate Gradual and Instantaneous Change or Adjustment in Levels of Perceptibility of Virtual Objects and Reality Object in a Digital Environment," (8009.US00), the contents of which are incorporated by reference in their entirety.

RELATED APPLICATIONS

This application is related to U.S. patent application Ser. No. 16/181,478, filed Nov. 6, 2018 and entitled "Systems, Methods and Apparatuses for Deployment of Virtual Objects based on content segment consumed in a target environment," (8006.US01), the contents of which are incorporated by reference in their entirety;

This application is related to U.S. patent application Ser. No. 16/252,886, filed Jan. 21, 2019 and entitled "Systems, Methods and Apparatuses to Facilitate Gradual or Instantaneous Adjustment in Levels of Perceptibility of Virtual Objects or Reality Object in a Digital Scene," (8009.US01), the contents of which are incorporated by reference in their entirety.

This application is related to PCT Application no. PCT/US2018/44844, filed Aug. 1, 2018 and entitled "Systems, Methods and Apparatuses to Facilitate Trade or Exchange of Virtual Real-Estate Associated with a Physical Space", the contents of which are incorporated by reference in their entirety.

This application is related to PCT Application no. PCT/US2018/45450, filed Aug. 6, 2018 and entitled "Systems, Methods and Apparatuses for Deployment and Targeting of Context-Aware Virtual Objects and/or Objects and/or Behavior Modeling of Virtual Objects Based on Physical Principles", the contents of which are incorporated by reference in their entirety.

This application is related to PCT Application no. PCT/US2018/50952, filed on Sep. 13, 2018 and entitled "Systems And Methods Of Shareable Virtual Objects and Virtual Objects As Message Objects To Facilitate Communications Sessions In An Augmented Reality Environment", the contents of which are incorporated by reference in their entirety.

TECHNICAL FIELD

The disclosed technology relates generally to augmented reality environments and applications.

BACKGROUND

The advent of the World Wide Web and its proliferation in the 90's transformed the way humans conduct business, live lives, consume/communicate information and interact with or relate to others. A new wave of technology is on the cusp of the horizon to revolutionize our already digitally immersed lives.

DETAILED DESCRIPTION

Figure 1:
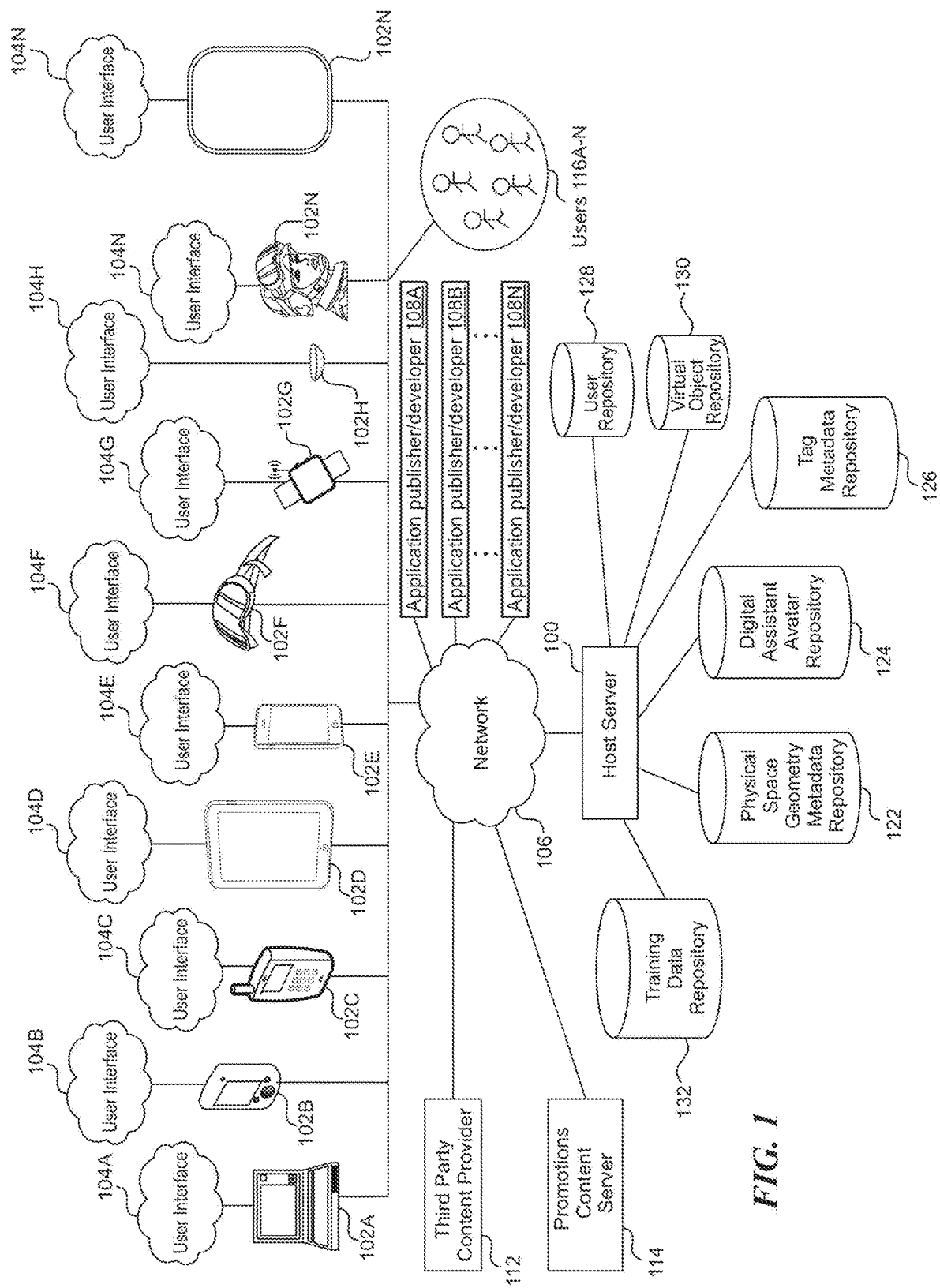
FIG. 1 illustrates an example block diagram of a host server able to deploy virtual objects for various applications, digital assistants in an augmented reality environment and to facilitate local determination of virtual object placement in the augmented reality environment, in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure further include systems, methods and apparatuses of digital assistants in an augmented reality environment (e.g., as hosted by the host server 100 as depicted in the example of FIG. 1) and local determination virtual object placement. Further embodiments include apparatuses of single or multi-directional lens as portals between a physical world and a digital world component of the augmented reality environment (e.g., as hosted by the host server 100 as depicted in the example of FIG. 1).

VR/AR That Is Always On

On embodiment of the present disclosure further includes a system (e.g., any of one or more of, client device 102 of FIG. 1, client device 402 of FIG. 4A or server 100 of FIG. 1, server 300 of FIG. 3A) having AR/VR software agent/hardware module having sensors (e.g., the camera and mic and other sensors) that are always on, and the system is always aware of what is happening, unless the user presses a button to temporarily stop recording/stop listening, or remains recording but temporarily ceases processing of said data. For example, while they hold the button down the system pauses.

To save resources the system can record and save a predefined amount of time of recording (e.g., several milliseconds, few seconds, 10-30 seconds, 30-60 seconds, few minutes, etc.) at each location in the real world environment and flush anything older. The system can assess a fee to retain and manger older data and feeds. The system can also offer or implement tiered level storage services of such data for users (e.g., what is happening based on a user's perspective) or for a fixed location in the real world, The more data that is stored or the more historical data that is stored, the more refined and advanced is the corresponding virtual or augmented experience, for that user and/or for that location in the real world environment.

On-Demand Sensors

One embodiment of the present disclosure includes a system (e.g., any of one or more of, client device 102 of FIG. 1, client device 402 of FIG. 4A or server 100 of FIG. 1, server 300 of FIG. 3A) which routes sensors or devices with sensors (e.g., including for example people with camera phones, wearable devices, headmounted devices, smart glasses, etc.) to locations in order to rent time on the sensors (e.g., imaging devices, microphones, cameras, or other input sensors of various devices) to record what is happening at that location.

For example, Sue is currently in San Francisco but wants to see what is happening right now at a certain location in New York City. She uses the disclosed system and types in the location (e.g. address or other identifier) and/or the event/phenomenon/activity/scene she wants to see (e.g., a live concert or basketball game at Madison Square Garden, or a solar eclipse in the Hamptons). The system locates, detects and notifies users of the system in the network with devices who are near or at that location who are willing to help Sue access or see what she wants to look at.

When users agree to capture the event or phenomenon, and the disclosed system then books Sue a "ride" or "experience" on their devices (e.g., phone(s) or other devices). The users can be rewarded or get paid for aiming their devices at what Sue wants—or by taking their devices on a path that Sue wants—and streaming the live recording (e.g., audio, video or others) through the system for access or viewing by Sue. The price of each "ride or experience" can be driven by supply and demand. At some locations there might be more "sensor drivers" already there, and other locations are harder to get to and might cost more. The price might also vary by time or location—peak times, off peak times, popular locations, popular events, trending events, hard to access locations, routes, etc.

The disclosed system (e.g., any of one or more of, client device 102 of FIG. 1, client device 402 of FIG. 4A or server 100 of FIG. 1, server 300 of FIG. 3A), in one embodiment, includes a marketplace that connects parties requesting sensor data either real time or near real time at locations and times (video and audio from smartphones, but potentially other sensor data from any types of sensors as well), with parties who have devices that can supply that sensor data. For example, if there was sudden breaking news somewhere, there would be a spike in demand for live feed, recording or video of that situation. The disclosed marketplace can broker the supply for sensors to meet the demand for sensors in real time or near real time. The system can make the connection and provide the user interface to buyers and sellers of sensor data. Historical sensor data can also be stored, managed, archived and sold.

One embodiment further includes a marketplace for generating and updating live 3D maps of physical places—outside and indoors—where there is demand. In places that change a lot or have a lot of activity, there is frequent need for live video and 3D surface data of the place. Frequency of need for feed is generally proportional to amount of activity, movement, traffic for example. The system can thus enable remote users to view it and even participate in VR/AR content and activity at that place remotely. The system can also save the history of what happened at that place. This is a way to crowdsource audio-video, temperature and 3D sensor and map data about the world.

The algorithm can naturally result in the system not paying anything or much for periods of quiet time with little or no activity. The process would favor popular locations and times it could monetize. You might earn too little in most situations that don't have big audiences for it to be worth keeping on. The system generally records when someone wants it—its live—it uses cameras that are already there and waiting to host sessions. You can imagine people just standing around at a place offering to be cameras for people or apps that want to see what's happening, to see a view (e.g., bottom of the ocean, tectonic plates or atop a beautiful mountain) or rare phenomenon (e.g., a solar eclipse).

For example, if someone sets up a stationary camera there is always earning. Dynamic pricing ensures that there is enough coverage from enough angles of any place anyone likely wants. The system can award points, rewards and/or payment dynamically for places based on popularity, demand, amount of activity, rarity of phenomenon, or access difficulty of the location, etc. Note that the system is distributed in that each sensor, device or camera is a separate stream. The system forms a big live cam network.

The system, in one embodiment, includes a points engine that awards users for doing what it wants—starting with lending, or renting out a sensor or camera or device. The system can show the user a map of where it is paying the most and what is projected. The user can just hang out there and people who want to see through their camera can rent or purchase some amount of their time. The user can then aim their sensors at what they want to see. For example, Breaking news and other things drive surprise demand. Also events etc. Celeb sightings. Concerts. Sports events. Natural phenomenon (e.g., volcanic eruption, solar or lunar eclipses etc.). Scenic locations. And live performances and happenings. There could be events (e.g., concerts, theatre, Golden Globe awards, live TV shows, talk shows, etc.) where there are only a finite number of tickets.

Registry, Directory and Search Index for Augmented Reality and/or Virtual Reality Content When any entity publishes a virtual object it can register that VOB by notifying a registry via an API for the registry. Registration is in one instance, the act of providing the registry (e.g., as hosted by server 100 of FIG. 1, server 300 of FIG. 3A) with metadata including an identifier e.g. address (URL) and unique ID and other information about the content (tags, type of content, publisher identity, date, time created, price, audience, present locations, policies, description, preview images or 3D object preview, etc). The registry can also index the content.

In a further example, the system (e.g., any of one or more of, client device 102 of FIG. 1, client device 402 of FIG. 4A or server 100 of FIG. 1, server 300 of FIG. 3A) can also crawl or check the content to index it further. The registry can maintain private metadata about the object such as data that ranks the object and publisher in content quality, availability, response time, popularity, and other dimensions such as relevancy to various queries. The registry is indexed and can be searched and browsed parametrically by keyword as other attributes.

In one embodiment, an API can be provided to enable hosted apps (e.g., hosted by server 100 of FIG. 1, server 300 of FIG. 3A) or third party apps (e.g., third party content provider 114, application publisher 108, and/or promotions content server 114) to publish and subscribe to updates from the registry, and to search it and get results.

In a further embodiment, a web portal and/or mobile interface (e.g., user interface 104) enables people to search and browse the content in the registry. The portal can maintain a directory section. The disclosed system (e.g., any of one or more of, client device 102 of FIG. 1, client device 402 of FIG. 4A or server 100 of FIG. 1, server 300 of FIG. 3A) functions as a central or distributed search engine for AR/VR content across publishers, locations and apps. The system also enables people or software agents/modules or apps to easily locate available relevant AR/VR content, from any number of publishers and other agents, for their present context (location, query, activity, intent or goals, etc.).

For example, once content is found that matches the query then it can be browsed, previewed and/or launched. Launching the content can pull the content into an app or launch another app to render or interact with the content. A further embodiment includes a search engine which can also display ads on user facing interfaces and/or include ads in API responses to queries.

Tracking of Hands in VR/AR

In a further example, users can wear special gloves, finger covers, fingertip covers, stickers on fingernails, specially colored paint or nail polish, or nail polish or decals on fingernails, or they can wear rings on fingers that are trackable via special patterns or coloration—these enable AR agents or software to detect and track fingers and gestures with greater accuracy via the camera. Hands or fingers of different people wearing differently colored or patterned material or substances on fingers or hands can be distinguished by the software.

VR/AR Painting and Dance

One embodiment includes AR/VR dance and paint effects enabled by electronic gloves with trackers. A user wearing the gloves can stand in front of a camera, wearing AR glasses. They system tracks the gestures they make with their hands and enables them to paint in the air, as they move or dance. It could combined dance with painting with music. This can be a new art form. Tracers could follow them and decay or remain, they could use different brushes or effects, they could make realistic or abstract artworks as they move around in a space. For example, users can create AR/VR graffiti in the mixed digital, physical space, said graffiti could additionally alter dynamically with time. Camera could be in the glasses or an external camera.

Algorithmic AR/VR Content Feeds

Embodiments of the present disclosure further include algorithmic AR/VR Content Feeds. A an example embodiment can include: (1) the twitter near a billboard you designed for the video—or something like it, (2) some interesting things auto-spawning near the user (gems, 50% off coupon, secret VIP event ticket, free gift offer). Some of these could appear and then self-delete after n seconds or minutes, giving you a reason to look at the same place again even though you looked recently.

The system can award points for actions in the environment, like when you find a special virtual object, or when you do things like click on objects, etc. all of this speaks to the addictiveness and reward of the app. With a process that makes it relevant to each user (e.g., user activity stream for each user). So the story is that users get: messages from friends that are highly relevant by nature, relevant content near them about their interests (from public+layers they follow, in an algo-curated public feed), and relevant rewards and sponsored content (rewards from us and targeted ads/offers from sponsors). The content from friends and the relevant content around them+rewards, keeps them looking and coming back.

If the sponsored ad content is at least not irrelevant, and ideally also provides some points or other kinds of rewards (social reward, access to exclusive events, big savings, etc.) then users will not only tolerate them but may even enjoy and want them. If for example a sponsor made some great sponsored 3D content and even made it rewarding to engage with it, and it was relevant to Joe, then Joe would enjoy it rather than find it annoying. The difference between something being "content" or "annoying advertising" is relevancy and quality.

The system can reward users in a number of ways. One is the depicted content itself may be delightful or entertaining or useful. The other is that is the system includes a built in treasure hunt metagame—which spawns rewards that the system provides and that sponsors can pay for, to each user, intelligently. that the process is designed and adapted to keep users playing just like a slot machine.

In one embodiment, the system's reward system is akin to a real world casino. For example, the system provides a unique experience to the users so Joe doesn't see the same content or rewards every time he logs in. An "ad" in the system should be content+reward. If it is just content it has to be rewarding in itself. Otherwise at least add points rewards to it. The uncertainty and luck of discovery aspect— the potential jackpot aspect—these make it fun and addictive.

Statistically, the system can use and implement casino math and/or relevant mathematical adaptations for this— specifically, slot machines dynamically adjust the probability of a player winning based on how they are playing, to keep them betting. The system implements this or a version of this. A "bet" is another minute of attention in the environment.

Like a customized slot machine where jackpots are sponsored targeted ads (that the customer actually wants). But jackpots are both actually—the system can provide points awards to users for actions they take (time spent, interactions, clicks, etc.) and just by luck and based on their karma. So can advertisers—advertisers can insert rewards and the disclosed system runs them in the spawn. There are also other kinds of jackpots beyond just points—for example a coupon has a bar code and gives the user a huge discount at a store but may not dispense any points. Similarly a really great little game or collectors item VOB could also be rewarding to a user that likes that.

There can be several streams of content that users are exposed to in the disclosed VR/AR environment: (1) objects addressed explicitly to them, (2) objects that are shared with users and groups they follow (but are not explicitly addressed to them), (3) objects that are shared with them by the system, and sponsors of the system. The public layer can include of (2)+(3). All other layers can show for example, either (1) or only (2). The system's content and ads only appear in the public layer. A user can choose not to see the public layer, but they cannot choose to see the public layer without sponsored content (ads). The system ensures that public layer is so good and rewarding that users want to see it all the time.

One embodiment of the present disclosure includes some coins and gems and power-up objects—the system associates or assigns points with them, but advertisers can also buy them and run them and add some kind of branding to them so that when users redeem them they see some sponsored content, or have to first go through a sponsored interaction.

The key is lots of quality custom or adapted content to always keep the user engaged: There has to be the optimal ratio. Too much reward is also no longer special. In one embodiment, it is 80/n where n is usually 20% and there is a bell curve of greater and lower reward frequency where the frequency increases a bit while the user has good karma, and then there is another variable for the probability of different sized points rewards as well. For instance, a user who is more engaged can earn better karma and sees more rewards for a while, and there is a dice roll every time a reward spawns where the probability of a higher value reward also can change based on user karma for a while. The more a user uses with the disclosed AR/VR environment and the more they engage, the better they perform. Instead of 80/20 maybe it becomes 70/30 best case, and the user can earn bigger rewards on average during that time. But then it decays unless the user maintain it.

As for the 80 or 70% of the experience that is non-sponsored content, that can be user generated content (UGC) or content from APIs like Yelp and Twitter. Messaging, billboarding/community, publishing are the UGC part. Then we need a healthy amount of API content that is useful and contextually relevant (geo-relevant to start with).

In one example, of the 80% to 70%, about half is allocated or earmarked for UGC, and half could be from APIs. In fact even if there was only API content it could be useful in certain contexts. Like as a tourist or when looking for a place to eat—so that's a mechanism to fill the world with a lot of content: twitter, facebook, insta, yelp, wikipedia, google maps—about things near you, the place near you. APIs of an object with the linkedin profile, insta profile, of each person near you can also be utilized.

Billboarding can be advantageous where there are lots of users. Messaging can be initially useful between friends. The API content can be what populates the world and is the primary excuse for looking through our lens. Adding geo-relevant Twitter, news, media content, and other social media content into the AR view is a good place to start because there is almost always something near you. Note that with the web there is really no page to look at that shows you relevant information from every network to where you are geographically and temporally right now. In a 2D interface you have a list to work with. In AR, such as the disclosed AR environment, which is 3D, there is so much more room to work with. This touches on the desktop concept, and even personal intelligent assistants—in some embodiments, the disclosed process includes an intelligent assistant that shows users relevant objects to user's context, through the system's lens.

A user's context includes, for example the user's identity, past, the user's present activity, location, time of day, who else is there. Usually the system will either have no API content or UGC for a user and place. The disclosed system executes processes which understand that users want to see messages from friends, the best content from people, groups and brands they follow, and the best, most popular, or most relevant stuff from public. Users also want to see rewards that give them value that matters to them—including points where redeemable (cryptocurrency, digital currency, fiat currency, etc.) or useful (buy virtual goods or pay to boost posts and get attention in the AR environment platform or system), and they want to see very entertaining and/or relevant content from sponsors.

The disclosed process includes optimizing this mix to attain and achieve the most engagement and continued engagement from each individual user; the process includes a/b testing across users and populations of users and when it learns that some item is getting great response for some demographic and context it also can increase the frequency of that content for that audience and context. Or it can move it to the "top level" or outside of containers; basically to the disclosed system provides a great, non-cluttered UX; there always has to be enough to keep it engaging and interesting, and the system ensures that it nests or manages the world of information; the disclosed innovative rewards system helps with ensuring there is at least a chance there is a reward all the time; as an example, it's innovative function is to drive engagement with the UX.

One embodiment includes some special objects like lockable boxes and chests. They can be opened if the user has the key. Or the combination. Or certain required items. The system enables any virtual or digital content to be placed on any surface.

One problem addressed by the disclosed platform is if people build in the same or overlapping locations in their private layers the system decides what is show to users by default (e.g., in the public layer at that location). In one embodiment, the system can show a summary object that says "there are two giant castles here" unless one of them outbids the other to rent that real estate. If they rent the real estate then they can be the default and the other object is in a small orb or container that indicates there are other objects or content there.

One embodiment of the AR environment includes, a standardized container shape—an orb—that is recognizable It appears wherever the system needs to group or summarize many objects at a place without showing them. The orb can be identifiable in an iconography as an a special thing. It can have a number on it and could also have an icon for the type of things it contains. A Twitter orb would have the Twitter logo and a badge for the number of Tweets it contains. A MYXR Orb (e.g., an AR/VR orb) would have a MYXR logo and a badge for the number of MYXR or AR/VR objects (billboards, blocks, grouped named structures, it includes.). An example interaction would enable a user to activate an Orb and see an inventory of its contents and then choose the ones to pop out into the environment. They could also pop them all out and then fold them back into the Orb. The size of the Orb could reflect the number of objects it contains as well. In order to not be useful and encourage interaction with it, there could be one Orb per location containing sub orbs per type of collection (Twitter, Videos, Photos, etc).

Orbs can generally be a bit out of the way in any location—they could either float at about 7 feet altitude, or they could be in the heads up display (HUD) rather than objects in the scene. If they are in the HUD then they would basically be alerts that would appear and say "200 Tweets here"—if you tap on that alert then it puts a timeline of Tweets in front of the user and they can then see them all. Or if it says "100 billboards here" then it gives the user a list of them and they can choose which obese to see in the space".

One embodiment also includes balloon objects with messages on them. They float to the ceiling or a specific altitude. A giant hot air balloon even. And a dirigible of any size. A small one could cruise around a mall or office. A giant one could cruise over a park or a city. The system can construct some more building block objects to build structures and shapes with and enable them to be glued together to make structures.

The system deals with multiple objects in the same place from different layers in multiple ways—in the Main or Public view. In one example, the system can summarize them into an Orb, unless there is either <n of them, or they pay to promote. Promoted objects always appear on their own. If multiple or all of them pay they all appear outside the orb but share the location—which could involve them all rotating through the desired location, like a slow orbit. Also note an orb cannot contain only 1 object—so if there is only 1 object left in an orb, the orb goes away and the object becomes first level.

So in one example, a rule can bet, for any location, to avoid clutter if there are >20 virtual objects there, we put them into <20 Orbs (one Orb named for each layer that is represented and that has >2 virtual objects depicted, presented or posted at the location, and for any layers that only have 1 item at the location they go into an orb for Other Layers). An Orb for a layer has the icon or face for that layer on it.

For example, if you posted 5 VOBs to a location that has >20 items, an Orb would be formed for you and would contain your virtual objects; it would have your avatar or face on it, and a badge for "5". Other Orbs would group other virtual objects at the location. Except any sponsored/promoted items would appear outside their Orbs as well. You would want them to be listed inside their Orbs too so that if someone looks inside they are there as well, but they are already popped out of the Orb. So the listing of Orb contents would show them, but the state would indicate that they are already visible outside the Orb.

When objects are placed in a location on a layer, the system will present them in such a manner so as to prevent them from being right on top of each other, or overly overlapping, unless that was intentional (for example building a VOB where you want an emoticon right on the upper right corner of a billboard). When the system presents or depicts the Main or Public views, the system can move VOBs around slowly at the locations they wanted. So They are all orbiting there. There could be multiple billboards (e.g., 3 billboards) from different locations at a certain location—and in the Main or Public views, the system can present them to prevent them from overlapping in space—by orbiting or some other way. Another option would be that there is a marketplace—whoever pays the most points to promote their item gets the location, and then items where paid less are given locations near or around it. This could be a variant on the real-estate game.

When a user makes an item, there is an optional "Promote this item" field where you can pay some of your points, or buy more points, to promote it. The points you pay to promote it are somehow ticked down over time, and have to be refreshed when they run out, unless the user can assign an ongoing auto-pay budget to keep the points allotment at a certain level.

At a given location the objects can be arranged from the desired location of objects based on their points budgets. A user could look and see where their object is appearing in the scene and add more points to push it to the center position, or closer to the center, of a desired location. The distance between objects can be configured as the different in points budgets. For example, if the central object paid 100, and the next object paid 50, and then next paid 40, there would be a greater distance between object 1 and 2 than between 2 and 3.

Examples of Video Objects in Virtual and/or Augmented Reality

A further embodiment of the present disclosure includes video objects in virtual reality and/or augmented reality. One embodiment includes the ability to render or depict a video on a surface or billboard or virtual screen in a mixed reality environment. Similar to picture billboards. The virtual video screen can behave like a 2D or 3D object in the augmented reality scene. It can be a stationary virtual object at a location and the user can walk around it like a physical object. Or it can turn or orient to the user. Users can interact with it to start, stop, rewind, fast forward, mute sound, adjust volume. It can autoplay when a user is in proximity or it can loop. User may also be able to tune the virtual video screen to a channel or a particular content selection. It may also have a hide or directory or search function or playlist.

User Generated and User-Customizable 3D or 2D Virtual Objects

Further embodiments of the present disclosure include user generated and user-customizable 3d or 2d virtual objects. In one embodiment, the system/platform implements 3d or 2d virtual objects that can be user generated and/or user customized. For example, users can choose a virtual object type from a library of types or templates, and then customize it with optional text, formatting, color, fonts, design elements, shapes, borders, frames, illustrations, backgrounds, textures, movement, and other design parameters. They can also choose a template such as a 3D object for a neon sign and customize just the content of the sign in a template, or they can choose a 3D balloon and add customized text to the balloon object. User can also post their own billboards or words, audio or video onto objects.

Interactive Multidimensional Virtual Objects with Media or other Interactive Content Further embodiments of the present disclosure include interactive multidimensional virtual objects with media or other interactive content. For example, the system can further map video objects or any other interactive, static, dynamic or media content onto any 2D, 3D or multidimensional object. For example, the system supports and implements a media cube such as a video cube, sphere or another shape where each surface or face of the cube (or other shaped object) shows the same or different video/media/interactive/static/dynamic content. The cube or other shaped object face can be of any shape, (round, square, triangular, diamond, etc.). The media cube virtual object can be implemented at a larger scale in pubic arenas (e.g., times square) or concerts or sports games (e.g, jumbotron large screen technology) to for example, show zoom ins or close ups.

In one embodiment, live video, live streaming video can be depicted or streamed in real time, near real time or replay on the faces of a 2D virtual object (e.g., a billboard) a cube or on a sphere from a camera in a physical location, or from in another app, or from another platform user or any user in some specified or random location in the world. For instance, 360 degree, or panoramic, or other wide angle videos could be depicted in a spherical virtual object (e.g., like a crystal ball). In one embodiment, a user can view at the 360 degree, or panoramic, or other wide angle video from outside the video sphere. The user can further 'go into' the sphere and enter the 360 degree, or panoramic, or other wide angle in a virtual reality or augmented reality experience like video player (360 degree, or panoramic, or other wide angle video player).

Embodiments of the present disclosure include systems, methods and apparatuses of platforms (e.g., as hosted by the host server 100 as depicted in the example of FIG. 1) of shareable virtual objects and virtual objects as message objects to facilitate communications sessions in an augmented reality environment. In general, the object or virtual object is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable.

Further embodiments include, systems and methods of collaboration facilitation in an augmented reality environment. Embodiments of the present disclosure further include providing an educational experience in a real world environment, via an augmented reality platform. Embodiments of the present disclosure further include systems, methods and apparatuses to facilitate interaction with a virtual billboard associated with a physical location in the real world environment.

Further embodiments of the present disclosure further include systems, methods and apparatuses of platforms (e.g., as hosted by the host server 100 as depicted in the example of FIG. 1) to spawn a rewards object in an augmented reality platform having value to a user in the real world environment. Yet further embodiments of the present disclosure include an augmented reality commerce platform administer a marketplace which supports multiple seller entities via an augmented reality environment.

Embodiments of the present disclosure include systems, methods and apparatuses of platforms (e.g., as hosted by the host server 100 as depicted in the example of FIG. 1) for deployment and targeting of context-aware virtual objects and/or behavior modeling of virtual objects based on physical laws or principle. Further embodiments relate to how interactive virtual objects that correspond to content or physical objects in the physical world are detected and/or generated, and how users can then interact with those virtual objects, and/or the behavioral characteristics of the virtual objects, and how they can be modeled. Embodiments of the present disclosure further include processes that augmented reality data (such as a label or name or other data) with media content, media content segments (digital, analog, or physical) or physical objects. Yet further embodiments of the present disclosure include a platform (e.g., as hosted by the host server 100 as depicted in the example of FIG. 1) to provide an augmented reality (AR) workspace in a physical space, where a virtual object can be rendered as a user interface element of the AR workspace.

Embodiments of the present disclosure further include systems, methods and apparatuses of platforms (e.g., as hosted by the host server 100 as depicted in the example of FIG. 1) for managing and facilitating transactions or other activities associated with virtual real-estate (e.g., or digital real-estate). In general, the virtual or digital real-estate is associated with physical locations in the real world. The platform facilitates monetization and trading of a portion or portions of virtual spaces or virtual layers (e.g., virtual real-estate) of an augmented reality (AR) environment (e.g., alternate reality environment, mixed reality (MR) environment) or virtual reality VR environment.

In an augmented reality environment (AR environment), scenes or images of the physical world is depicted with a virtual world that appears to a human user, as being superimposed or overlaid of the physical world. Augmented reality enabled technology and devices can therefore facilitate and enable various types of activities with respect to and within virtual locations in the virtual world. Due to the inter connectivity and relationships between the physical world and the virtual world in the augmented reality environment, activities in the virtual world can drive traffic to the corresponding locations in the physical world. Similarly, content or virtual objects (VOBs) associated with busier physical locations or placed at certain locations (e.g., eye level versus other levels) will likely have a larger potential audience.

By virtual of the inter-relationship and connections between virtual spaces and real world locations enabled by or driven by AR, just as there is a value to real-estate in the real world locations, there can be inherent value or values for the corresponding virtual real-estate in the virtual spaces. For example, an entity who is a right holder (e.g., owner, renter, sub-lettor, licensor) or is otherwise associated a region of virtual real-estate can control what virtual objects can be placed into that virtual real-estate.

The entity that is the rightholder of the virtual real-state can control the content or objects (e.g., virtual objects) that can be placed in it, by whom, for how long, etc. As such, the disclosed technology includes a marketplace (e.g., as run by server 100 of FIG. 1) to facilitate exchange of virtual real-estate (VRE) such that entities can control object or content placement to a virtual space that is associated with a physical space.

Embodiments of the present disclosure further include systems, methods and apparatuses of seamless integration of augmented, alternate, virtual, and/or mixed realities with physical realities for enhancement of web, mobile and/or other digital experiences. Embodiments of the present disclosure further include systems, methods and apparatuses to facilitate physical and non-physical interaction/action/reactions between alternate realities. Embodiments of the present disclosure also systems, methods and apparatuses of multidimensional mapping of universal locations or location ranges for alternate or augmented digital experiences. Yet further embodiments of the present disclosure include systems, methods and apparatuses to create real world value and demand for virtual spaces via an alternate reality environment.

The disclosed platform enables and facilitates authoring, discovering, and/or interacting with virtual objects (VOBs). One example embodiment includes a system and a platform that can facilitate human interaction or engagement with virtual objects (hereinafter, 'VOB,' or 'VOBs') in a digital realm (e.g., an augmented reality environment (AR), an alternate reality environment (AR), a mixed reality environment (MR) or a virtual reality environment (VR)). The human interactions or engagements with VOBs in or via the disclosed environment can be integrated with and bring utility to everyday lives through integration, enhancement or optimization of our digital activities such as web browsing, digital (online, or mobile shopping) shopping, socializing (e.g., social networking, sharing of digital content, maintaining photos, videos, other multimedia content), digital communications (e.g., messaging, emails, SMS, mobile communication channels, etc.), business activities (e.g., document management, document procession), business processes (e.g., IT, HR, security, etc.), transportation, travel, etc.

The disclosed innovation provides another dimension to digital activities through integration with the real world environment and real world contexts to enhance utility, usability, relevancy, and/or entertainment or vanity value through optimized contextual, social, spatial, temporal awareness and relevancy. In general, the virtual objects depicted via the disclosed system and platform. can be contextually (e.g., temporally, spatially, socially, user-specific, etc.) relevant and/or contextually aware. Specifically, the virtual objects can have attributes that are associated with or relevant real world places, real world events, humans, real world entities, real world things, real world objects, real world concepts and/or times of the physical world, and thus its deployment as an augmentation of a digital experience provides additional real life utility.

Note that in some instances, VOBs can be geographically, spatially and/or socially relevant and/or further possess real life utility. In accordance with embodiments of the present disclosure, VOBs can be or appear to be random in appearance or representation with little to no real world relation and have little to marginal utility in the real world. It is possible that the same VOB can appear random or of little use to one human user while being relevant in one or more ways to another user in the AR environment or platform.

The disclosed platform enables users to interact with VOBs and deployed environments using any device (e.g., devices 102A-N in the example of FIG. 1), including by way of example, computers, PDAs, phones, mobile phones, tablets, head mounted devices, goggles, smart watches, monocles, smart lens, smart watches and other smart apparel (e.g., smart shoes, smart clothing), and any other smart devices.

In one embodiment, the disclosed platform includes an information and content in a space similar to the World Wide Web for the physical world. The information and content can be represented in 3D and or have 360 or near 360 degree views. The information and content can be linked to one another by way of resource identifiers or locators. The host server (e.g., host server 100 as depicted in the example of FIG. 1) can provide a browser, a hosted server, and a search engine, for this new Web.

Embodiments of the disclosed platform enables content (e.g., VOBs, third party applications, AR-enabled applications, or other objects) to be created and placed into layers (e.g., components of the virtual world, namespaces, virtual world components, digital namespaces, etc.) that overlay geographic locations by anyone, and focused around a layer that has the highest number of audience (e.g., a public layer). The public layer can in some instances, be the main discovery mechanism and source for advertising venue for monetizing the disclosed platform.

In one embodiment, the disclosed platform includes a virtual world that exists in another dimension superimposed on the physical world. Users can perceive, observe, access, engage with or otherwise interact with this virtual world via a user interface (e.g., user interface 104A-N as depicted in the example of FIG. 1) of client application (e.g., accessed via using a user device, such as devices 102A-N as illustrated in the example of FIG. 1).

One embodiment of the present disclosure includes a consumer or client application component (e.g., as deployed on user devices, such as user devices 102A-N as depicted in the example of FIG. 1) which is able to provide geo-contextual awareness to human users of the AR environment and platform. The client application can sense, detect or recognize virtual objects and/or other human users, actors, non-player characters or any other human or computer participants that are within range of their physical location, and can enable the users to observe, view, act, interact, react with respect to the VOBs.

Furthermore, embodiments of the present disclosure further include an enterprise application (which can be desktop, mobile or browser based application). In this case, retailers, advertisers, merchants or third party e-commerce platforms/sites/providers can access the disclosed platform through the enterprise application which enables management of paid advertising campaigns deployed via the platform.

Users (e.g., users 116A-N of FIG. 1) can access the client application which connects to the host platform (e.g., as hosted by the host server 100 as depicted in the example of FIG. 1). The client application enables users (e.g., users 116A-N of FIG. 1) to sense and interact with virtual objects ("VOBs") and other users ("Users"), actors, non-player characters, players, or other participants of the platform. The VOBs can be marked or tagged (by QR code, other bar codes, or image markers) for detection by the client application.

One example of an AR environment deployed by the host (e.g., the host server 100 as depicted in the example of FIG. 1) enables users to interact with virtual objects (VOBs) or applications related to shopping and retail in the physical world or online/e-commerce or mobile commerce. Retailers, merchants, commerce/e-commerce platforms, classified ad systems, and other advertisers will be able to pay to promote virtual objects representing coupons and gift cards in physical locations near or within their stores. Retailers can benefit because the disclosed platform provides a new way to get people into physical stores. For example, this can be a way to offer VOBs can are or function as coupons and gift cards that are available or valid at certain locations and times.

Additional environments that the platform can deploy, facilitate, or augment can include for example AR-enabled games, collaboration, education environment, marketplaces, public information, education, tourism, travel, dining, entertainment etc.

The seamless integration of real, augmented and virtual for physical places/locations in the universe is a differentiator. In addition to augmenting the world, the disclosed system also enables an open number of additional dimensions to be layered over it and, some of them exist in different spectra or astral planes. The digital dimensions can include virtual worlds that can appear different from the physical world. Note that any point in the physical world can index to layers of virtual worlds or virtual world components at that point. The platform can enable layers that allow non-physical interactions.

FIG. 1 illustrates an example block diagram of a host server 100 able to deploy virtual objects for various applications, digital assistants in an augmented reality environment and to facilitate local determination of virtual object placement in the augmented reality environment, in accordance with embodiments of the present disclosure.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102A-N can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaining device or console, an iPhone, a wearable device, a head mounted device, a smart watch, a goggle, a smart glasses, a smart contact lens, a mirror, a smart mirror, a single directional lens, a multi directional lens, a transparent display, and/or any other portable, mobile, hand held devices, etc. The input mechanism on client devices 102A-N can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), eye tracking, eye detection, pupil tracking/detection, or a combination of the above.

The client devices 102A-N, application publisher/developer 108A-N, its respective networks of users, a third party content provider 112, and/or promotional content server 114, can be coupled to the network 106 and/or multiple networks. In some embodiments, the devices 102A-N and host server 100 may be directly connected to one another. The alternate, augmented reality network provided or developed by the application publisher/developer 108A-N can include any digital, online, web-based and/or mobile based environments including enterprise applications, entertainment, games, social networking, e-commerce, search, browsing, discovery, messaging, chatting, and/or any other types of activities (e.g., network-enabled activities).

In one embodiment, the host server 100 is operable to deploy digital assistants in an augmented reality environment (e.g., as depicted or deployed via user devices 102A-N). The host server 100 can deploy shareable virtual objects and virtual objects as message objects for presentation to a user 116A-N via a user device 102A-N. The host server 100 can further provide virtual billboarding and collaboration facilitation in an augmented reality environment by users 116a-n. The host server 100 can also facilitate local determination of virtual object placement in the augmented reality environment.

In one embodiment, the disclosed framework includes systems and processes for enhancing the web and its features with augmented reality. Example components of the framework can include:

- Browser (mobile browser, mobile app, web browser, etc.)
- Servers and namespaces the host (e.g., host server 100 can host the servers and namespaces. The content (e.g, VOBs, any other digital object), applications running on, with, or integrated with the disclosed platform can be created by others (e.g., third party content provider 112, promotions content server 114 and/or application publisher/developers 108A-N, etc.).
- Advertising system (e.g., the host server 100 can run an advertisement/promotions engine through the platform and any or all deployed augmented reality, alternate reality, mixed reality or virtual reality environments)
- Commerce (e.g., the host server 100 can facilitate transactions in the network deployed via any or all deployed augmented reality, alternate reality, mixed reality or virtual reality environments and receive a cut. A digital token or digital currency (e.g., crypto currency) specific to the platform hosted by the host server 100 can also be provided or made available to users.)
- Search and discovery (e.g., the host server 100 can facilitate search, discovery or search in the network deployed via any or all deployed augmented reality, alternate reality, mixed reality or virtual reality environments)
- Identities and relationships (e.g., the host server 100 can facilitate social activities, track identifies, manage, monitor, track and record activities and relationships between users 116A).

Figure 3A:
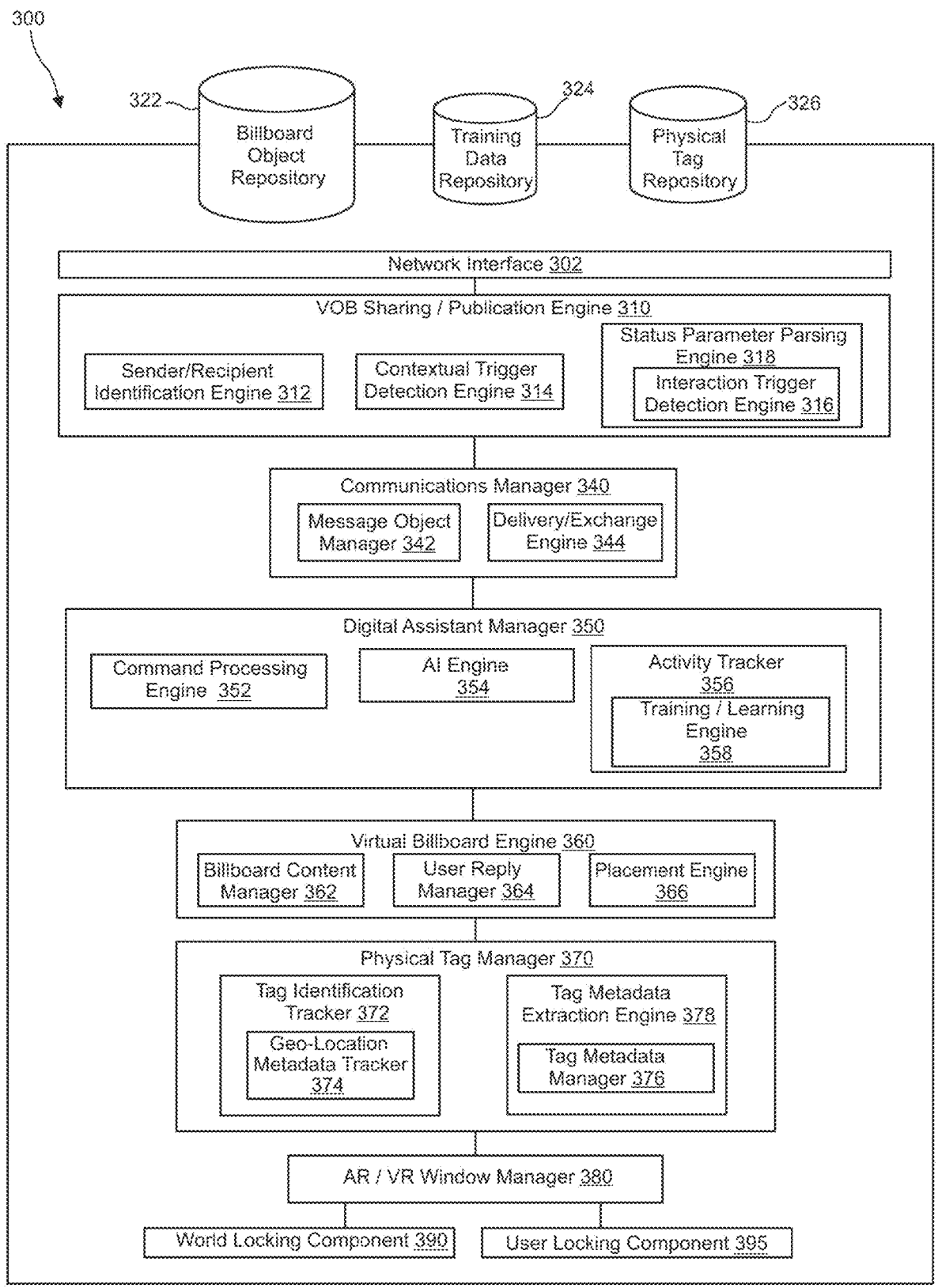
FIG. 3A depicts an example functional block diagram of a host server that deploys and administers virtual objects for various disclosed applications, digital assistants in an augmented reality environment and to facilitate local determination of virtual object placement in the augmented reality environment, in accordance with embodiments of the present disclosure.
Figure 3B:
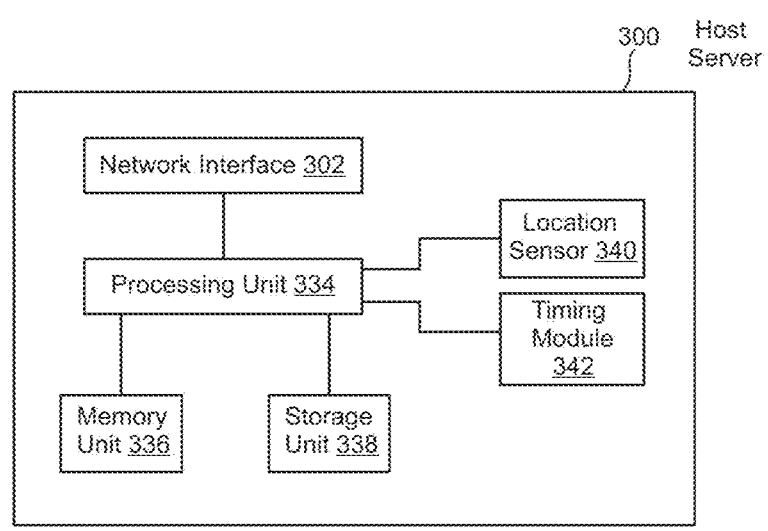
FIG. 3B depicts an example block diagram illustrating the components of the host server that deploys and administers virtual objects for various disclosed applications, digital assistants in an augmented reality environment and to facilitate local determination of virtual object placement in the augmented reality environment, in accordance with embodiments of the present disclosure

Functions and techniques performed by the host server 100 and the components therein are described in detail with further references to the examples of FIG. 3A-3B.

In general, network 106, over which the client devices 102A-N, the host server 100, and/or various application publisher/provider 108A-N, content server/provider 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102A-N and the host server 100 and may appear as one or more networks to the serviced systems and devices. In one embodiment, communications to and from the client devices 102A-N can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, 5G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 128, a virtual object repository 130, a tag metadata repository 126, a digital assistant avatar repository 124, a physical space geometry repository 122 and/or a training data repository 132. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., Concept- Base, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to generate, create and/or provide data to be stored in the user repository 128, the virtual object (VOB) repository 130, the tag metadata repository 126, the digital assistant avatar repository 124, the physical space geometry repository 122 and/or the training data repository 132. The user repository 128 can store user information, user profile information, demographics information, analytics, statistics regarding human users, user interaction, brands advertisers, virtual object (or 'VOBs'), access of VOBs, usage statistics of VOBs, ROI of VOBs, etc.

The virtual object repository 130 can store virtual objects and any or all copies of virtual objects. The VOB repository 130 can store virtual content or VOBs that can be retrieved for consumption in a target environment, where the virtual content or VOBs are contextually relevant. The VOB repository 130 can also include data which can be used to generate (e.g., generated in part or in whole by the host server 100 and/or locally at a client device 102A-N) contextually-relevant or aware virtual content or VOB(s).

The digital assistant avatar repository 124 can store virtual objects representing digital assistants and their avatars, and any or all copies of the digital assistants and avatars. The digital assistant avatar repository 124 can store virtual content or digital assistant avatars that can be retrieved for consumption or deployment in a target environment, where the virtual content or digital assistant avatars are contextually relevant, required, or requested. The digital assistant avatar repository 124 can also include data which can be used to generate (e.g., generated in part or in whole by the host server 100 and/or locally at a client device 102A-N) contextually-relevant or aware digital assistants and/or digital assistant avatars.

The training data repository 132 can store the training, behavorial and/or activity data for the training/machine learning of digital assistants in AR environments. The training data can include data from AR environments, virtual objects, user behavior, user activity in the real world and/or AR environment, and/or activities in the real world. In general the training data can include any information aggregated to build or enhance the neural network of digital assistants to optimize its performance and customization for any given user, a group of users, a subset of users or multiple users.

The physical space geometry metadata repository 122 is able to store metadata of crowdsourced information regarding physical spaces. Perspectives, views, images, of indoors and/or outdoors physical spaces can be stored in the repository 122. Moreover, geometry, shape, size, dimension data of physical spaces around the world can be stored in repository 122. The repository 122 can also store various tags (e.g., user tags, machine tags) and metadata regarding physical spaces in the real world environment, The tag metadata repository 126 is able to store metadata of physical tags used for high precision location identification in a physical location. The tag metadata can include location metadata, a location, content, guest list, user list associated with. Tag metadata can also indicate size of tag, material of tag, dimensions of tag, types of surfaces suited to attach the tag to. Tag metadata may also indicate compatible devices or suitable optical technologies able to read or interpret the physical tag.

Figure 2A:
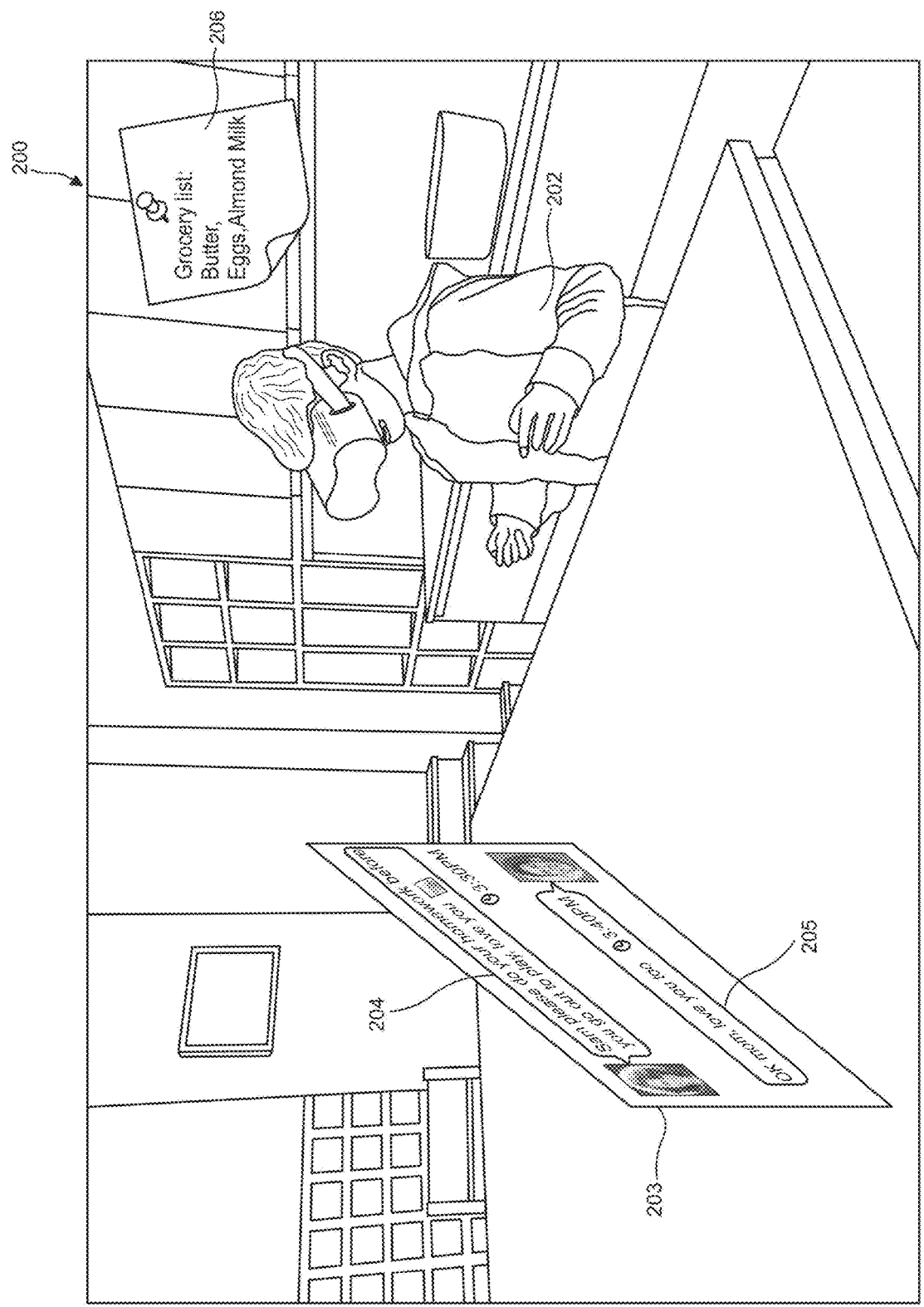
FIG. 2A depicts an example diagram showing an example of a virtual object to facilitate an augmented reality experience including a communications session and an example of a virtual object which includes a shareable note in an augmented reality environment, in accordance with embodiments of the present disclosure.

FIG. 2A depicts an example diagram showing an example of a virtual object 203 to facilitate an augmented reality experience including a communications session and an example of a virtual object 206 which includes a shareable note in an augmented reality environment 200, in accordance with embodiments of the present disclosure.

In the augmented reality environment 200, the son Sam 202 is interacting with the virtual object 203 in his home in his kitchen. The virtual object 203 is, in this example a message object which depicts a message 204 having user generated content. The message 204, for example, includes a note or text from Sam's mom reminding Sam do finish his homework. Note that the message 204 can be sent from mom to Sam at 330 pm in the afternoon and depicted in the VOB 203 when it was sent. The message 204 could also have been preconfigured by mom to appear in the afternoon at 330 pm (e.g., on certain days of the week or each week day afternoon) in the kitchen or wherever Sam is at or around that time.

Sam can also respond to mom's message 204 with a reply 205 in a message object. Note that the message object 203 can also be perceptible or visible to other users at the same or different physical locations. For example, dad who is in the office in the afternoon, may also see mom's message 204 and/or Sam's response 205, Note that Sam can view the VOB 203 through any device (e.g., a headmounted device as illustrated), a mobile phone, or without any devices. The augmented reality environment 200, in this example, also includes a virtual object 206 which is a note associated with a place in the kitchen. The note object can be set to be shown or be perceptible to certain users (e.g., sister Joan or Dad) and/or at certain times to Joan and other times to Dad.

Embodiments of VOB messaging can include sending a message object to a recipient User (e.g., Sam) and it appears in Augmented or Virtual Reality as a VOB. Sam can then respond/reply with text or with text in a VOB. This process can start a VOB communication chain or message thread, for example. In one embodiment, VOBs can be used as Asynchronous messaging objects. Embodiments of the present disclosure include an AR environment having a messaging user interface (e.g., integrated).

In a further embodiment, a relationship in the AR environment, can be initiated for example through a lens and channel feature in a user interface of the AR environment. Through the lens or channel features, users can participate in a private AR interaction (e.g. AR Chatroom). The system can enable adding more people to form groups, and further enable/allow sharing with anyone or everyone. For example, a user group can function as a mailing list in augmented reality with augmented reality features.

A further embodiment of the present disclosure includes avatar-based messaging in an augmented reality environment. For example, a user Tom can send a VOB to the avatar associated with another user Jess. The VOB can include, for example, a message, in text, a text bubble, sound, music or other audio content. Users (e.g., user Jess) can could dress up their avatar or take actions or perform operations to enhance its features, ability, visibility, popularity in the AR environment.

In one embodiment, avatars can appear in an AR environment, for example, in or around the space of a user for instance, as loop or as a recording. Avatars can take on actions or operations in the AR environment. For example, avatars can moving around in circles, in a space, as it is trying to get attention. The avatar can also possess steady state form, shape, animation, or behavior that is present or perceptible before it is activated. Steady state form, shape, animation, or behavior can include a glow, a vibration movement, a pulsating movement, a halo, a cloud, a frame, an outline of the avatar, a color, background sounds or music, a tone, text showing an object exists, an animation, etc. The steady state form, shape, animation, or behavior can be present before the avatar itself is perceptible and can exist to indicate the presence of the avatar. When an avatar is interacted with, the avatar can for example performance/action/routine, depict some AR features and/or vend some information or associated content.

The augmented reality features associated with an avatar, can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

In general, the content associated with the virtual object which may be an avatar can include a text message, a post, a chat, a conversation or a graphical message. The content associated with the virtual object can also include digital stickers, GIFs, digital tattoos, emoticons, animations, videos, clips, games, photos, images, a 3D scene or an animated 3D object, music, sound, tone, ultrasonic, or other audible content. The content associated with the virtual object can also include one or more of, works of art, animation, games, scenes, limericks, jokes, a performance, an action, a routine which can be rendered or played in 360 degrees or 3D.

The interaction with the avatar can be initiated by voice, touch, eye, gaze, gesture (body, hand, head, arms, legs, limbs, eyes, torso, etc.), text input and/or other command submitted by a user with respect to the object. For example, a voice command can be used to input a reply to system generated content or user generated content. The interaction can also be initiated through input text, or gestured to specify the text. The interaction can also include a reply to a virtual object where the reply can include emoticon, GIFs, stickers, multimedia content or other attachments. Voice command can also be used to specify attachments or identify other content to be included in an interaction with, action on or in a reply to the VOB. The action, interaction or reply can include another VOB or multiple other VOBs including or without other types of content. Any combination of the above input can be used to interact with and/or respond to the avatar. A user can reply to a VOB with another VOB, comment, or avatar or emoticon etc.

One embodiment includes, sending a virtual object (VOB) as a message.

For example, the VOB appears in the recipient's inbox, message stream, or device as a 3D object that can be interacted with (open it, talk to it, touch it or play with it, read it share it, reply to it, file it, publish it, edit it, customize it, tag it or annotate it etc). The recipient's inbox can include a 2D or 3D interface (list, plane, 3D space). The VOB can be set to appear at a fixed distance relative to or near the user, and/or at specific times, and/or within or near specified geolocations or named places, and/or in specified contexts (shopping, working, at home). In general, VOBs can function like messages that have one or more recipients like email (to, CC, Bcc) and can also be shared with groups or made public, tagged or pinned to the top or a certain location in an interface. VOBs can also carry envelope metadata (e.g. created date, sent date, received date, etc). A thread of related VOB messages is a conversation that uses VOBs as the medium.

Embodiments of the present disclosure further include systems, methods and apparatuses of: creating, rendering, depicting, provisioning, and/or generating message objects with digital enhancements. The enhanced messages can include virtual and/or augmented reality features. The enhanced messages can further be rendered, accessed, transmitted, manipulated, acted on and/or otherwise interacted with via various networks in digital environments by or amongst users, real or digital entities, other simulated/virtual objects or computing systems including any virtual reality (VR), non-virtual reality, augmented reality (AR) and/or mixed reality (mixed AR, VR and/or reality) environments or platforms. For instance, enhanced messages can be shared, transmitted or sent/received via communication channels including legacy SMS, Internet, mobile network via web services, applications (e.g., mobile apps) or dedicated platforms such as VR/AR or mixed VR/AR platforms or environments.

In one embodiment, a user drafts, writes or composes a message having augmented reality ("AR") content. The AR content can include one or more virtual objects. A virtual object can include a 2D or 3D graphical rendering, which can include one or more of: text, images, audio, video, or computer graphics animation. The virtual object can appear and be accessed (preview, view, shared, edited, modified), acted on and/or interacted with via an imaging device such as a smartphone camera, wearable device such as an augmented reality (AR) or virtual reality (VR) headset, gaming consoles, any wearable technology, AR glasses, wearable smart watch, wearable computer, heads up display, advanced textiles, smart garments, smart shoes, smart helmets, activity trackers, in car display or in car navigation panel or unit, etc.).

The message can be for instance, supplemented, formatted, optimized or designed with additional text, graphical content, multimedia content, and/or simulated objects or virtual objects. The user can place the enhanced messages (or any of the simulated or virtual objects) in physical locations relative to their device, and/or also relative to other virtual objects or simulated objects in the scene to construct a scene relative to a user view or the user's camera perspective. In one example, if a user places a virtual object visually in front of their physical position, the virtual or simulated object can be saved to that physical position or near that physical position or within a range of the physical location. The user can also place and save the object for example, at any angle e.g., 10 degrees to the right of their front position. If placed at a particular angle, and/or size and/or swivel the virtual object, it can be saved in that particular relative location and orientation. The user can also turn around and place it behind themselves and then turn forward again, before sending the message, then it can then save that virtual object or simulated object as being behind them.

In one embodiment, the user can further select, identify or specify recipients of for the message. For example, the Recipients can be from existing contacts lists, or can be added as new contacts and/or individuals or named groups or lists of individuals. Note that a recipient need not be a single person. For instance, a recipient can be an AR enabled chatroom, group or mailing list An AR enabled chatroom, group or mailing list can be associated with a name and/or address. It may also have policies and permissions governing who is the admin, what other roles exist and what their access, preview, view, edit, delete, enhance, sharing, read/write/invite permissions are. In one embodiment, an AR enabled chatroom or group is or includes a shared social space where AR messages (e.g., enhanced messages) that are sent to the chatroom or group can be updated synchronously and/or asynchronously to all the recipients. This enables a real-time or near-real-time or asynchronous AR experience for the participants. In some instances, posting AR content to the chatroom or group can be equivalent to sending an AR message to the members of the group or chatroom.

According to embodiments of the present disclosure, a user sends a message (e.g., the enhanced message) to recipients and the message can be transmitted to recipients. The recipients can be notified that they have received an AR message or that a system has received a message intended for them. If recipients are members of a group that is the recipient or intended recipient, then a group notification can be sent to individual members of the group. Recipients can be notified with a text message, social invite on Facebook or Twitter or another social network, a message in a chatroom, an email message, or a notification on their phone, or a notification in a particular messaging or other type of mobile, desktop or enterprise/Web app.

In some embodiments, individual recipients can open the AR message to access, preview or view its content. The relevant application can also automatically open to access the message. For example, by clicking on or otherwise selecting the notification, the AR message can be acted on or interacted with. For example, the AR message can be opened and rendered in the appropriate application or reader for display or further action or interaction. Identifiers for an application or plug-in used to display, present or depict it can be conveyed or included in metadata in the notification, or it can be implicit in the type of notification or channel that the notification is sent through and received in. The AR application that detects or receives and renders the message can depict or display the content of the message appropriately. In particular, virtual objects or simulated objects that were placed into relative positions around the sender can be rendered in the same relative positions around the receiver.

If the sender places a virtual/simulated object, or set of objects, in front of their camera when they composed the message, then those objects can appear in front of the recipient's camera in the same relative positions that the sender intended. If a user puts a virtual object behind themselves, the virtual object can also be behind the receiver when they receive the AR message and the receiver can then turn around and see the virtual object behind them in that case. In addition, individual recipients can perform social actions on a received AR message, based on the policies and permissions of the application they use to receive it and/or the metadata on the message itself. They can also reply to an AR message with another AR message. They may reply to an AR message with a new AR message, or a non-AR message. With proper permissions and/or upon meeting certain criteria, users or recipients can modify an AR message to be stored, posted publicly/privately and/or sent in reply or forwarded to another user or group of users.

In an event when an AR message is configured to allow modifications, certain (or any) recipients can add modifications such as additional virtual objects, to the AR message, and these modifications can be added to the original Message and the sender and any/all other recipients of the AR message will also get these updates. Revisions to the original message can be stored so users can roll back to or view any of the previous versions. In other words, an AR message can be configured to be a collaborative object that can be modified on an ongoing basis by the sender and any/all recipients such that they can collaboratively add to, interact with or act on the content of the message. Modifications to an AR message can be subject to permissions, criterion and/or policies such as moderation approval by the sender or an admin.

In some embodiments, users can forward an AR message to other recipients Forwarding an AR message sends it to other recipients with forwarding metadata in the header of the message. They can comment on the AR message. A comment can be or include by way of example, text, document, message, emoji, emoticon, a gif, audio or video, that appears on an associated comments thread which can be non AR based or AR based. A comment can also be created and rendered as an AR comment object or part of an AR comments digest object that is associated with the AR message. Users can save, tag, flag, delete, archive, rate, like, mark as spam, apply rules or filters, file into a folder, and perform other actions activities on or interact AR messages that are similar to the activities that can be performed on email, text messages or other digital objects rendered in a digital environment.

Embodiments of the present disclosure further include systems, methods and apparatuses of: creating, rendering, depicting, provisioning, and/or generating message objects (e.g., VOBs, virtual objects, AR messages, etc.) with digital enhancements. The enhanced messages can include virtual and/or augmented reality features. The enhanced messages can further be rendered, accessed, transmitted, manipulated, acted on and/or otherwise interacted with via various networks in digital environments by or amongst users, real or digital entities, other simulated/virtual objects or computing systems including any virtual reality (VR), non-virtual reality, augmented reality (AR) and/or mixed reality (mixed AR, VR and/or reality) environments or platforms. For instance, enhanced messages can be shared, transmitted or sent/received via communication channels including legacy SMS, Internet, mobile network via web services, applications (e.g., mobile apps) or dedicated platforms such as VR/AR or mixed VR/AR platforms or environments.

In one embodiment, a user drafts, writes or composes a message having augmented reality (AR) content. The AR content can include one or more virtual objects. For example, a virtual object can include a 2D or 3D graphical rendering, which can include one or more of: text, images, audio, video, or computer graphics animation. The virtual object can appear and be accessed (preview, view, shared, edited, modified), acted on and/or interacted with via an imaging device such as a smartphone camera, wearable device such as an augmented reality (AR) or virtual reality (VR) headset, gaming consoles, any wearable technology, AR glasses, wearable smart watch, wearable computer, heads up display, advanced textiles, smart garments, smart shoes, smart helmets, activity trackers, in car display or in car navigation panel or unit, etc.). The message can be for instance, supplemented, formatted, optimized or designed with additional text, graphical content, multimedia content, and/or simulated objects or virtual objects. The user can place the enhanced messages (or any of the simulated or virtual objects) in physical locations relative to their device, and/or also relative to other virtual objects or simulated objects in the scene to construct a scene relative to the user's camera perspective.

In one example, if a user places a virtual object visually in front of their physical position, the virtual or simulated object can be saved to that physical position or near that physical position or within a range of the physical location. The user can also place and save the object for example, at any angle e.g., 10 degrees to the right of their front position. If placed at a particular angle, and/or size and/or swivel the virtual object, it can be saved in that particular relative location and orientation. The user can also turn around and place it behind themselves and then turn forward again, before sending the message, then it can then save that virtual object or simulated object as being behind them.

In one embodiment, the user can further select, identify or specify recipients of for the message. For example, the Recipients can be from existing contacts lists, or can be added as new contacts and/or individuals or named groups or lists of individuals. Note that a recipient need not be a single person. For instance, a recipient can be an AR enabled chatroom, group or mailing list An AR enabled chatroom, group or mailing list can be associated with a name and/or address. It may also have policies and permissions governing who is the admin, what other roles exist and what their access, preview, view, edit, delete, enhance, sharing, read/write/invite permissions are. In one embodiment, an AR enabled chatroom or group is or includes a shared social space where AR messages (e.g., enhanced messages) that are sent to the chatroom or group can be updated synchronously and/or asynchronously to all the recipients. This enables a real-time or near-real-time or asynchronous AR experience for the participants. In some instances, posting AR content to the chatroom or group can be equivalent to sending an AR message to the members of the group or chatroom.

According to further embodiments of the present disclosure, a user sends a message (e.g., the enhanced message) to recipients and the message can be transmitted to recipients. The recipients can be notified that they have received an AR message or that a system has received a message intended for them. If recipients are members of a group that is the recipient or intended recipient, then a group notification can be sent to individual members of the group. Recipients can be notified with a text message, social invite on Facebook or Twitter or another social network, a message in a chatroom, an email message, or a notification on their phone, or a notification in a particular messaging or other type of mobile, desktop or enterprise/Web app.

In some embodiments, individual recipients can open the AR message to access, preview or view its content. The relevant application can also automatically open to access the message. For example, by clicking on or otherwise selecting the notification, the AR message can be acted on or interacted with. For example, the AR message can be opened and rendered in the appropriate application or reader for display or further action or interaction. Identifiers for an application or plug-in used to display, present or depict it can be conveyed or included in metadata in the notification, or it can be implicit in the type of notification or channel that the notification is sent through and received in. The AR application that detects or receives and renders the message can depict or display the content of the message appropriately. In particular, virtual objects or simulated objects that were placed into relative positions around the sender can be rendered in the same relative positions around the receiver. If the sender places a virtual/simulated object, or set of objects, in front of their camera when they composed the message, then those objects can appear in front of the recipient's camera in the same relative positions that the sender intended. If a user puts a virtual object behind themselves, the virtual object can also be behind the receiver when they receive the AR message and the receiver can then turn around and see the virtual object behind them in that case.

In addition, individual recipients can perform social actions on a received AR message, based on the policies and permissions of the application they use to receive it and/or the metadata on the message itself. They can also reply to an AR message with another AR message. They may reply to an AR message with a new AR message, or a non-AR message. With proper permissions and/or upon meeting certain criteria, users or recipients can modify an AR message to be stored, posted publicly/privately and/or sent in reply or forwarded to another user or group of users.

In an event when an AR message is configured to allow modifications, certain (or any) recipients can add modifications such as additional virtual objects, to the AR message, and these modifications can be added to the original Message and the sender and any/all other recipients of the AR message will also get these updates. Revisions to the original message can be stored so users can roll back to or view any of the previous versions. An AR message can be configured to be a collaborative object that can be modified on an ongoing basis by the sender and any/all recipients such that they can collaboratively add to, interact with or act on the content of the message. Modifications to an AR message can be subject to permissions, criterion and/or policies such as moderation approval by the sender or an admin.

In some embodiments, users can forward an AR message to other recipients Forwarding an AR message sends it to other recipients with forwarding metadata in the header of the message. They can comment on the AR message. A comment can be or include by way of example, text, document, message, emoji, emoticon, a gif, audio or video, that appears on an associated comments thread which can be non AR based or AR based. A comment can also be created and rendered as an AR comment object or part of an AR comments digest object that is associated with the AR message. Users can save, tag, flag, delete, archive, rate, like, mark as spam, apply rules or filters, file into a folder, and perform other actions activities on or interact AR messages that are similar to the activities that can be performed on email, text messages or other digital objects rendered in a digital environment.

Figure 2B:
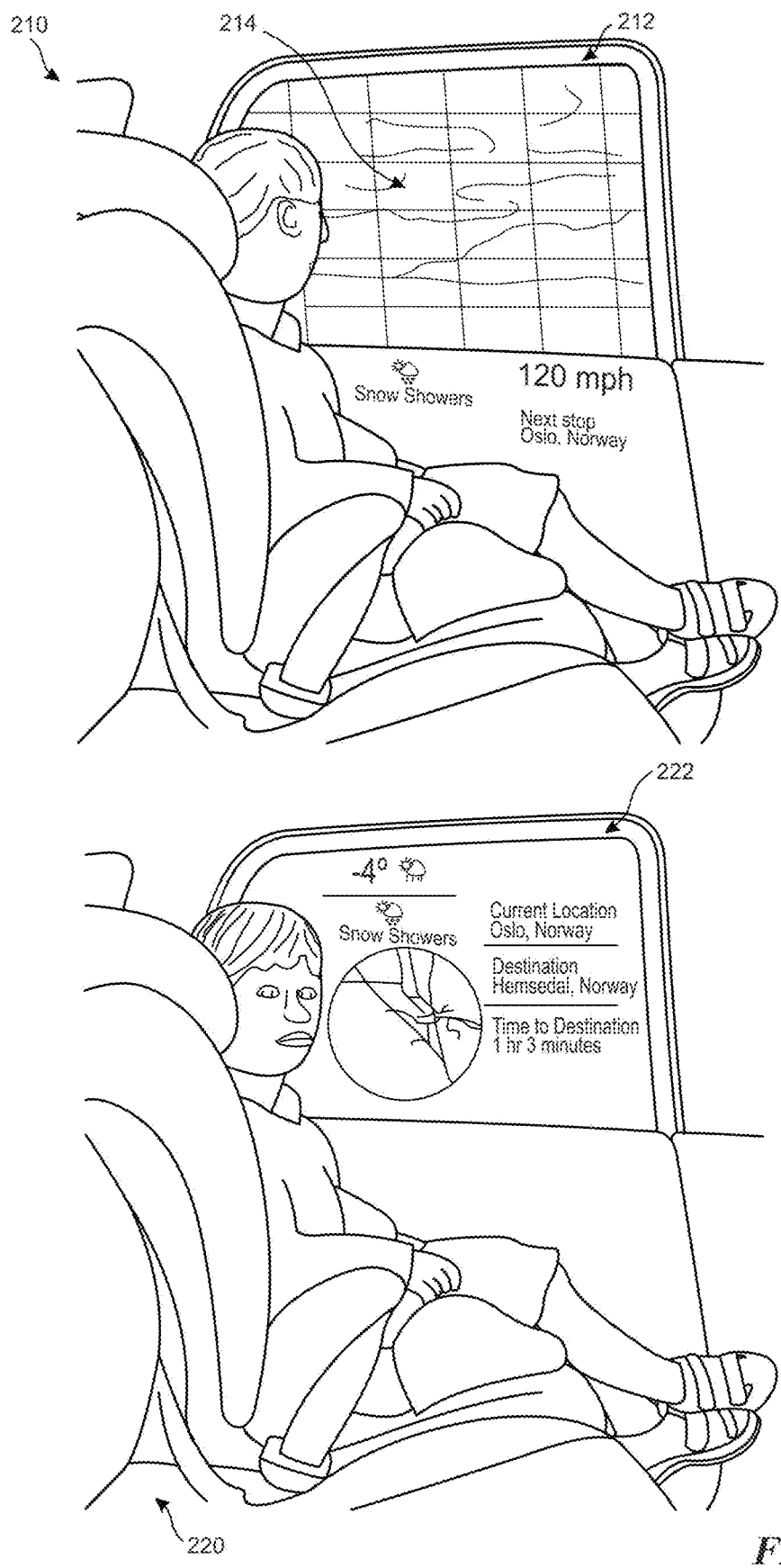
FIG. 2B depicts an example diagram illustrating single or multi-directional lens as portals between a physical world and a digital world component of an augmented reality environment, in accordance with embodiments of the present disclosure.

FIG. 2B depicts an example diagram illustrating single or multi-directional lens 212 and 214 as portals 214 between a physical world and a digital world component of an augmented reality environment, in accordance with embodiments of the present disclosure.

The example single or multi-directional lens 212 and 214 can be AR/VR windows which overlay digital content over a real world environment. The lens (e.g. displays, windows, mirrors, etc.) illustrated in the example are installed in the windows of a vehicle or train for instance. The lens 212 and 214 can display various information about the journey, destination or origin information. The lens can also depict various AR content, AR object over the current real world environment scene 214 that is visible outside of the window.

Figure 2C:
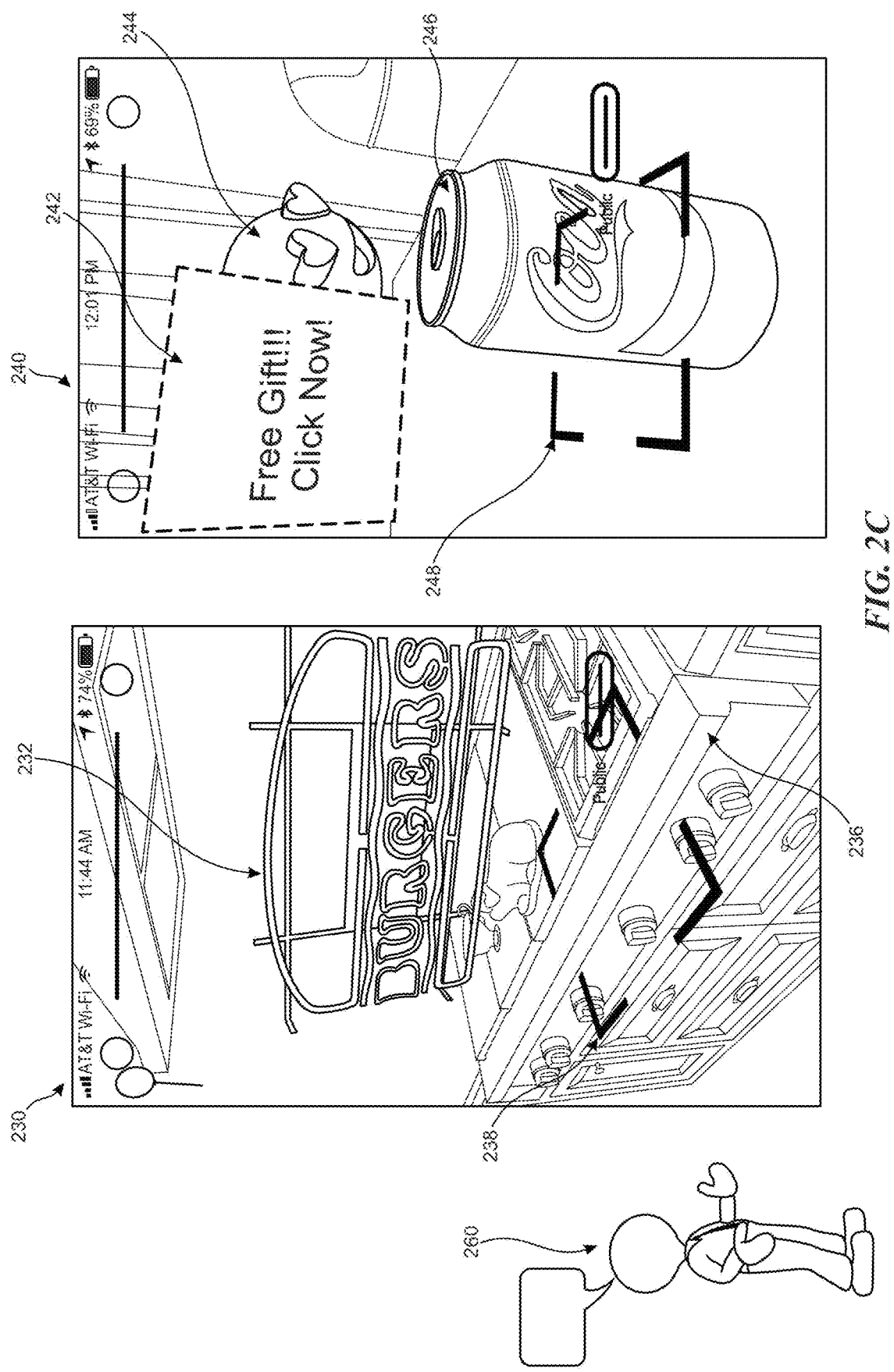
FIG. 2C depict examples of virtual billboard objects posted in an augmented reality environment along with a digital assistant 260, in accordance with embodiments of the present disclosure.

FIG. 2C depict examples of virtual billboard objects posted in an augmented reality environment along with a digital assistant 260, in accordance with embodiments of the present disclosure.

For example, a virtual object (e.g. virtual billboard 242) can be rendered near the cola bottle 246 in the real world environment. The virtual billboard 242 can for example, include promotional text or an advertisement prompting a user to click on it for a gift. Another virtual object 244 is depicted in the AR environment 240 as well. The virtual billboard 242 can be associated with the cola bottle 246 and scheduled to appear at specific times and/or for specific users. The virtual billboard 242 can also appear when the cursor or marker 248 points to the cola bottle 246.

One embodiment of the user interface to the AR environment 230 or 240 depicts a digital assistant 260 to the AR environment. The digital assistant 260 can receive commands from a user (e.g., client or owner user) and perform actions on the user's behalf in the AR environment 230, 240 in accordance with embodiments of the present disclosure.

FIG. 3A depicts an example functional block diagram of a host server 300 that deploys and administers virtual objects for various disclosed applications, digital assistants in an augmented reality environment and to facilitate local determination of virtual object placement in the augmented reality environment, in accordance with embodiments of the present disclosure.

The host server 300 includes a network interface 302, a virtual object (VOB) sharing/publication engine 310, a communications manager 340, a digital assistant manager 350, a virtual billboard engine 360, a physical tag manager 370, and/or an AR/VR window manager 380, a world locking component 390 and/or a user locking component 395.

The host server 300 is also coupled to a billboard object repository 322, a training data repository 324 and/or a physical tag repository 326. Each of the VOB sharing/publication engine 310, the communications manager 340, the digital assistant manager 350, the virtual billboard engine 360, the physical tag manager 370, and/or the AR/VR window manager 380 can be coupled to each other.

One embodiment of the VOB sharing/publication engine 310 includes, a sender/recipient identification engine 312, a contextual trigger detection engine 314 and/or a status parameter parsing engine 318 having an interaction trigger detection engine 316.

On embodiment of the communications manager 340 includes a message object manager 342 and/or a delivery/exchange engine 344.

One embodiment of the digital assistant manager 350 includes a command processing engine 352, an AI engine 354, and/or an activity tracker 356 having a training/learning engine 358.

One embodiment of the virtual billboard engine 360 includes, a billboard content manager 362, user reply manager 364 and/or a placement engine 366. One embodiment of the physical tag manager 370 includes a tag identification tracker 372 having a geolocation metadata tracker 374 and/or a tag metadata extraction engine 378 having a tag metadata manager 376.

Additional or less modules can be included without deviating from the techniques discussed in this disclosure. In addition, each module in the example of FIG. 3A can include any number and combination of sub-modules, and systems, implemented with any combination of hardware and/or software modules.

The host server 300, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The network interface 302 can be a networking module that enables the host server 300 to mediate data in a network with an entity that is external to the host server 300, through any known and/or convenient communications protocol supported by the host server 300 and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, 5G, etc.,), Bluetooth, a router, an access point, a wireless router, a switch, a multi-layer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or have its functionality distributed in part or in full. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, flash, optical storage, to name a few), but may or may not be limited to hardware.

One embodiment of the host server 300 includes the VOB sharing/publication engine 310 having the sender/recipient identification engine 312, the contextual trigger detection engine 314 and/or the status parameter parsing engine 318 having the interaction trigger detection engine 316.

The VOB sharing/publication engine 310 can be any combination of software agents and/or hardware modules (e.g., including processors and/or memory units) able to facilitate or manage, posting, saving, editing, sharing, sending, receiving, publishing, transferring, gifting, of virtual objects (e.g., VOBs or objects).

The object or virtual object is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable. The sender/recipient identification engine 312 can determine, identify, a sending entity of a VOB and/or a recipient entity of the VOB. The sending entity of the VOB can include one or more of, an individual user, a user group having multiple users, a foundation, an organization, a corporation, an advertiser, any other user of an AR environment hosted by the host server 300. The sending entity may also be the host server 300.

The recipient entity of the VOB can include one or more of, an individual user, a user group having multiple users, a foundation, an organization, a corporation, an advertiser, any other user of an AR environment hosted by the host server 300. The recipient entity can be any entity or user who detects, receives, perceives, view, hear, observes, a VOB designated to them by the sender entity. The recipient entity can receive, view, perceive, hear or observe VOBs that are sent to them as a private message object, as a group message object, as a gift, as a greeting card object, as a shared object, as a shared billboard object, or as a post or publication to them privately, or as a post or publication having a larger group of audience. In general, the virtual object can include, a greeting card, where the content of the greeting card can be at least in part specified or designed by the sender entity and designated for the recipient entity. The greeting card includes a template style or template design having 3D features or 3D scenes that are preconfigured, for example, by the host server 300 or a third party. In addition, the virtual object can include a business card, where, the business card is for the sender entity (e.g., includes business information such as company name, company phone number, company address, title, branch, etc.) and designated for the recipient user.

In general, the VOB sharing/publication engine 310 (hereinafter engine 310) can determine that a recipient user is one or more of an intended recipient of a VOB that is shared with the recipient user by the sender entity (of the AR environment). The engine 310 can also determine that the recipient user who is an intended recipient is in a given location in the real world environment which meets a location criteria of the VOB designated for the recipient user.

The engine 310 can then cause to be perceptible, by the recipient user of the augmented reality environment, the virtual object, such that the recipient user is able to engage in the augmented reality experience. The engine 310 can depict such that the recipient user engages in the augmented reality experience via the augmented reality environment hosted by sever 300. The augmented reality experience can include, for example a real time or near real time augmented reality chat session or an augmented reality messaging session. The augmented reality experience can also include asynchronous exchanges of augmented reality messages, augmented reality conversations, augmented reality electronic mail or augmented reality greeting cards. The augmented reality experience can include multiplayer mode gaming experiences where in the gaming experience, the recipient user and the other entity interact with the virtual object.

In one embodiment the engine 310 detects a contextual trigger (e.g., by the contextual trigger engine 314, hereinafter referred to as 'engine 314') and can render or present content associated with the VOB. The contextual trigger occurs (and can be detected by the engine 314) when the recipient user (user parameter) is engaging in a given action or activity (activity parameter) in a given location (location parameter) in the real world environment. In a further example, the contextual trigger can also occur when the recipient user (user parameter) is engaging in a given action or activity (activity parameter) at a given time (time parameter). In some embodiment, the contextual trigger occurs at predetermined times or time periods (time parameter). The contextual trigger can occur at certain locations (location parameter) in the real world environment. For example, when a given user is shopping and is at this location then show this user a VOB, or every morning at rush hour put this traffic map virtual object near the door to the user's car in his driveway. User in some instances meet minimum qualifications/rank to receive certain object if it is configured this way.

In general, a contextual trigger for a VOB can cause the VOB to take on a certain action, behavior or to present its associated content, The contextual trigger for the VOB can include any one of or any combination of a user parameter, a time parameter, an activity parameter and a location parameter. There can be one or more contextual triggers associated with a given VOB. The contextual triggers relevant to the given VOB can be identified, tracked, managed, updated, and/or detected by the contextual trigger detection engine 314. Contextual triggers can be specified, defined, configured or reconfigured by the sender entity of the VOB. Contextual triggers can also be specified, defined, configured or reconfigured by a creator user of the VOB and/or by the host server 300. In general, the content associated with the virtual object can include a text message, a post, a chat, a conversation or a graphical message. The content associated with the virtual object can also include digital stickers, GIFs, digital tattoos, emoticons, animations, videos, clips, games, photos, images, a 3D scene or an animated 3D object, music, sound, tone, ultrasonic, or other audible content. The content associated with the virtual object can also include one or more of, works of art, animation, games, scenes, limericks, jokes, a performance, an action, a routine which can be rendered or played in 360 degrees or 3D.

In some instances, the content associated with the virtual object is rendered or depicted during the augmented reality experience includes multiple stages of rendering, for example, by the engine 310. In general, the multiple stages of rendering can include by way of example, one or more of: depiction or presentation of a name, title or subject of the virtual object, depiction of behaviors or animations of the virtual object, depiction of a payload portion of the content. The payload portion of the content can include, for instance, one or more of: a video, a text based message, a game, an experience, a prize and points, audio, an audio message, music, sound track, a sound, a pitch, etc. The multiple stages of rendering can, in one embodiment, be tracked with and identified by a status parameter of or associated with the virtual object, for example by the status parameter parsing engine 318.

In one embodiment, the host server 300 detects an interaction trigger (e.g., via the interaction trigger detection engine 316, hereinafter referred to as 'engine 316') with respect to the virtual object. For instance, the interaction trigger can be detected (e.g., by the engine 316) responsive to the initial rendering or presentation of the content through engagement with the augmented reality experience in the augmented reality environment. Once the interaction trigger has been depicted, the host server can further render or depict the content associated with the virtual object. Note that the interaction trigger can include stimuli detected of the recipient user. For instance, the stimuli can include voice, touch, eye, gaze, gesture (body, hand, head, arms, legs, limbs, eyes, torso, etc.), text input and/or other command submitted by a with respect to the VOB. In a further embodiment a state of the virtual object after the content has cycled through the multiple stages of rendering can be further determined by the status parameter of the virtual object (e.g., tracked by the status parameter parsing engine 318) The state can include, one or more of: an expire state, a vanish state, a continue state, a pause state, a morph state, and a change state.

Embodiments of the present disclosure also include virtual objects that can be passed down from person to person. For example, some virtual objects cannot be placed or found in the world. Users can only see them or access them in private by receiving them from someone else or via/from a specific entity. In one embodiment, some VOBs can only be passed from person to person. These virtual objects are special and can have value for people to want to do that. These virtual objects can be rewarding or have value to each recipient (free movie premier ticket, coupons, gym passes, etc), that people may share them with friends or other users. A further example includes a VOB equivalent of a chain letter. For instance, this can be a VOB that users can send to their friends. A VOB chain letter can be implemented as a class in the VOB ontology, according to one embodiment.

One embodiment of the host server 300 further includes the communications manager 340 having the message object manager 342 and/or the delivery/exchange engine 344.

The communications manager 340 can be any combination of software agents and/or hardware modules (e.g., including processors and/or memory units) able to facilitate or manage, administer, coordinate, enable, enhance, communications sessions between users of the AR environment. The communications sessions can be 1-1, 1-many, many to many, and/or many-1. The communications manager 340 can determine that a second user of the augmented reality environment, is an intended recipient of a first message object. The communications manager 340 can then, for example, cause to be perceptible, to the second user of the augmented reality environment, the first message object, such that the second user is able to participate in the communications session via the augmented reality environment (e.g., hosted by server 300).

Note that in general, at least a portion of content associated with the first message object includes first user generated content provided by a first user who is a sender entity or sender user, to be consumed by (e.g., viewed, read, heard, interact with, reviewed by, etc.) the second user who is the recipient user for the first message object. The first user generated content and/or the first message object can be created or managed by the message object manager 342. The communications manager 340 can further receive second user generated content provided by the second user (e.g., the recipient user of the first message object) where the second user generated content is provided by the second user in response to the first user generated content provided by the original sender entity (e.g., the first user) of the first message object. The second user generated content is to be consumed by the first user.

The communications manager 340 (e.g., via the delivery/exchange engine 344) can deliver, to the first user in the augmented reality environment, the second message object having the second user generated content and/or present the second user generated content to the first user in the second message object in the communications session the augmented reality environment. In one embodiment, the communications session between the first and second users is asynchronous and the first and second message objects are delivered asynchronously, for example, by the delivery/exchange engine 344. An asynchronous communications session, can include, for example, an email session, an SMS session or an asynchronous chat session. In one embodiment, the communications session between the first and second users is synchronous and the first and second message objects are delivered synchronously, by the delivery/exchange engine 344. The synchronous communication session can include, for example, a chat room session or an instance messaging session.

The communications manager 340 can further detect stimuli by the second user with respect to the first message object and render augmented reality features of the first message object along with depictions of the first user generated content to the second user in the augmented reality environment. The augmented reality features can include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

In a further embodiment, the second message object is delivered to the first user at a given time. The second message object can also be delivered to the first user at a given location in the real world environment. The given time can be specified by the second user. The given location can also be specified by the second user. The delivery criteria associated with a given message object can include any one of and any combination of user, time, location and/or activity parameters and can be managed, tracked, updated, identified and/or detected by the message object manager 342.

One embodiment of the host server 300 further includes the digital assistant manager 350 the command processing engine 352, the AI engine 354, and/or the activity tracker 356 having a training/learning engine 358

The digital assistant manager 350 can be any combination of software agents and/or hardware modules (e.g., including processors and/or memory units) able to provide, administer, manage, train, teach a digital assistant to operate in an AR environment. The digital assistant (e.g., intelligent assistant, user agent, intelligent agent, intelligent personal assistant, etc.) can facilitate or manage, administer, coordinate, enable, enhance, action on or inter action with one or more virtual objects (VOBs) or action or interaction with an augmented reality (AR) environment by its associated user (e.g., client user, owner user, boss, etc.).

An object or virtual object in the AR environment is generally digitally rendered or synthesized by a machine (e.g., a machine can be one or more of, client device 102 of FIG. 1, client device 402 of FIG. 4A or server 100 of FIG. 1, server 300 of FIG. 3A) to be presented in the AR environment and have human perceptible properties to be human discernible or detectable. The object (e.g., VOB) can include a message, a chat, an email, a note, a post, a news item, or any other types of VOBs as disclosed herein. The virtual object can also include, one or more of, a virtual painting, a virtual sculpture, a virtual castle, a virtual snowman, a virtual music piece, a virtual tennis racket, virtual ball, etc. The virtual object can also represent, one or more of, a virtual text book, a virtual novel, a virtual pen, a virtual note pad, a virtual blackboard, a blueprint, a virtual painting, a virtual sculpture, a virtual puzzle, a virtual crossword puzzle, a virtual marker, a virtual exam, a virtual exam problem, a virtual home work, a virtual homework problem, a virtual circuit board, a virtual telescope, a virtual instrument, virtual Lego, virtual building blocks.

In general, the digital assistant is able to receive a command (e.g., by the command processing engine 352), either explicitly or implicitly, from a user (e.g., the client user, owner user, boss, etc.) such that the user is able to engage with the AR environment. The command can be issued by the user explicitly, for example, by explicitly performing an action which can be interpreted by the digital assistant. The command can in one embodiment be in natural language (e.g., english, spanish, russian, french, mandarin, or any other human language) and can be interpreted (e.g., by the command processing engine 352) and understood by the digital assistant manager 350 (e.g., via natural language processing). The command can also be in machine language interpretable by the command processing engine 352.

In general, the command to instruct the digital assistant processed by the command processing engine 352 can be initiated by voice, touch, eye, gaze, gesture (body, hand, head, arms, legs, eyes, torso, etc.), text input and/or other command submitted by a user. The commend can also be initiated through input text, or gestured to specify the text.

The command to instruct the digital assistant can also include a reply to, comment on, response to or review of a virtual object including for example, emoticon, GIFs, stickers, multimedia content or other attachments. Voice command can also be used to specify attachments or identify other content to be included in an interaction with, action on, comment on, action on, review of, or in a reply to the VOB. The action, interaction, comment, review or reply can include another VOB or multiple other VOBs including or without other types of content. Any combination of the above input can be used to instruct the digital assistant to act on or interact with and/or respond to a virtual object. The command can be received through a voice interface and/or an imaging interface (e.g., camera or other imaging or optical unit) to be processed by the command processing unit 352.

The digital assistant manager 350 can also detect, identify, interpret, react to, respond to implicit commands (e.g., by the command processing engine 352 and/or the artificial intelligence (AI) engine 354). For example, the digital assistance manager 350 can detect activities occurring in the real world, in the AR environment (e.g., with the virtual objects), and/or detect user activity/behavior and trigger an action. The digital assistance manger 350 can trigger or prompt action in the AR environment based on contextual awareness or contextual detection. Certain activities performed by the user when detected (e.g., by the command processing engine 352 and/or the artificial intelligence (AI) engine 354) can be or form the basis of an implicit command to act on a VOB, perform a certain action in the AR environment, or to perform a certain action or task on behalf of the user (in the real world environment or in the AR environment).

For example, the digital assistant manager 350 can create an email sender as a contact entry for the user each time a VOB message is received more than a certain number of times from a given sender (e.g., through automatic planning capabilities of the AI engine 354). The digital assistant manager 350 can also automatically send the sender user a response as a VOB object or as an email, text or message after a certain number of messages of VOB message objects have been received by the sender (e.g., do not disturb, not interested, etc.).

In another example, digital assistant manager 350 can trigger the digital assistant to turn on the oven in the kitchen (e.g., via a smart control) for John each weekday at 630 pm or whenever John enters his car to drive home. The digital assistant manager 350 can send a VOB message with a 3D emoji to John's wife Susan with text telling Susan that John is cooking dinner. The VOB message can also include a note to Susan to bring a bottle of red wine on her way home. In another example, the digital assistant manger 350 for user John can send a VOB message to his son Robert each day at 3 pm automatically asking Robert if he has returned home safely. The digital assistant manager 350 may send the VOB to Robert as long as John has not received a message from Robert that day.

In a further example, the digital assistant manager 350 can post a VOB message or virtual billboard with any AR feature on the front door or on the dining table, a note with Mom's calendar for the week left for the Nanny Janice. The digital assistant manager 350 can automatically extract mom's calendar to generate the VOB message or virtual billboard for nanny Janice. As such, the activity triggered by the digital assistant manager 350 can be performed in the real world with real world effect. The activity triggered by the digital assistant manager 350 can also be performed on VOBs or other AR content in the AR environment for utility or for entertainment/vanity reasons. In further embodiments, the digital assistant manager 350 is also able to represent knowledge to the user and is able to perceive the real world environment and/or the AR environment as its user (e.g., client owner, user owner etc.). To take on action automatically, the digital assistant manager 350 is able to learn from activities in the real world and activities occurring in the AR environment.

As such, activities occurring in the AR environment can be tracked, recorded, stored, analyzed (e.g., by the host server 300 and/or via the activity tracker 356). The activity tracker 356 can also track, record, store, analyze and/or learn from activities occurring in the real world environment. The activity tracker 356 can also track, record, store, analyze and/or learn from user behavior or user activities in the real world environment with physical objects/phenomenon and/or in the digital environment (e.g., in the AR environment with digital or virtual objects). The training/learning engine 358 can use any of the above recorded or analyzed activities to train the digital assistant to learn from and to optimize its functionality. The training/learning engine 358 can also use the above recorded or analyzed activities to further customize and tailor its functionalities specific to its user (e.g., the client user, the owner user). Due to the neural network capabilities and training/learning abilities of the digital assistant manager 350, each digital assistant deployed is unique and optimized for its user.

One embodiment of the host server 300 further includes the virtual billboard engine 360 having, the billboard content manager 362 and/or the user reply manager 364.

The virtual billboard engine 360 can be any combination of software agents and/or hardware modules (e.g., including processors and/or memory units) able to facilitate or manage, administer, coordinate, enable, enhance, the posting, sharing, configuring, designing, placing, showing, rendering of virtual objects that are virtual billboards. The virtual billboard engine 360 can also facilitate, manage, depict, render, replies, comments, feedback, ratings, reviews of virtual billboards and/or associated content.

The billboard object repository 322 can store virtual objects that are virtual billboards and any or all copies of virtual billboards. The billboard repository 322 can store virtual billboard content or VOBs that can be retrieved for consumption in a target environment, where the virtual billboard or VOBs can be contextually relevant. The billboard object repository 322 can also include data which can be used to generate (e.g., generated in part or in whole by the host server 300 and/or locally at a client device 102A-N) contextually-relevant or aware virtual content, virtual billboards or other VOB(s).

The virtual billboard can include one or more of, a note, a review, an offer, an ad, a promotion. A virtual billboard object can be a seed for threaded discussions or interactions. In general, virtual billboards can be placed in space, pinned to a user or a moveable object, or can be pinned to a physical surface at a physical location. Virtual billboards are illustrated with references the examples of FIG. 2C. The virtual billboard engine 360 can associate the virtual billboard with the physical location in the real world environment. The virtual billboard can be associated with the physical location such that the virtual billboard is rendered in an augmented reality environment, at or in a vicinity of the physical location or is rendered in the augmented reality environment to appear to be located at or in the vicinity of the physical location.

The virtual billboard engine 360 can also depict content associated with the virtual billboard, at or in the vicinity of the physical location (e.g., via the billboard content manager 362) and further depict user replies to the content with the virtual billboard, at or in the vicinity of the physical location (e.g., via the user reply manager 364 of the virtual billboard engine 360). In one embodiment, the virtual billboard engine 360 can create the virtual billboard responsive to a request of a creator user. The physical location with which the virtual billboard is associated can be specified in the request of the creator user.

In one embodiment, the virtual billboard is world-locked, for example, by the world locking component 390. In world locking the virtual billboard, the virtual billboard can be associated with the physical location in the real world environment and the virtual billboard is perceptible to a user, if and when the given user is physically at or in a vicinity of the physical location. For a world locked virtual billboard, the virtual billboard engine 360 can enable the virtual billboard to be interacted with by the user if and when the user is at or in a vicinity of the physical location. In a further embodiment, the virtual billboard is user-locked, for example, by the user locking component 395. In user locking the virtual billboard, the physical location with which the virtual billboard is associated, includes a physical space around a user, where the physical space around the user is moveable with movement of the user in the real world environment. Moreover, in user-locking the virtual billboard, the virtual billboard engine 360 can render the virtual billboard in the augmented reality environment to move with or appear to move with the user in the augmented reality environment.

In one embodiment, the host server 300 can detect the movement of the user in the real world environment and identify changes in location of the physical space around the user due to the movement of the user in the real world environment. The virtual billboard engine 360 can render the virtual billboard to move in the augmented reality environment in accordance with the changes in location of the physical space around the user such that the virtual billboard moves with or appears to move with the user in the augmented reality environment. Furthermore, the host server 300 can detect interaction with the virtual billboard by a user and further render augmented reality features embodied in the virtual billboard in the augmented reality environment. In one embodiment, the augmented reality features can include the user replies depicted as a 3D thread associated with the virtual billboard. In addition, the augmented reality features embodied in the virtual billboard can further include, for example, digital stickers, GIFs, digital tattoos, emoticons, animations, videos, clips, games, photos, images, objects or scenes rendered in 360 degrees or 3D and/or music, sounds, tones. The augmented reality features can also include one or more of, a performance, an action, a routine rendered or played in 360 degrees or 3D.

One embodiment of the physical tag manager 370 further includes the tag identification tracker 372 having the geolocation metadata tracker 374 and/or the tag metadata extraction engine 378 having the tag metadata manager 376.

The physical tag manager 370 can be any combination of software agents and/or hardware modules (e.g., including processors and/or memory units) able to register, index, store, manage, analyze physical tags identifying physical surfaces in physical locations. The physical tag manager 370 can also register, index, store, manage, analyze, update, modify, metadata associated with the physical tags. The physical tag can be affixed to, attached, to stuck to, embedded in or placed near a physical surface in the real world environment. The physical tag can then uniquely identify a specific location of the physical surface to which it is associated with (e.g., affixed to, attached to, embedded in, formed in, or otherwise associated with).

Figure 4A:
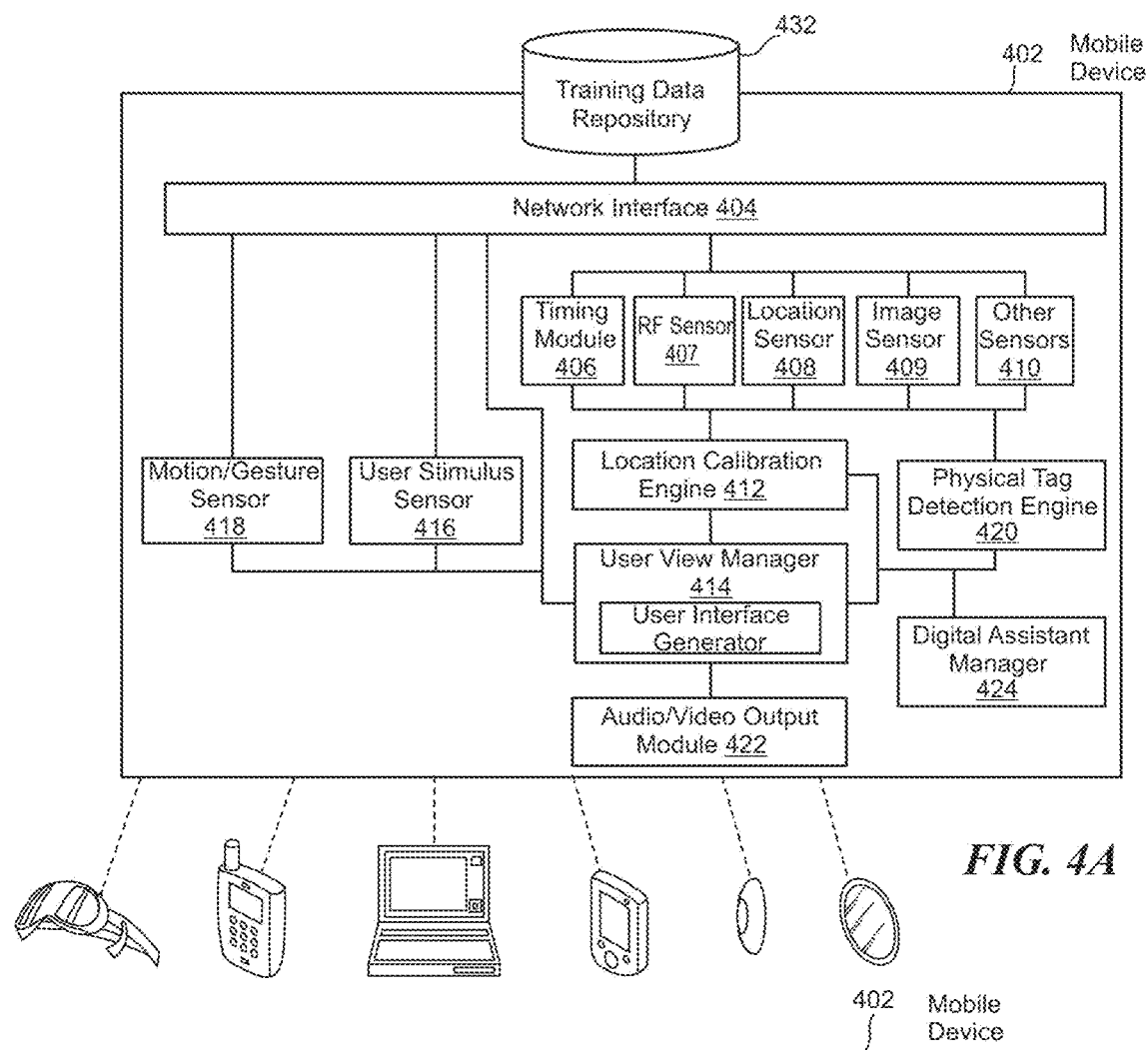
FIG. 4A depicts an example functional block diagram of a client device that includes single or multi-directional lens as a portal between a physical world and a digital world component of an augmented reality environment, which further enables virtual object control or access for various disclosed applications, in accordance with embodiments of the present disclosure.

For example, the physical tags generally has embedded or stored therein metadata, patterns, or other machine identifiable or readable instructions, code or content which identifies itself as a physical tag to a machine, device or system (e.g., a machine can be one or more of, client device 102 of FIG. 1, client device 402 of FIG. 4A or server 100 of FIG. 1, server 300 of FIG. 3A). The machines or devices in the system (e.g., a machine can be one or more of, client device 102 of FIG. 1, client device 402 of FIG. 4A or server 100 of FIG. 1, server 300 of FIG. 3A), on identifying its presence can extract metadata from the physical tag which indicate geolocation (e.g., geolocation metadata having location coordinates of high precision). The geolocation metadata (e.g., as stored or tracked by the geolocation metadata tracker 374) can identify to the machine or device the specific location where the physical tag is in the physical space, or more specifically, where the physical tag is located on or with respect to the physical surface.

The precision of the location coordinates or location identifier associated with a physical tag can be much higher than GPS, wifi, radio or other wireless location determination or triangulation methods. For example, the precision of location coordinates used for location identification (both indoor and outdoor) can reach a few millimeters, a few centimetres, 5-20 cm or 20-100 cm, or a few meters accuracy. As such, location determination using physical tags can be suitable for VOB positioning where finer location accuracy is needed. In general, there can be several physical tags embedded in, affixed to, stuck to or otherwise associated with a given physical surface in a physical space.

In some embodiments, physical tags can be manufactured to have microscale, nanoscale, pico scale or femto scale dimensions. Physical surfaces can be made up of or comprise of millions or billions of such physical tags with each physical tag As such location determination (e.g., by the host server 300 or any other system or device) using a physical tag, a few physical tags or a set of physical tags can be as fine as and determined by the physical dimensions of the physical tags microscale, nanoscale, pico scale or femto scale range. Additional metadata associated with a physical can include by way of example, not limitation, one or more of, a location, content, guest list, user list, owner, surface, dimensions, and can be extracted by the tag metadata extraction engine 378. The tag metadata manager 376 can control or manage read/write access to the metadata. The tag metadata manager can also track and implement modifications of the metadata.

One embodiment of the host server 300 further includes the AR/VR window manager 380.

The AR/VR window manager 380 can be any combination of software agents and/or hardware modules (e.g., including processors and/or memory units) able to create, generate, dispose, administer, manage an augmented reality view super imposed over the real world environment and physical objects via a single or multidirectional lens or display. The AR/VR window manager 380 can bring AR and/or VR content into the real world environment.

The AR/VR window manager 380 enables manifestation of AR experiences into the physical world (e.g., as illustrated in the example of FIG. 2B). For example, virtual objects and augmented reality environments can be accessed without using a headset or glasses or a phone. Views (e.g., live views or recorded views) of AR activity in the AR environment can for example, be projected or overlaid at a physical place into the real world environment so that users who are in the physical place can access the AR activity there as if through a window or via a hologram (e.g., as illustrated in the example of FIG. 2B).

The AR/VR window manager 380 can include an apparatus or can control an apparatus having a single lens or a multi-directional lens (e.g., a two-way transparent display or monitor). The apparatus can include touch and/or motion sensors, for instance on each side of the display or lens. This would render a view into the AR world at that physical place. The AR/VR window manager 380, can be embodied in a standalone system, device, client or thin client, window, or lens. If it is aimed at a physical location in the real world, or any virtual world, and it will depict the virtual activity there in a manner that you can see from the physical world, without hardware on your body or in your hand etc. The AR/VR window manager 380 can be installed or embodied in windows of store fronts. Then customers or people looking in from the outside can view or access AR content or other virtual objects overlaid on the window and in the store. The AR/VR window manager 380 can control TVs, laptop, computer monitor, or windows or mirrors to render video surfaces that depict what is happening in the AR environment in the physical location local to the device.

A further embodiment includes a streaming video camera at the physical location of each device or apparatus controlled by AR/VR window manager 380 so there is always a feed of the AR activity from various perspectives of the physical location. The system (e.g., the host server 300) can include or add additional content and data on to the feed or AR activity. The system (e.g., the host server 300) can enable people who are not local to or in the vicinity of the physical location to interact with the AR activity at the physical place.

A further enhancement is that the AR/VR window manager 380 intersperses the real world environment with physical and digital (VR and AR) elements. Human users live in the real world environment and AR/VR window manager 380 can pop up or cause to pop up/render relevant or pertinent virtual content or information around the human users in the real world environment dynamicall.

FIG. 3B depicts an example block diagram illustrating the components of the host server 300 that deploys and administers virtual objects for various disclosed applications, digital assistants in an augmented reality environment and to facilitate local determination of virtual object placement in the augmented reality environment, in accordance with embodiments of the present disclosure In one embodiment, host server 300 includes a network interface 302, a processing unit 334, a memory unit 336, a storage unit 338, a location sensor 340, and/or a timing module 342. Additional or less units or modules may be included. The host server 300 can be any combination of hardware components and/or software agents to deploy and administer digital assistants in an augmented reality environment and to facilitate local determination of virtual object placement in the augmented reality environment. The network interface 302 has been described in the example of FIG. 3A.

One embodiment of the host server 300 includes a processing unit 334. The data received from the network interface 302, location sensor 340, and/or the timing module 342 can be input to a processing unit 334. The location sensor 340 can include GPS receivers, RF transceiver, an optical rangefinder, etc. The timing module 342 can include an internal clock, a connection to a time server (via NTP), an atomic clock, a GPS master clock, etc.

The processing unit 334 can include one or more processors, CPUs, microcontrollers, FPGAs, ASICs, DSPs, or any combination of the above. Data that is input to the host server 300 can be processed by the processing unit 334 and output to a display and/or output via a wired or wireless connection to an external device, such as a mobile phone, a portable device, a host or server computer by way of a communications component.

One embodiment of the host server 300 includes a memory unit 336 and a storage unit 338. The memory unit 335 and a storage unit 338 are, in some embodiments, coupled to the processing unit 334. The memory unit can include volatile and/or non-volatile memory. In virtual object deployment, the processing unit 334 may perform one or more processes related to deployment and training digital assistants in an augmented reality environment. The processing unit 334 can also perform one or more processes related to facilitating high precision or high resolution local determination of virtual object placement in the augmented reality environment.

In some embodiments, any portion of or all of the functions described of the various example modules in the host server 300 of the example of FIG. 3A can be performed by the processing unit 334.

FIG. 4A depicts an example functional block diagram of a client device 402 (e.g., a portable device or a mobile device) that includes single or multi-directional lens as a portal between a physical world and a digital world component of an augmented reality environment, which further enables virtual object control or access for various disclosed applications, in accordance with embodiments of the present disclosure.

The client device 402 includes a network interface 404, a timing module 406, an RF sensor 407, a location sensor 408, an image sensor 409, a location calibration engine 412, a user view manager 414, a user stimulus sensor 416, a motion/gesture sensor 418, a physical tag detection engine 420, a digital assistant manager 424, an audio/video output module 422, and/or other sensors 410. The client device 402 may be any electronic device such as the devices described in conjunction with the client devices 102A-N in the example of FIG. 1 including but not limited to portable devices, a computer, a server, location-aware devices, mobile phones, PDAs, laptops, palmtops, iPhones, cover headsets, heads-up displays, helmet mounted display, head-mounted display, scanned-beam display, smart lens, monocles, smart glasses/goggles, wearable computer such as mobile enabled watches or eyewear, a single directional lens, a multi directional lens, a single directional transparent display, a multi directional transparent display, a minor, s smart minor, a TV screen, and/or any other mobile interfaces and viewing devices, etc.

In one embodiment, the client device 402 is coupled to a training data 432. The training data repository 432 may be internal to or coupled to the client device 402 but the contents stored therein can be further described with reference to the example of the training data repository 132 described in the example of FIG. 1.

Additional or less modules can be included without deviating from the novel art of this disclosure. In addition, each module in the example of FIG. 4A can include any number and combination of sub-modules, and systems, implemented with any combination of hardware and/or software modules.

The client device 402, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 4A, the network interface 404 can be a networking device that enables the client device 402 to mediate data in a network with an entity that is external to the host server, through any known and/or convenient communications protocol supported by the host and the external entity. The network interface 404 can include one or more of a network adapter card, a wireless network interface card, a router, an access point, a wireless router, a switch, a multi-layer switch, a protocol converter, a gateway, a bridge, bridge router, a hub, a digital media receiver, and/or a repeater.

According to the embodiments disclosed herein, the client device 402 can enable access to digital assistants for virtual object manipulation and/or virtual object access or collection for various disclosed applications The AR environment can also be rendered at least in part via one or more of, a mobile browser, a mobile application and a web browser, e.g., via the client device 402. Note that the AR environment can be rendered in part of in whole in a hologram, for example, in 3D and in 360 degrees, via the client device 402.

The client device 402 can provide functionalities described herein via a consumer client application (app) (e.g., front-end, consumer app, client app, etc.). The consumer application includes a user interface that generates views of AR environments (e.g., via the user view manager 414) in accordance with various disclosed applications, provides for and trains a digital assistant manager (e.g., via the digital assistant manager 424) and/or detects physical tags (e.g, via the physical tag detection engine 420) for location calibration or determination (e.g., via the location calibration engine 412).

In one embodiment, the client device 402 includes a transparent display having a first side and a second side. The transparent display can be transparent when viewed from the first side to the second side and when viewed from the second side to the first side.

In one embodiment, in operation, when viewed from the second side of the transparent display to the first side, a first set of virtual objects are rendered to appear to be overlaid over first physical elements in a first physical location in the real world environment on the first side of the transparent display. When viewed from the first side of the transparent display to the second side, a second set of virtual objects are rendered to appear to be overlaid over second physical elements in a second physical location in the real world in the real world environment on the second side of the transparent display. One embodiment further includes an input component to receive input signals to trigger action on or interaction with the first set of virtual objects or the second set of virtual objects. The input component can include a touch sensor. In one embodiment, the touch sensor is physically integrated with the transparent display. The touch sensor can also be physically separate from the transparent display.

One embodiment of the input component includes a first input subcomponent disposed on the first side of the transparent display. The first input subcomponent can be configured to receive first input signals to initiate action on or interaction with the second set of virtual objects in the second physical location. For example, the first input subcomponent can receive the first input signals from a first human user, where the first human user can be viewing the transparent display from the first side of the transparent display. One embodiment of the input component includes a second input subcomponent disposed on the second side of the transparent display and the second input subcomponent can be configured to receive second input signals to initiate action on or interaction with the first set of virtual objects in the first physical location. For example, the second input subcomponent receives the second input signals from a second human user, where the second human user can view the transparent display from the second side of the transparent display.

A further embodiment of the client device 402 having the transparent display includes a motion sensor to detect activity in the real world environment. In one embodiment, the motion sensor includes a first sensor configured to detect motion in the first physical location of the real world environment on the first side of the transparent display. The motion detected in the first physical location can cause changes in rendering of the first set of virtual objects rendered to appear to be overlaid over the first physical elements in the first physical location.

One embodiment of the motion sensor includes a first sensor configured to detect user motion of a first human user in the first physical location of the real world environment on the first side of the transparent display, where the first human user can access the transparent display from the first side of the transparent display. The user motion detected in the first physical location initiates action on or interaction with the second set of virtual objects rendered to appear in the transparent display to be overlaid over the second physical elements in the second physical location. Changes in rendering of the second set of virtual objects can be effectuated in the transparent display based on the action on or the interaction with the second set of virtual objects. In addition, the changes can be depicted in the transparent display on the first side for consumption by the first human user.

One embodiment of the motion sensor further includes a second sensor configured to detect user motion of a second human user in the second physical location of the real world environment on the second side of the transparent display, where the second human user can access the transparent display from the second side of the transparent display. The user motion detected in the second physical location can initiate or trigger action on or interaction with the first set of virtual objects rendered to appear to be overlaid over the first physical elements in the first physical location. Changes in rendering of the first set of virtual objects can be effectuated in the transparent display based on the action on or the interaction with the first set of virtual objects. The changes can also be depicted in the transparent display on the second side for consumption by the second human user. In some instances, the first set of virtual objects or the second set of virtual objects can be rendered in a hologram.

The transparent display can be adapted to be installed in one or more of, a vehicle (as illustrated in the example of FIG. 2B). The transparent display can also be adapted to be installed as a window, in physical structure or infrastructure of a building, on a wall, flooring, or ceiling. In addition, the transparent display can form a part of one or more of, a laptop display, a mobile device display and a television screen. The transparent display can also form a part of a minor or smart mirror.

In a further embodiment, the device or apparatus to render an augmented reality environment in a real world environment includes a display having a first side and a second side, the display being transparent when viewed from the second side to the first side.

In operation, when viewed from the second side of the display to the first side, a first set of virtual objects can be rendered to appear to be overlaid over first physical elements in a first physical location in the real world environment on the first side of the display. One embodiment of a motion sensor includes a second sensor configured to detect user motion of a second human user in the second physical location of the real world environment on the second side of the transparent display, where the second human user to can access the display from the second side of the display. The user motion detected in the second physical location can initiate action on or interaction with the first set of virtual objects rendered to appear to be overlaid over the first physical elements in the first physical location. Changes in rendering of the first set of virtual objects can be effectuated in the display to depict based on the action on or the interaction with the first set of virtual objects. The changes can also be depicted in the display on the second side for consumption by the second human user. One embodiment further includes an input subcomponent disposed on the second side of the display. The input subcomponent can be configured to receive input signals to initiate action on or interaction with the first set of virtual objects in the first physical location.

Figure 4B:
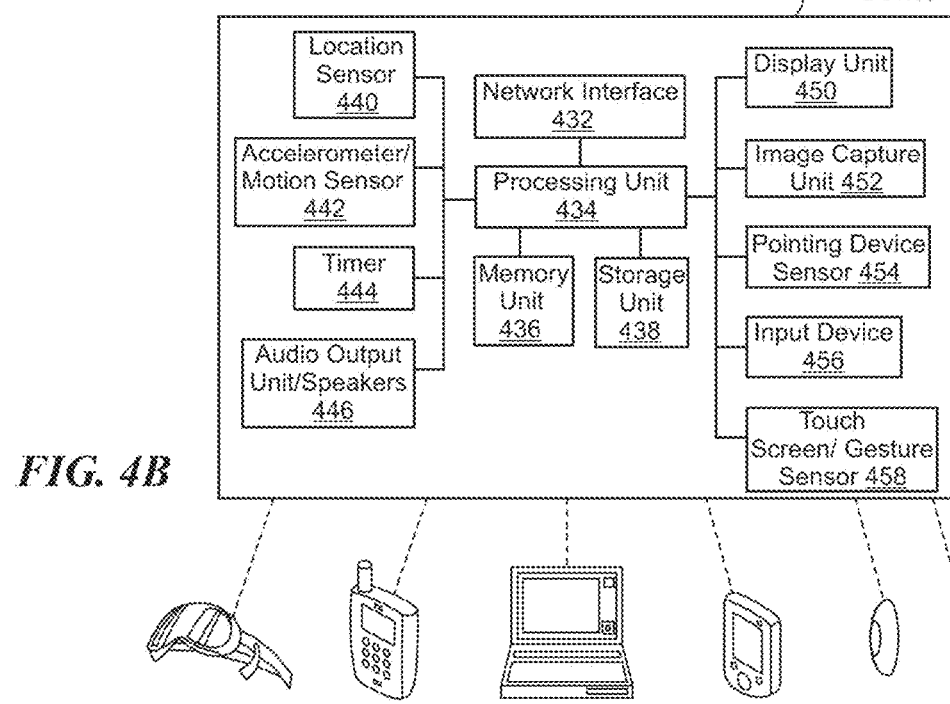
FIG. 4B depicts an example block diagram of the client device, which can be a mobile device that includes single or multi-directional lens as a portal between a physical world and a digital world component of an augmented reality environment, which further enables virtual object control or access for various disclosed applications, in accordance with embodiments of the present disclosure.

FIG. 4B depicts an example block diagram of the client device 402 which can be a mobile device that includes single or multi-directional lens as a portal between a physical world and a digital world component of an augmented reality environment, which further enables virtual object control or access for various disclosed applications, in accordance with embodiments of the present disclosure.

In one embodiment, client device 402 (e.g., a user device) includes a network interface 432, a processing unit 434, a memory unit 436, a storage unit 438, a location sensor 440, an accelerometer/motion sensor 442, an audio output unit/speakers 446, a display unit 450, an image capture unit 452, a pointing device/sensor 454, an input device 456, and/or a touch screen sensor 458. Additional or less units or modules may be included. The client device 402 can be any combination of hardware components and/or software agents that generate views of AR environments (e.g., via the user view manager 414) in accordance with various disclosed applications, enable virtual object manipulation (e.g., via the message object manager 412) and/or virtual object collection (e.g, via the rewards object collection engine 420) for various disclosed applications. The network interface 432 has been described in the example of FIG. 4A.

One embodiment of the client device 402 further includes a processing unit 434. The location sensor 440, accelerometer/motion sensor 442, and timer 444 have been described with reference to the example of FIG. 4A.

The processing unit 434 can include one or more processors, CPUs, microcontrollers, FPGAs, ASICs, DSPs, or any combination of the above. Data that is input to the client device 402 for example, via the image capture unit 452, pointing device/sensor 554, input device 456 (e.g., keyboard), and/or the touch screen sensor 458 can be processed by the processing unit 434 and output to the display unit 450, audio output unit/speakers 446 and/or output via a wired or wireless connection to an external device, such as a host or server computer that generates and controls access to simulated objects by way of a communications component.

One embodiment of the client device 402 further includes a memory unit 436 and a storage unit 438. The memory unit 436 and a storage unit 438 are, in some embodiments, coupled to the processing unit 434. The memory unit can include volatile and/or non-volatile memory. In rendering or presenting an augmented reality environment, the processing unit 434 can perform one or more processes related to administering an augmented reality workspace in a physical space where a user interface element of the augmented reality workspace is rendered as being present in the physical space and able to be interacted with in the physical space.

In some embodiments, any portion of or all of the functions described of the various example modules in the client device 402 of the example of FIG. 4A can be performed by the processing unit 434. In particular, with reference to the mobile device illustrated in FIG. 4A, various sensors and/or modules can be performed via any of the combinations of modules in the control subsystem that are not illustrated, including, but not limited to, the processing unit 434 and/or the memory unit 436.

Figure 5A:
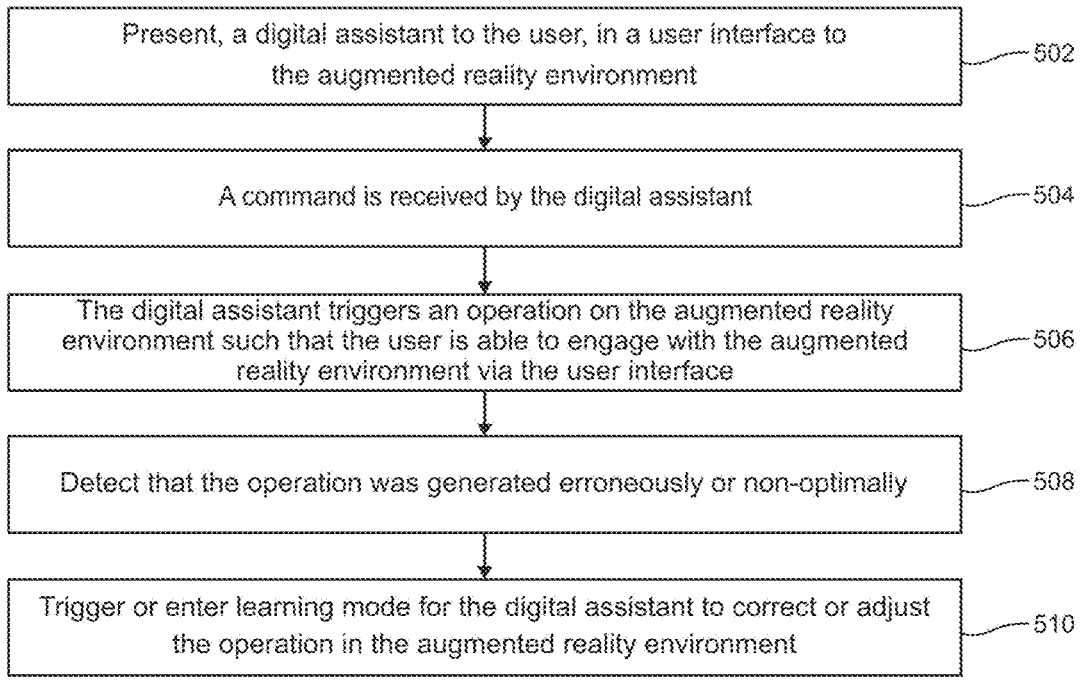
FIG. 5A-5B depict flow charts illustrating example processes to actuating a digital assistant in an augmented reality environment and to facilitate training of the digital assistant, in accordance with embodiments of the present disclosure.
Figure 5B:
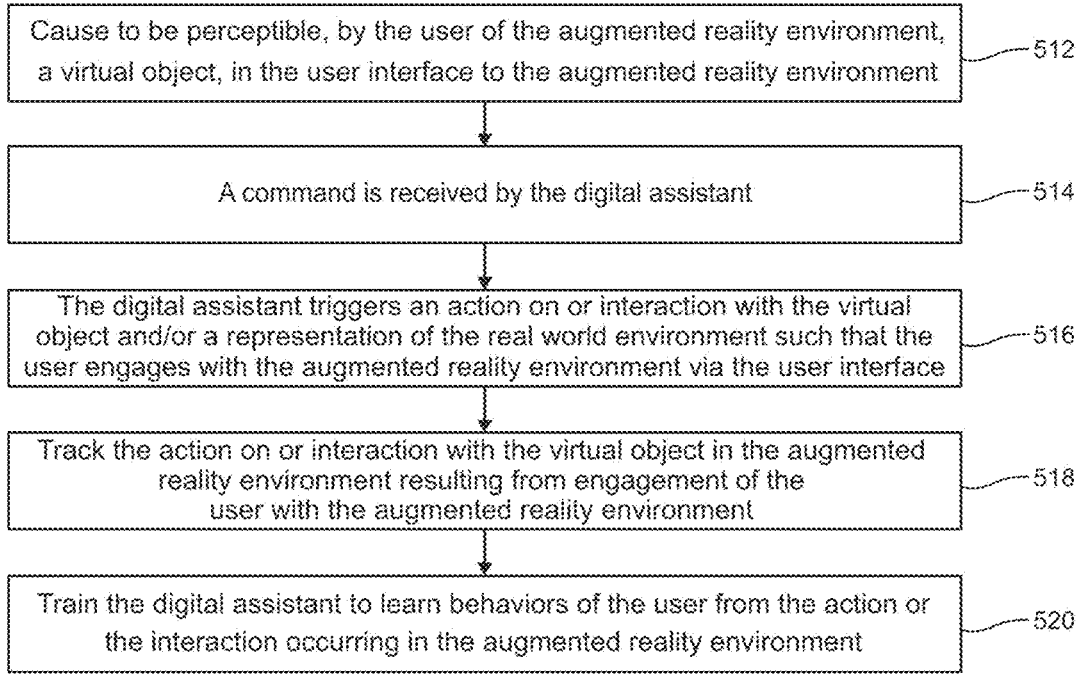

FIG. 5A-5B depict flow charts illustrating example processes to providing and actuating a digital assistant in an augmented reality environment and to facilitate training of the digital assistant, in accordance with embodiments of the present disclosure.

One embodiment of the present disclosure includes digital assistants (e.g., digital personal assistants, intelligent assistants, etc.) that can access, detect, identify, see and/or interact with augmented reality and/or virtual reality environment or objects. The digital assistants can also have access to what a human user can perceive via a user device (e.g., head mounted display, mobile phone or other device). For example, the digital assistant can have access to an imaging unit (e.g., a camera) or speakers or other sensors of a device and can identify, detect or otherwise have access to virtual objects of an augmented reality environment. The digital assistant can also sense, detect or be able to access, act on or interact with the real world environment or physical objects associated with a physical location.

In one embodiment a digital assistant is presented to a user, in a user interface to the augmented reality environment, in process 502. In general, the augmented reality environment depicted in the user interface can include a representation of the real world environment associated with the physical location and/or a virtual object. The virtual object can be caused to be perceptible to the user, in response to: determining that the user is an intended recipient and/or determining that the recipient user is in the physical location in the real world environment.

The digital assistant can therefore interact or communicate with the human user to perform various actions on or interact with the real world environment (e.g., physical objects or things in the real world) or perform actions on or interact with the virtual object in the AR environment. For example, the user can tell (e.g., via speech, tones, gesture, code, text input, eye signaling, etc.) the digital assistant to draw, edit or modify the virtual object. In the case of a message object, the digital assistant can input text into the message object on behalf of the user. The digital assistant can post, send or share the message object to any or all intended recipient users, e.g., at specific time(s) and/or at specific location(s) and/or under specific condition(s) or context(s).

Digital assistant actions performed on behalf of the user can be triggered automatically in accordance to a rule set specified by the user or based on an acquired rule set or rule set devised through machine learning. For example, the digital assistant can determine that user Mary usually arrives home in the evening around 6 pm and notices that Mary, upon arrival at home sends a photo of the fridge to her husband John along with a note specifying items to purchase for dinner. The digital assistant may learn this behavior and automatically generate a virtual object having the same photo automatically to be send to husband John. The digital assistant can also create a virtual object template with a photo each day and ask if Mary wishes to add to it or modify it to be sent to John.

Digital assistant actions can also be triggered in real time or on demand, for example, based on user request or command. For example, a user Mary can instruct the digital assistant to send a virtual object having a message telling the husband John that she has made a reservation at restaurant 'Juno' for 7 pm and to meet her there. Mary can also instruct the digital assistant to send a virtual object to the babysitter Jane asking her to babysit from 645 pm along with a payment and/or instructions on what dinner to prepare for the children.

Furthermore, digital assistants can also provide contextual or useful information to the user about physical objects in the real world environment or virtual objects in the AR environment. Such information can be used by the user to take on actions in the real world on physical objects or virtual objects. For example, a digital assistant can advise a user James who is driving or in a vehicle that there is an upcoming congestion which may cause him to be 15 minutes late. James can act on the information and instruct the digital assistant to send a virtual object (e.g., message object) to his business partner Bill alerting him that James is running late. In this example, the digital assistant to James may be embedded in the vehicle dashboard software, or a window in the vehicle, a GPS unit in the vehicle and/or a mobile device. Note that in general digital assistant can be embedded in any hardware device or mobile device and can be synced across devices for any given user.

For the digital assistant to operate in the AR environment, in one embodiment, a command is received by the digital assistant, in process 504. The command can be received from a human user of the AR environment and the digital assistant can be specific to the human user such that the digital assistant learns from behaviors of the human user and can be specific in its recommendations or actions performed on behalf of the human user. The digital assistant can be explicitly customized or programmed by the user to their preference. The digital assistant can also passively learn the user's behaviors or preferences and/or further acquire information about the user's device. The digital assistant can also acquire information about the physical locations that the user frequents.

Note that the command can be received by the digital assistant through a voice interface of the user interface and the command includes a voice command or speech command initiated by the user. The command can also be received by the digital assistant through an imaging interface of the user interface. For example, the command can include a gesture command or eye commands initiated by the user. Additionally, a gesture or eye movement of the user in the real world environment can be tracked and the command can be identified or generated from the gesture or the eye movement of the user for the digital assistant.

In general, the command to instruct the digital assistant can be initiated by voice, touch, eye, gaze, gesture (body, hand, head, arms, legs, limbs, eyes, torso, etc.), text input and/or other command submitted by a user. The commend can also be initiated through input text, or gestured to specify the text. The command to instruct the digital assistant can also include a reply to, comment on, response to or review of a virtual object including for example, emoticon, GIFs, stickers, multimedia content or other attachments. Voice command can also be used to specify attachments or identify other content to be included in an interaction with, action on, comment on, action on, review of, or in a reply to the VOB. The action, interaction, comment, review or reply can include another VOB or multiple other VOBs including or without other types of content. Any combination of the above input can be used to instruct the digital assistant to act on or interact with and/or respond to a virtual object.

The digital assistant triggers an operation on the augmented reality environment such that the user is able to engage with the augmented reality environment via the user interface, in process 506.

In some embodiments, the digital assistant can be used in concert with an AR or VR interface or device. For example, while looking through a device (phone, headset, glasses, etc.) a user can see or access AR or VR content. Users can use speech to talk to a virtual intelligent assistant (intelligent agents, such as Siri, Google Assistant, Alexa, etc.) and ask it to do things that relate to what you are seeing in your device. Examples of instructions to digital assistants can include:

"Assistant, pick up the virtual toy car object and move it one inch to the right"

"Assistant, show me which way to turn at the end of the street"

"Assistant, highlight stores and restaurants I might like as I walk down the street"

"Assistant, show me the electrical wiring diagram of this wall"

"Assistant, warn me of any oncoming cars or bikes I should avoid"

"Assistant, alert me if you see any of my friends in the crowd"

"Assistant, create a 1 foot tall blue pyramid on the table in front of me"

"Hey computer post this billboard here, with this content, 'this is a test message'"

For example, users can instruct the digital assistant to performe actions and the digital assistant can operate on or trigger operations on virtual objects, or the environment around a user, that the user is experiencing and interacting with in the AR environment.

In a further embodiment, the digital assistant can watch, listen and learn from what is happening on a device, user actions on the device or activities, or actions in which the user is physically engaged in the real world environment— and what the user is seeing, doing and/or interacting with— including the user's physical environment and the augmented reality environment. For example, activities occurring in the augmented reality environment can be tracked and the digital assistant can be trained to learn from the activities occurring in the augmented reality environment. The training can happen automatically or passively in the background. For instance, the digital assistant passively learns from behaviors of the user as background activity.

In addition, the digital assistant is able to be actively interacted with by the user whom the digital assists, to teach or train the digital assistant. The training can also happen in the foreground or actively (e.g., upon entering of a learning mode). For example, it can be detected that the operation was generated erroneously or non-optimally, in process 508. Learning mode for the digital assistant to correct or adjust the operation in the augmented reality environment is triggered or entered, in process 510. A virtual object is caused to be perceptible, by the user of the augmented reality environment, in the user interface to the augmented reality environment, in process 512 A command is received by a digital assistant, in process 510

The digital assistant triggers an action on or interaction with the virtual object and/or a representation of the real world environment such that the user engages with the augmented reality environment via the user interface, in process 516. The action on or interaction with the virtual object is tracked in the augmented reality environment resulting from engagement of the user with the augmented reality environment, in process 518. The digital assistant is trained to learn behaviors of the user from the action or the interaction occurring in the augmented reality environment, in process 520.

Note that in general, the digital assistant is able to respond to natural language and engage in a conversation with the user and can be artificial intelligence enabled. In further embodiments, the digital assistant is operable to be interacted with by the user to perform tasks in the augmented reality environment. The digital assistant is also operable to be interacted with by the user to perform tasks in the real world environment. One embodiment of the present disclosure further includes a digital assistant that appears in an VR/AR interface in the form of an animated or photorealistic avatar. The digital assistant can be like a user's "genie". For example, the digital assistant can appear on demand, on request or when needed, following them, travelling with them, advising them, waiting and listening for commands or questions, learning as the user acts or does things in the world or online. The digital assistant is able to understand language (e.g., natural language, human language, different foreign languages), respond to questions and commands, use AI to think and act intelligently, and perform or execute activities in their environment.

The digital assistant can also vanish, appear and/or reappear. The digital assistant can also travel across the net to go somewhere else, potentially appearing to a different user in a different place via their camera and AR environment (or in VR mode) with a message or to perform a certain action (e.g., give them a virtual object, or to take some other action somewhere else on behalf of their owner or client, and then come back to their owner or customer to deliver results or take another action).

Avatars can interact with other avatars or people on behalf of their owners or customers, in pursuit of their goals or priorities and tasks they are trying to fulfill. User/owner can interact with their avatar in AR/VR mode to teach it, train it, or collaborate with it on tasks in AR/VR or on tasks in the physical world. Learning mode for training their avatar enables them to replay and correct or adjust past behavior to show avatar what would have been better or correct and the avatar can learn from that. Assistants can also passively, ie in the background, track their owner's behavior to better assist them. Assistants can also be actively or deliberately taught by the users/owners. The assistance can appear to a different user in a different place with a message or to do perform an action such as giving them a virtual object, and then come back to their master or customer. Different users can have their own personalized assistants constantly learning their user or owner's behaviors.

In one embodiment, the digital assistant is depicted in the user interface as an avatar that is an animated avatar or a photorealistic avatar. The avatar representing the digital assistant, can be caused to be perceptible to the user in the user interface responsive to a user request from the user whom the digital assistant assists in the augmented reality environment. In further embodiment, the avatar representing the digital assistant is able to interact with other avatars or other users in the augmented reality environment on behalf of the user whom the digital assistant assists. For instance, user Mary's digital assistant avatar 'M' can interact with digital assistant avatar 'T' who assists user Tom, or another avatar 'RT' which is an avatar representing user Tom.

Figure 6:
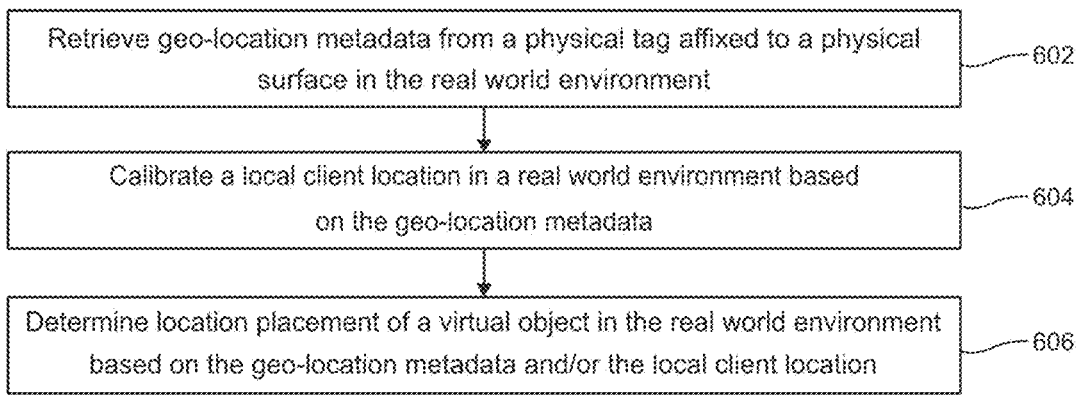
FIG. 6 depicts a flow chart illustrating an example process for precise location determination for virtual object placement using physical tags affixable to a physical surface in the real world environment, in accordance with embodiments of the present disclosure.

FIG. 6 depicts a flow chart illustrating an example process for precise location determination for virtual object placement using physical tags affixable to a physical surface in the real world environment, in accordance with embodiments of the present disclosure.

Embodiments of the present disclosure further include physical tags (e.g., physical stickers or stickers, tags, etc.) that can be physically affixed (e.g., stuck, installed or attached, etc.) to surfaces. The physical tags can for example, include QR codes, 1D bar cord, 2D barcode, 3D code or other coded images, that can be detected pr recognized by devices including but not limited to, an imaging unit, an optical device, a camera, a mobile device or any other device, or AR enabled devices. Examples of the disclosed physical tags or stickers can be used as markers or anchor points in physical space in the real world environment. The markers or anchors identify the physical locations in the real world environment where virtual objects can be associated with such that to a human user, the virtual objects appear to be placed at or near such physical locations.

The physical tags can also be used to identify known geo-locations in a physical space such that the geo coordinates of the known geolocation can be specified or identified to very high precision. For example, location can be determined to within a few meters (e.g., 1-20 meters), a few centimeters (1-100 cm), a few feet (1-30 feet), a few inches (1-60 inches) accuracy. Therefore, using the physical tags, local devices in the physical space with known geo coordinates can calibrate its location from the known geo-coordinates of the physical tags. The calibration can be achieved using any number of physical tags (e.g., one, two, three, or more tags) in a physical space where the physical tags have a known location (e.g., as specified by high precision geo-coordinates).

For example, triangulation can be performed by a local device within the space defined by the physical tags to refine or optimize its location identification. Such location identification can be achieved indoors, in elevators, basements, attics, or in buildings and can be particularly useful in areas of poor wifi, GPS, mobile, or other signals which can be used for positioning. In one embodiment, to perform location identification, geo-location metadata can be retrieved from a physical tag affixed to a physical surface in the real world environment 602.

For example, the physical tag can be affixed to a wall, ceiling, floor, tile, table, counter, exterior wall or interior wall, stair surfaces, elevator surfaces, furniture surfaces, fixtures, lighting, cement, etc. The physical tag can also be integrated into physical infrastructure, for example, the physical tag can be embedded into buildings, houses, apartments, cars, elevators, escalators, stairs, walls, metal beams, ibeams, paint, flooring panels, carpets, furniture, tiles, fixtures, cement, light posts, concrete, bricks, etc. The physical tags can be integrated into physical infrastructure such that they are not visible in plain sight.

The embedded data or metadata in the physical tags are machine-readable or machine-interpret-able such that devices can read or retrieve the geolocation metadata or any other metadata embedded in the physical tags. The physical tag can uniquely identify an area of the physical surface to which it is affixed by the geolocation metadata. In one embodiment, a local client location in a real world environment can be determined or calibrated based on the geo-location metadata, in process 604. Since applications such as physical location association of virtual objects can benefit from finer location precision of a higher precision than GPS or wifi positioning (e.g., within a few meters, a few centimeters, or a few inches), the local client location (e.g., location of a local user device such as a portable device, mobile phone, wearable device, etc.) can be refined or calibrated using the geolocation metadata of the physical tag.

Location placement of a virtual object in the real world environment is determined based on the geo-location metadata and/or the local client location, in process 606. As such, the virtual object (VOB) can be precisely placed or otherwise be associated with physical objects in a physical location. For example, a VOB which represents a digital vase can be 'placed' at a suitable position on a coffee table. A Vob which represents a spot light can similarly be placed just above a piece of wall art at a suitable location to accent the wall art.

In further embodiments, the local client can refine or calibrate its location using geolocaton metadata of multiple physical tags. Geo-location metadata can be retrieved from multiple physical tags affixed to the physical surface in the real world environment. The local client location in the real world environment can then be calibrated based on the geo-location metadata retrieved from the multiple physical tags. As such the location placement of the virtual object can then be determined in a physical space in the real world environment defined by the multiple physical tags affixed to the physical surface.

Note that physical tags can for example, be attached to, embedded in, placed on, affixed to any physical surface or physical object to which where AR objects or content can be affixed or otherwise associated with. Physical tags can also include art such as logos or images in which the code ID for the sticker is embedded, encrypted, or hidden, but identifiable by a device that is able to filter images for certain key patterns that indicate that there is sticker there. Note that physical tags can be visible the human eye. Alternatively, physical tags can be visually transparent yet reflective to IR lights and sensors on imaging units or other optical devices so human users would not be able to see them or would not be bothered by them (they would appear clear).

For example, the physical tag can include a physical enclosure with an embedded chip or storage. The chip or storage (e.g., a machine-readable storage medium) has stored thereon instructions executable by an external device. For example, the instructions when executed by a processor or machine (e.g., a machine can be one or more of, client device 102 of FIG. 1, client device 402 of FIG. 4A or server 100 of FIG. 1, server 300 of FIG. 3A), can cause the processor or machine (e.g., a machine can be one or more of, client device 102 of FIG. 1, client device 402 of FIG. 4A or server 100 of FIG. 1, server 300 of FIG. 3A) to: identify patterns in the physical tag which indicate presence of the apparatus and/or identify a physical location of the apparatus.

The physical enclosure can include content that is visually perceptible. The physical enclosure can also include or be formed of material reflective to infrared lights or camera sensors. Generally, the physical enclosure is adapted to be affixed to the physical surface such as a wall, a tile, table, floor or ceiling. The physical surface can be formed of any material including, metal, polyester, organic material, metal, fabric, stone, ceramic, porcelain, cement, etc.

In one example, the physical surface includes a wall and the physical tag forms a part of wallpaper on the wall. In a further example, the physical surface includes a wall or a floor and the physical enclosure of the physical tag forms a part of tiles on the wall or the floor. In yet a further example, the physical tag forms a part of paint on the physical surface. The physical enclosure can be covered with paint having a unique pattern of paint particles. The unique pattern can for instance, distinctly identify the physical tag from another tag affixed to the physical surface. The unique pattern of paint particles on the physical tag can also identify a uniquely identifiable location on the physical surface to which the physical tag is affixed. Note that the paint can include clear or opaque particles. The paint particles can form metadata attachable to physical objects onto which the paint is applied.

For example, wallpaper can be formed to include or be substantially made of physical tags so that different parts of a wall becomes a uniquely identifiable area. The embedded code or content in the physical tags can be open sourced so that anyone could generate them and print them locally. Physical tags can have different codes which can be tracked via a sticker code algorithm that comes from a web service that generates tag IDs, or from a very long random number generator. Physical tags can be registered with a central database by a server (e.g., server 100 of FIG. 1, server 300 of FIG. 3A) so that their location, content, guest list, activity, can be tracked and analyzed remotely. The content associated with physical tags can also be assigned, modified, and viewed remotely.

Identification of a wall location or indoor location can be achieved by printing a unique pattern on the wall. For example, it can also be achieved with a paint that sprays color particles into another base color paint so that no two locations on a wall are likely to have the same pattern of particles in the color. This can turn every part of the wall or surface into a uniquely identifiable location. This type of paint could be sprayed onto surfaces to give this capability. It could also be a clear coating containing different types of clear or opaque particles. It could be applied to windows in a transparent form, or to exterior walls, sidewalks, streets, manufactured items, or even to clothing or the skin of the body.

It's a address paint—it paints addresses onto things. Machines (e.g., a machine can be one or more of, client device 102 of FIG. 1, client device 402 of FIG. 4A or server 100 of FIG. 1, server 300 of FIG. 3A) can point at a region painted this way to identify save it as a new location. Machines can also attach data and metadata to that location, and can associate or place virtual objects at or near or relative to that location. By exploring a surface that is painted with this paint, machines could discover locations that reveal content (e.g., digital content, AR content, VOBs, etc.). A surface painted with this material can also be analyzed remotely or from a distance to identify the locations that have content.

In one embodiment, the physical tags can be registered with a host server (e.g., server 100 of FIG. 1, server 300 of FIG. 3A) and/or stored in a data base or repository. The host server (e.g., server 100 of FIG. 1, server 300 of FIG. 3A) can store, analyze and/or manage metadata associated with the physical tags. The metadata can include one or more of, a location, content, guest list, user list associated with the apparatus. Moreover metadata can be assigned, modified or viewed remotely from the physical tag. In one embodiment, the physical tag includes a network component which enables the physical tag to communicate with the host server (e.g., server 100 of FIG. 1, server 300 of FIG. 3A).

Figure 7:
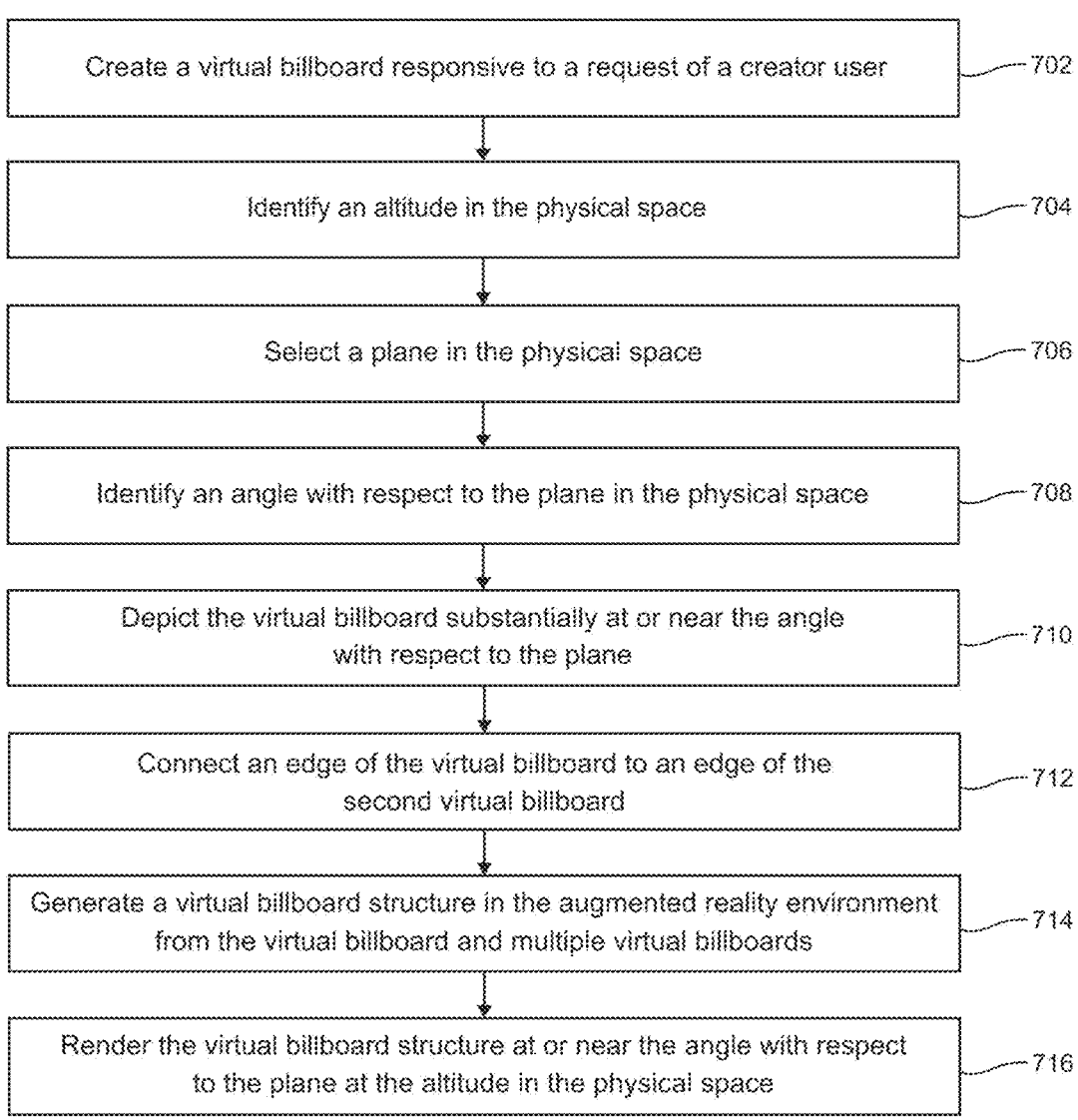
FIG. 7 depicts a flow chart illustrating an example process to associate a virtual billboard with a physical space in the real world environment, in accordance with embodiments of the present disclosure.

FIG. 7 depicts a flow chart illustrating an example process to associate a virtual billboard with a physical space in the real world environment, in accordance with embodiments of the present disclosure.

In one embodiment, when users place virtual objects (VOBs) in an augmented reality environment (e.g., by association with a physical location), the system (e.g., server 100 of FIG. 1, server 300 of FIG. 3A) can enable the user (e.g., a creator user) to select a recipient person and/or place and/or time to post it to. If the creator user chooses just a recipient user to send the VOB, it can be considered a message object. If the creator user chooses a place with which to associate the VOB, the COB can be considered a billboard. A VOB which designates a person and place can be considered a sticky note or targeted billboard. For example, if the creator user selects, just a time then the VOB can appear for everyone they can post it to at a time. Place and time or person and time also have effects. The disclosed system can obeys the rules and displays VOBs based on the rule sets.

In addition, the system can enable a creator user to post VOBs to a place (e.g., associate VOBs with a physical location) that they are not currently in. For example, the creator user can specify a plane to post to, at what angle, and/or the altitude (e.g., the altitude in open space, in a room, in a building, etc). In one embodiment, the system (e.g., server 100 of FIG. 1, server 300 of FIG. 3A) enables a creator user to configure VOB placement at an altitude or floor (e.g., using a building selector, or building map, etc.). In one example, the system can assess a fee for a creator user to post or place VOBs to places the creator is not physically located. A flat fee can be assessed for physical locations outside of a given radius of the physical location where the creator user is physically located or associated with. A larger fee can also be assessed for the creator user to post or place VOBs (e.g., associate VOBs with physical locations) further away from a given physical location.

In one embodiment, the system aggregates tags or physical places and/or physical objects. For example, users collaboratively tag physical places and physical objects in places in the real world environment. Such tags can be aggregated by the system to generate maps of physical spaces. For instance, a user can identify plane in a physical place and names it "desk in Mozart's room." the system can log the surface along with geo-coordinates. Other users can select it and post a VOB to that place. Once posted or place, the VOB can appear at that named location (e.g., the desk in Mozart's room) for users in the vicinity of or at that physical place.

For example, a virtual billboard (e.g., as shown in the examples of FIG. 2C) is created responsive to a request of a creator user, in process 702. In addition, an altitude is identified in the physical space, in process 704. The virtual billboard can be rendered in the augmented reality environment, at or near the altitude in the physical space, or is rendered in the augmented reality environment to appear to be located at or near the altitude in the physical space.

Note that the altitude and/or a plane at the altitude of the physical space can be specified in the request of the creator user. The plane can also be determined by the system (e.g., server 100 of FIG. 1, server 300 of FIG. 3A) based on the geometry of the physical space or physical room in which the virtual object or virtual billboard is to be placed for optimal visualization by human users in the physical space or physical room.

In one embodiment, the physical space incudes a building and the altitude can be specified by a floor in the building. For example, the creator user can indicate that the VOB is to be placed on floor 3 and at a height of around 5 feet from the floor of floor 3, in a plane that is vertical to the plane of the floor. The creator user specify that the VOB is to be placed 10 feet from the ground in a plane that is 20 degrees from the plane horizontal to the ground.

As such, a plane is identified in the physical space, in process 706. The plane can for example, be identified from a tag provided by a user in the real world environment. In a further embodiment, an angle can be identified with respect to the plane in the physical space, in process 708. For example, the angle can be specified as being a number of degrees clockwise or counter clockwise from the selected plane. Such an angle can be specified by the creator user or determined by the system. In general, users can also adjust the angle after the VOB has been placed at or in the plane for optimal access or viewing. The virtual billboard can be depicted substantially at or near the angle with respect to the plane, in process 710.

A virtual object or billboard can be placed in a room so that it appears optimally in the right part of the room or in an optimal orientation to the room for user interaction or viewing, or for any other given purpose—based on the shape of the room. For example the system can determine the geometry of the room. From this it could then keep 3D objects oriented relative to the shape of the room. The system can build up a database of mapped rooms. The room mapping improves as users crowdsource information or data which identifies perspectives, dimensions, or objects in physical spaces and/or rooms. The system can also award points to users for doing this.

In one embodiment, billboards can be configured or selected to be stuck to walls and other surfaces. This could also include taking a photo of the place where it appears to help identify it. In some instances, virtual billboards are transparent or semitransparent or translucent in such a manner that content, color letters in space or on a wall can still be visible. In one embodiment, the movement of a user is detected in the real world environment and changes in location of physical area around the user due to the movement of the user in the real world environment can be detected. The virtual billboard can then be rendered to move in the augmented reality environment in accordance with the changes in location of the physical area around the user such that the virtual billboard moves with or appears to move with the user in the augmented reality environment.

In addition, interaction with the virtual billboard by a user can also be detected and augmented reality features embodied in the virtual billboard can be rendered in the augmented reality environment. The augmented reality features can for instance, include the user replies depicted as a 3D thread associated with the virtual billboard. The augmented reality features can further include one or more of, animations, objects or scenes rendered in 360 degrees or 3D. Note that a virtual billboard can include, for example, one or more of, a note, a review, an offer, an ad and a promotion.

In one embodiment, the system (e.g., server 100 of FIG. 1, server 300 of FIG. 3A) enables users to attach AR/VR billboards (e.g., as shown in the examples of FIG. 2C) together in the AR/VR environment—to tile them to make larger surfaces. A virtual billboard can be a compound virtual object comprised of collages made of stickers (e.g., virtual objects). For example, a virtual billboard can include a "try it" virtual object on top of a "Lose Weight Feel Great" virtual object. Virtual objects can be attached on or next to or near other virtual objects to build grouped objects and then define das a grouped object so it moves as one. For example attach a billboard to right edge of a billboard. They can then for example make a passage way formed of billboards facing in that you walk through. It could be an experiential thing—an art exhibit, a sequence of messages. Or a room. Or a maze. Or an entire building, etc.

For example, an edge of the virtual billboard is connected to an edge of the second virtual billboard, in process 712. The system can enable virtual billboards to be grouped so that the edges connect at certain angles. In further embodiments, virtual billboards of various shapes (e.g., regular shapes or irregular shapes) can be designed customized, or selected. In one example, a rectangle that is as wide as two billboards can be created or generated. A long whale message can be posted on the virtual billboard. Virtual billboards can be created or customized to be in various forms and factors including by way of example not limitation: A triangle shape. A hexagon shape. A sphere. A cube. A rectangular block. These enable various shapes and forms of billboard structures to be built. For example, users can generate a non standard shape or design any geometric shape they desire, including for example, doorway, archway, window and portal objects shapes. These become structures users can build in the AR environment. For instance, each surface can have color, texture, and optional content (text or image).

In one embodiment, the virtual billboard structure forms a shape of a sign or flag For example, virtual billboard shapes can include standard sign shapes (like a stop sign shape, a one way shape, etc) and flags that flap in the wind gently. The virtual signs can also be associated with polls which appear to be holding them up. One embodiment further includes—a billboard or set of billboards that are portable in real space and/or digital space, e.g., that a user can take with them. For example a protest—they can carry them with them.

In one embodiment, a virtual billboard structure is generated in the augmented reality environment from the virtual billboard and multiple virtual billboards, in process 714. The virtual billboard structure can be rendered at or near the angle with respect to the plane at the altitude in the physical space, as in process 716. In a further embodiment, a virtual billboard structure is generated in the augmented reality environment from the virtual billboard and a second virtual billboard. The virtual billboard structure can be rendered at the altitude of the physical space. The virtual billboard structure can, for example, be generated from aligning a tilt first angle of the virtual billboard to a second tilt angle of the second virtual billboard. For example, the virtual billboard structure can form a passageway or a room in the augmented reality environment that a user can walk through. Note that in a room made of billboard wall objects if it has a floor and a ceiling and four walls a light source inside it can be provided.

In a further example, the virtual billboard structure forms an art exhibit in the augmented reality environment. The virtual billboard structure can also form or include a sequences of messages in the augmented reality environment. In general, a shape of the virtual billboard structure can be customizable. In addition, a color or texture of the virtual billboard structure can be customizable. Content depicted on the virtual billboard structure can also be customized.

Figure 8:
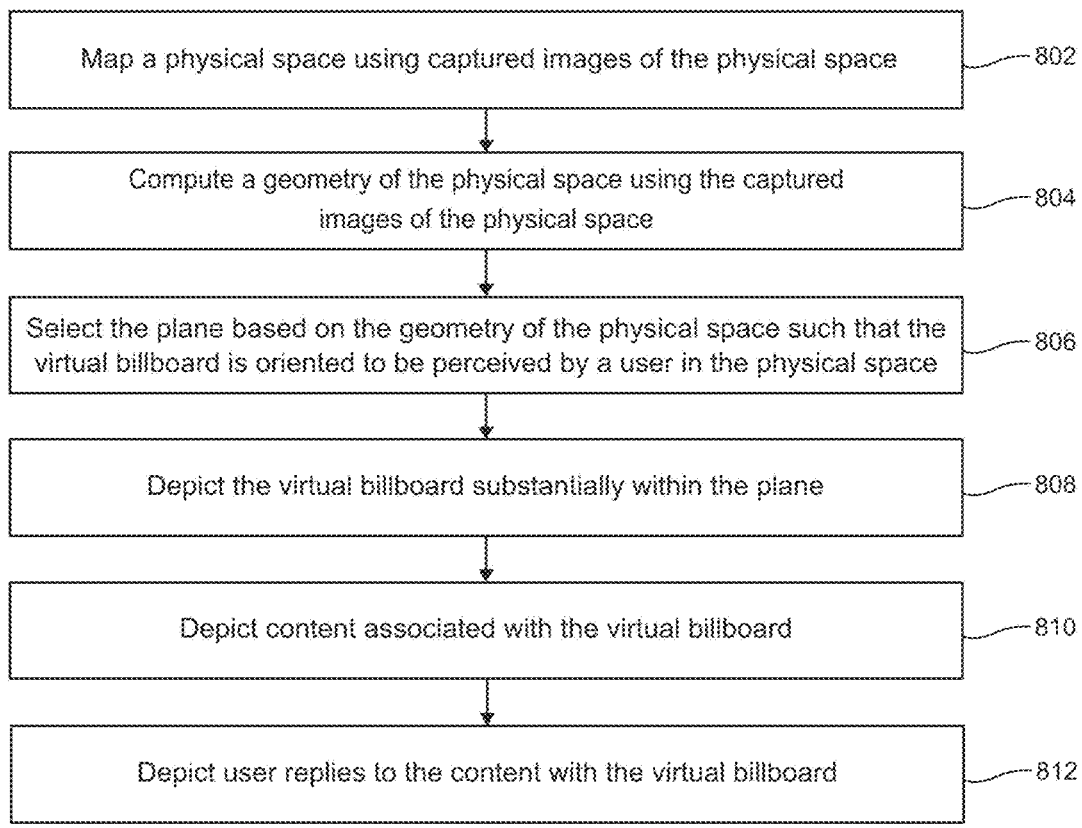
FIG. 8 depicts a flow chart illustrating an example process to map a physical space using locally captured images for augmented reality applications such as precise placement of virtual objects in the physical space, in accordance with embodiments of the present disclosure.

FIG. 8 depicts a flow chart illustrating an example process to map a physical space using locally captured images for augmented reality applications such as precise placement of virtual objects in the physical space, in accordance with embodiments of the present disclosure.

In one embodiment, the system enables users to map spaces in the real world environment. The system can utilize crowdsourced data or information to map or determine the geometry of a room or various physical space. For instance, if I am in my living room and I want to place an object precisely and have it always be oriented that way then to escape the limits of GPS I could map the room. The mapping can be used to supplement GPS, wifi and/or radio (e.g., mobile signal positioning). The mapping can also be used in lieu of the positioning determined from wireless signals (e.g., GPS, wifi, radio, etc.) The user would enter a mode in the AR/VR environment and would walk the boundaries of the room. Photos of the walls of the room can also be captured—the system (e.g., the system including one or more of, client device 102 of FIG. 1, client device 402 of FIG. 4A or server 100 of FIG. 1, server 300 of FIG. 3A) hosting the AR environment can then learn the layout, sizing, dimensions of the room and/or physical objects that are in the room.

As such, a physical space is mapped using captured images of the physical space, in process 802. In one embodiment, the physical space is mapped using crowdsourced data from users of the augmented reality environment in the physical space. For example, the crowdsourced data can include images or photographs captured by the users of the augmented reality environment who are in the physical space. A geometry of the physical space is computed using the captured images of the physical space, in process 804. The plane is selected based on the geometry of the physical space such that the virtual billboard is oriented to be perceived by a user in the physical space, in process 806. The virtual billboard is then depicted substantially within the plane, in process 810. In addition, content associated with the virtual billboard is depicted, in process 812. User replies to the content associated with the virtual billboard are depicted, in process 814.

Figure 9:
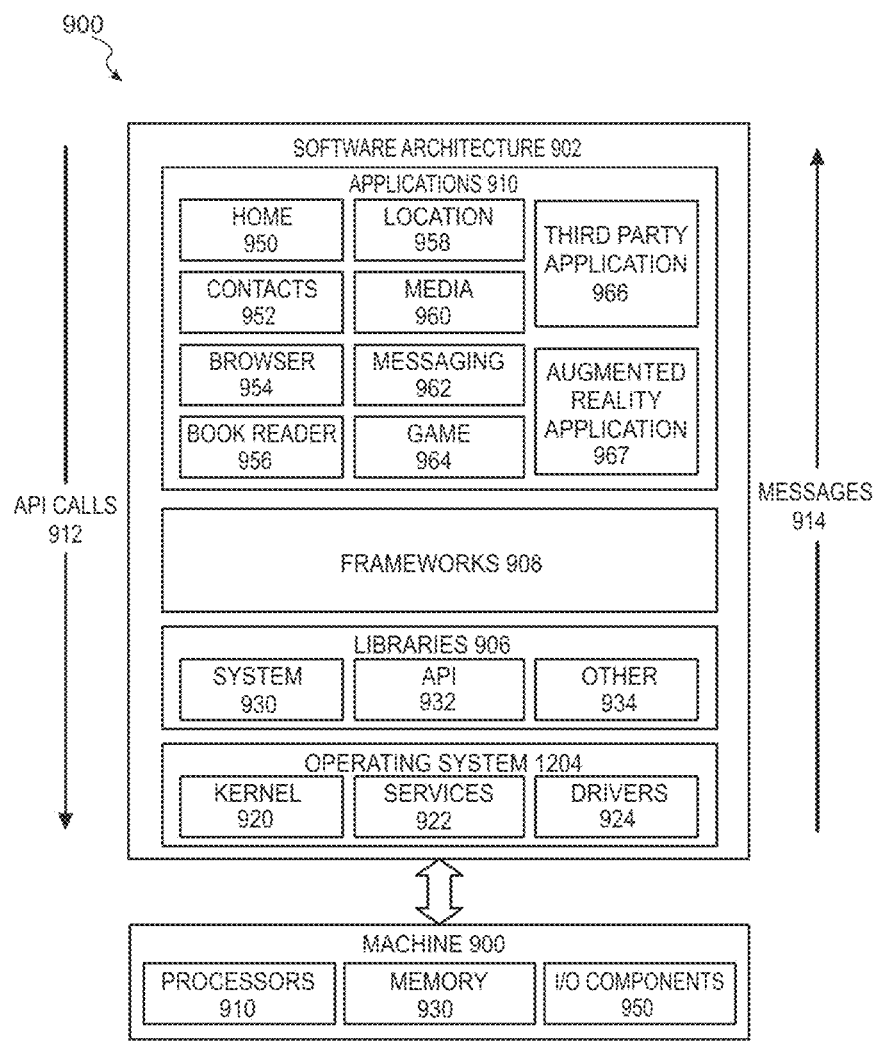
FIG. 9 is a block diagram illustrating an example of a software architecture that may be installed on a machine, in accordance with embodiments of the present disclosure.

FIG. 9 is a block diagram illustrating an example of a software architecture 900 that may be installed on a machine, in accordance with embodiments of the present disclosure.

FIG. 9 is a block diagram 900 illustrating an architecture of software 902, which can be installed on any one or more of the devices described above. FIG. 9 is a non-limiting example of a software architecture, and it will be appreciated that many other architectures can be implemented to facilitate the functionality described herein. In various embodiments, the software 902 is implemented by hardware such as machine 1000 of FIG. 10 that includes processors 1010, memory 1030, and input/output (I/O) components 1050. In this example architecture, the software 902 can be conceptualized as a stack of layers where each layer may provide a particular functionality. For example, the software 902 includes layers such as an operating system 904, libraries 906, frameworks 908, and applications 910. Operationally, the applications 910 invoke API calls 912 through the software stack and receive messages 914 in response to the API calls 912, in accordance with some embodiments.

In some embodiments, the operating system 904 manages hardware resources and provides common services. The operating system 904 includes, for example, a kernel 920, services 922, and drivers 924. The kernel 920 acts as an abstraction layer between the hardware and the other software layers consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH drivers, flash memory drivers, serial communication drivers (e.g., Universal Serial Bus (USB) drivers), WI-FI drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematics functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a search/discovery application 956, a location application 958, a media application 960, a messaging application 962, a game application 964, and other applications such as a third party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third party application 966 (e.g., an application developed using the Android, Windows or iOS. software development kit (SDK) by an entity other than the vendor of the particular platform) may be mobile software miming on a mobile operating system such as Android, Windows or iOS, or another mobile operating systems. In this example, the third party application 966 can invoke the API calls 912 provided by the operating system 904 to facilitate functionality described herein.

An augmented reality application 967 may implement any system or method described herein, including integration of augmented, alternate, virtual and/or mixed realities for digital experience enhancement, or any other operation described herein.

Figure 10:
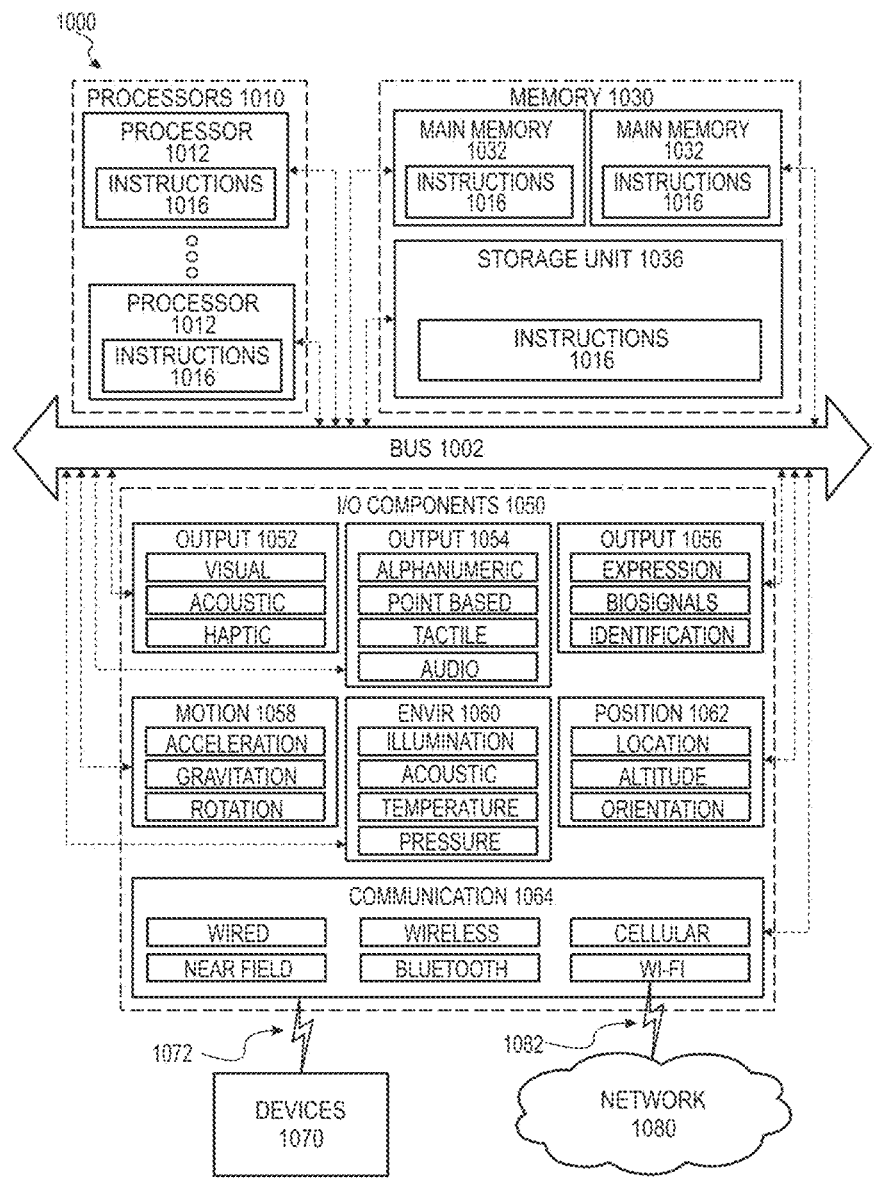
FIG. 10 is a block diagram illustrating components of a machine, according to some example embodiments, able to read a set of instructions from a machine-readable medium (e.g., a machine-readable storage medium) and perform any one or more of the methodologies discussed herein.

FIG. 10 is a block diagram illustrating components of a machine 1000, according to some example embodiments, able to read a set of instructions from a machine-readable medium (e.g., a machine-readable storage medium) and perform any one or more of the methodologies discussed herein.

Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. Additionally, or alternatively, the instruction can implement any module of FIG. 3A and any module of FIG. 4A, and so forth. The instructions transform the general, non-programmed machine into a particular machine programmed to carry out the described and illustrated functions in the manner described.

In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a head mounted device, a smart lens, goggles, smart glasses, a smart home device (e.g., a smart appliance), other smart devices, a web appliance, a network router, a network switch, a network bridge, a Blackberry, a processor, a telephone, a web appliance, a console, a hand-held console, a (hand-held) gaming device, a music player, any portable, mobile, hand-held device or any device or machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 can include processors 1010, memory/storage 1030, and I/O components 1050, which can be configured to communicate with each other such as via a bus 1002. In an example embodiment, the processors 1010 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 1012 and processor 1010 that may execute instructions 1016. The term "processor" is intended to include multi-core processor that may comprise two or more independent processors (sometimes referred to as "cores") that can execute instructions contemporaneously. Although FIG. 10 shows multiple processors, the machine 1000 may include a single processor with a single core, a single processor with multiple cores (e.g., a multi-core processor), multiple processors with a single core, multiple processors with multiples cores, or any combination thereof.

The memory/storage 1030 can include a main memory 1032, a static memory 1034, or other memory storage, and a storage unit 1036, both accessible to the processors 1010 such as via the bus 1002. The storage unit 1036 and memory 1032 store the instructions 1016 embodying any one or more of the methodologies or functions described herein. The instructions 1016 can also reside, completely or partially, within the memory 1032, within the storage unit 1036, within at least one of the processors 1010 (e.g., within the processor's cache memory), or any suitable combination thereof, during execution thereof by the machine 1000. Accordingly, the memory 1032, the storage unit 1036, and the memory of the processors 1010 are examples of machine-readable media.

As used herein, the term "machine-readable medium" or "machine-readable storage medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" or "machine-readable storage medium" should be taken to include a single medium or multiple media (e.g., a centralized or distributed database, or associated caches and servers) able to store instructions 1016. The term "machine-readable medium" or "machine-readable storage medium" shall also be taken to include any medium, or combination of multiple media, that is capable of storing, encoding or carrying a set of instructions (e.g., instructions 1016) for execution by a machine (e.g., machine 1000), such that the instructions, when executed by one or more processors of the machine 1000 (e.g., processors 1010), cause the machine 1000 to perform any one or more of the methodologies described herein. Accordingly, a "machine-readable medium" or "machine-readable storage medium" refers to a single storage apparatus or device, as well as "cloud-based" storage systems or storage networks that include multiple storage apparatus or devices. The term "machine-readable medium" or "machine-readable storage medium" excludes signals per se.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The I/O components 1050 can include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 can include many other components that are not shown in FIG. 10. The I/O components 1050 are grouped according to functionality merely for simplifying the following discussion and the grouping is in no way limiting In example embodiments, the I/O components 1050 can include output components 1052 and input components 1054. The output components 1052 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), eye trackers, and the like.

In further example embodiments, the I/O components 1052 can include biometric components 1056, motion components 1058, environmental components 1060, or position components 1062 among a wide array of other components. For example, the biometric components 1056 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 can include acceleration sensor components (e.g., an accelerometer), gravitation sensor components, rotation sensor components (e.g., a gyroscope), and so forth. The environmental components 1060 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 can include location sensor components (e.g., a GPS receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or other suitable device to interface with the network 1080. In further examples, communication components 1064 include wired communication components, wireless communication components, cellular communication components, Near Field Communication (NFC) components, Bluetooth. components (e.g., Bluetooth. Low Energy), WI-FI components, and other communication components to provide communication via other modalities. The devices 1070 may be another machine or any of a wide variety of peripheral devices (e.g., a peripheral device coupled via a USB).

The network interface component can include one or more of a network adapter card, a wireless network interface card, a router, an access point, a wireless router, a switch, a multilayer switch, a protocol converter, a gateway, a bridge, bridge router, a hub, a digital media receiver, and/or a repeater.

The network interface component can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Moreover, the communication components 1064 can detect identifiers or include components operable to detect identifiers. For example, the communication components 1064 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI signal triangulation, location via detecting a BLUETOOTH or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI.RTM. network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or other type of cellular or wireless coupling. In this example, the coupling 1082 can implement any of a variety of types of data transfer technology, such as Single Carrier Radio Transmission Technology, Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1016 can be transmitted or received over the network 1080 using a transmission medium via a network interface device (e.g., a network interface component included in the communication components 1064) and utilizing any one of a number of transfer protocols (e.g., HTTP). Similarly, the instructions 1016 can be transmitted or received using a transmission medium via the coupling 1072 (e.g., a peer-to-peer coupling) to devices 1070. The term "transmission medium" shall be taken to include any intangible medium that is capable of storing, encoding, or carrying the instructions 1016 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the innovative subject matter has been described with reference to specific example embodiments, various modifications and changes may be made to these embodiments without departing from the broader scope of embodiments of the present disclosure.

Such embodiments of the novel subject matter may be referred to herein, individually or collectively, by the term "innovation" merely for convenience and without intending to voluntarily limit the scope of this application to any single disclosure or novel or innovative concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

What is claimed is:

1. A method to associate a virtual billboard with a physical space in the real world environment, via an augmented reality platform, the method, comprising:
    identifying an altitude in the physical space;
    wherein, the virtual billboard is rendered in the augmented reality environment, at or near the altitude in the physical space, or is rendered in the augmented reality environment to appear to be located at or near the altitude in the physical space;
    further mapping the physical space using captured images of the physical space;

computing dimensions and determining a layout of the physical space by determining the geometry of the physical space using the captured images of the physical space;

facilitating the rendering of the virtual billboard in the augmented reality environment using the dimensions and the layout of the physical space.

2. The method of claim 1, further comprising:
select a plane in physical space;
depicting the virtual billboard substantially within the plane at the altitude in the physical space;
wherein:
the plane is selected based on a geometry of the physical space such that the virtual billboard is oriented to be perceived by a user of the augmented reality platform in the physical space.

3. The method of claim 1, further comprising:
identifying physical objects in the physical space using the captured images.

4. The method of claim 3, wherein:
generating a mapping of the physical space using crowdsourced data from users of the augmented reality environment in the physical space;
the crowdsourced data includes images or photographs captured by the users of the augmented reality environment who are in the physical space;
wherein, the mapping is used to supplement or in lieu of wireless positioning signals for rendering of the virtual billboard in the physical space.

5. The method of claim 1, further comprising:
creating the virtual billboard responsive to a request of a creator user;
wherein, one or more of the altitude and the plane at the altitude of the physical space are specified in the request of the creator user;
identifying a plane at the altitude of the physical space;
wherein, the plane is identified from a tag provided by the creator user in the real world environment.

6. The method of claim 1, further comprising:
selecting a plane in the physical space;
further identifying an angle with respect to the plane in physical space;
depicting the virtual billboard substantially at or near the angle with respect to the plane at the altitude in the physical space.

7. The method of claim 1, wherein:
the physical space includes a building;
the altitude is specified by a floor;
wherein, the virtual billboard includes one or more of, a note, a review, an offer, an ad.

8. The method of claim 1, further comprising:
depicting content associated with the virtual billboard, at or in the vicinity of the physical location;
depicting user replies to the content with the virtual billboard, at or in the vicinity of the physical location.

9. The method of claim 1, further comprising:
detecting the movement of the user in the real world environment;
identifying changes in location of physical area around the user due to the movement of the user in the real world environment;
rendering the virtual billboard to move in the augmented reality environment in accordance with the changes in location of the physical area around the user such that the virtual billboard moves with or appears to move with the user in the augmented reality environment.

10. The method of claim 9, further comprising:
detecting interaction with the virtual billboard by the user,
rendering augmented reality features embodied in the virtual billboard in the augmented reality environment;
wherein, the augmented reality features include the user replies depicted as a 3D thread associated with the virtual billboard;
wherein the augmented reality features further include one or more of, animations, objects or scenes rendered in 360 degrees or 3D.

11. The method of claim 1, further comprising:
generating a virtual billboard structure in the augmented reality environment from the virtual billboard and a second virtual billboard;
rendering the virtual billboard structure at the altitude of the physical space.

12. The method of claim 11, wherein:
the virtual billboard structure is generated from connecting an edge of the virtual billboard to an edge of the second virtual billboard; or
the virtual billboard structure is generated from aligning a tilt first angle of the virtual billboard to a second tilt angle of the second virtual billboard.

13. The method of claim 11, wherein:
the virtual billboard structure forms a passageway or a room in the augmented reality environment that a user can walk through; or
the virtual billboard structure forms an art exhibit in the augmented reality environment; or
the virtual billboard structure forms a sequences of messages in the augmented reality environment; or
the virtual billboard structure forms a shape of a sign or flag.

14. The method of claim 11, wherein, one or more of:
a shape of the virtual billboard structure is customizable;
a color or texture of the virtual billboard structure is customizable;
content depicted on the virtual billboard structure is customizable.

15. An apparatus to render an augmented reality environment in a real world environment, the apparatus, comprising:
a transparent display having a first side and a second side, the transparent display being transparent when viewed from the first side to the second side and when viewed from the second side to the first side;
wherein, in operation, when viewed from the second side of the transparent display to the first side, a first set of virtual objects are rendered to appear to be overlaid over first physical elements in a first physical location in the real world environment on the first side of the transparent display;
wherein, in operation, when viewed from the first side of the transparent display to the second side, a second set of virtual objects are rendered to appear to be overlaid over second physical elements in a second physical location in the real world in the real world environment on the second side of the transparent display;
an input component to receive input signals to trigger action on or interaction with the first set of virtual objects or the second set of virtual objects;
wherein:
the input component comprises a first input subcomponent disposed on the first side of the transparent display;

further wherein, the first input subcomponent is configured to receive first input signals to initiate action on or interaction with the second set of virtual objects in the second physical location;

wherein, the first input subcomponent receives the first input signals from a first human user, the first human user viewing the transparent display from the first side of the transparent display.

16. The apparatus of claim 15, wherein:

the input comprises a second input subcomponent disposed on the second side of the transparent display.

17. The apparatus of claim 16, further wherein, the second input subcomponent is configured to receive second input signals to initiate action on or interaction with the first set of virtual objects in the first physical location;

wherein, the second input subcomponent receives the second input signals from a second human user, the second human user viewing the transparent display from the second side of the transparent display.

18. The apparatus of claim 15, further comprising:

a motion sensor having a first sensor configured to detect user motion of a first human user in the first physical location of the real world environment on the first side of the transparent display, the first human user to access the transparent display from the first side of the transparent display;

wherein, the user motion detected in the first physical location initiates action on or interaction with the second set of virtual objects rendered to appear in the transparent display to be overlaid over the second physical elements in the second physical location;

wherein, changes in rendering of the second set of virtual objects are effectuated in the transparent display based on the action on or the interaction with the second set of virtual objects;

wherein, the changes are depicted in the transparent display on the first side for consumption by the first human user.

19. The apparatus of claim 15, further comprising:

a motion sensor having a second sensor configured to detect user motion of a second human user in the second physical location of the real world environment on the second side of the transparent display, the second human user to access the transparent display from the second side of the transparent display;

wherein, the user motion detected in the second physical location initiates action on or interaction with the first set of virtual objects rendered to appear to be overlaid over the first physical elements in the first physical location;

wherein, changes in rendering of the first set of virtual objects are effectuated in the transparent display based on the action on or the interaction with the first set of virtual objects;

wherein, the changes are depicted in the transparent display on the second side for consumption by the second human user.

20. An apparatus to render an augmented reality environment in a real world environment, the apparatus, comprising:

a display having a first side and a second side, the display being transparent when viewed from the second side to the first side;

an input subcomponent disposed on the second side of the display;

further wherein, the input subcomponent is configured to receive input signals to initiate action on or interaction with the first set of virtual objects in the first physical location;

wherein, in operation, when viewed from the second side of the display to the first side, a first set of virtual objects are rendered to appear to be overlaid over first physical elements in a first physical location in the real world environment on the first side of the display;

a motion sensor having a second sensor configured to detect user motion of a second human user in the second physical location of the real world environment on the second side of the transparent display, the second human user to access the display from the second side of the display;

wherein, the user motion detected in the second physical location initiates action on or interaction with the first set of virtual objects rendered to appear to be overlaid over the first physical elements in the first physical location;

wherein, changes in rendering of the first set of virtual objects are effectuated in the display to depict based on the action on or the interaction with the first set of virtual objects;

wherein, the changes are depicted in the display on the second side for consumption by the second human user.

\* \* \* \* \*